US007657632B2

(12) United States Patent
Nakao et al.

(10) Patent No.: US 7,657,632 B2
(45) Date of Patent: Feb. 2, 2010

(54) NETWORK SESSION CONTROL SYSTEM

(75) Inventors: Toshiyasu Nakao, Tokyo (JP); Akitake Mitsuhashi, Tokyo (JP); Atsushi Kashitani, Tokyo (JP)

(73) Assignee: NEC Corporation, Tokyo (JP)

( * ) Notice: Subject to any disclaimer, the term of this patent is extended or adjusted under 35 U.S.C. 154(b) by 1002 days.

(21) Appl. No.: 10/842,864

(22) Filed: May 11, 2004

(65) Prior Publication Data
US 2005/0021777 A1   Jan. 27, 2005

(30) Foreign Application Priority Data
May 12, 2003   (JP)   ............................. 2003-132884

(51) Int. Cl.
*G06F 15/173* (2006.01)
(52) U.S. Cl. ..................... 709/227; 709/223; 709/224; 709/228; 709/229
(58) Field of Classification Search ................ 709/223, 709/224, 227–229
See application file for complete search history.

(56) References Cited

U.S. PATENT DOCUMENTS

| 5,881,050 | A  | * | 3/1999 | Chevalier et al. | ............ | 370/230 |
| 6,262,974 | B1 | * | 7/2001 | Chevalier et al. | ............ | 370/232 |
| 6,430,592 | B1 | * | 8/2002 | Davison | ...................... | 718/103 |
| 6,438,704 | B1 | * | 8/2002 | Harris et al. | ................. | 713/502 |
| 6,570,873 | B1 | * | 5/2003 | Isoyama et al. | ............. | 370/375 |
| 6,693,892 | B1 | * | 2/2004 | Rinne et al. | .................. | 370/348 |

| 2003/0208602 | A1 | * | 11/2003 | Bhalla et al. | ................. | 709/227 |

FOREIGN PATENT DOCUMENTS

| JP | 7-264666 | 10/1995 |
| JP | 10-28284 | 1/1998 |
| JP | 11-164361 | 6/1999 |

OTHER PUBLICATIONS

Want, Roy, et al., "Active Badges and Personal Interactive Computing Objects", IEEE Transactions on Consumer Electronics (1992), vol. 38, No. 1, pp. 10-20.
Takagi, "Handbook of Image Analysis", Tokyo University Press, pp. 485-491.

* cited by examiner

*Primary Examiner*—Liangche A Wang
(74) *Attorney, Agent, or Firm*—Scully, Scott, Murphy & Presser, P.C.

(57) ABSTRACT

A network session is established by a session establishment procedure in accordance with whether or not a difference in priority of session establishment exists among a plurality of terminals for which the network session is to be established. Based on reserved connection information registered in a database, a network administration device for establishing a network session among a plurality of terminals uses a first session establishment procedure that treats all of the terminals in the same manner when there is no difference in the priority of session establishment among the plurality of terminals, and uses a second session establishment procedure that inquires and performs other operations in advance as to whether or not to establish a session with high-priority terminals and treats with priority the terminals of high-priority users when there is a difference in the priority of session establishment.

15 Claims, 43 Drawing Sheets

OUTLINE OF SYSTEM

EMBODIMENT 1.1

EMBODIMENT 1.1

EMBODIMENT 1.1

EMBODIMENT 1.2

EMBODIMENT 1.2

EMBODIMENT 1.2

EMBODIMENT 1.3

EMBODIMENT 1.3

EMBODIMENT 1.4

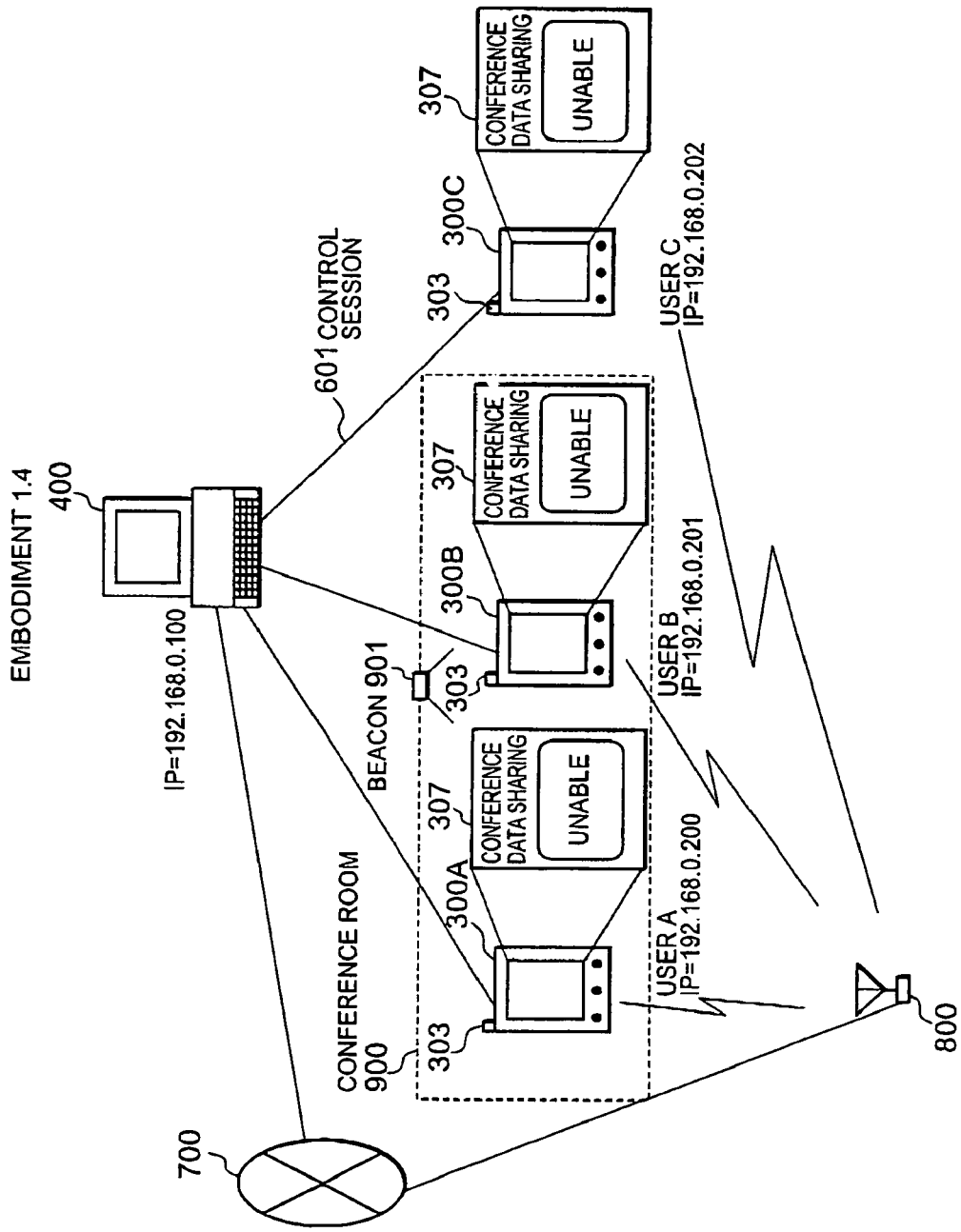

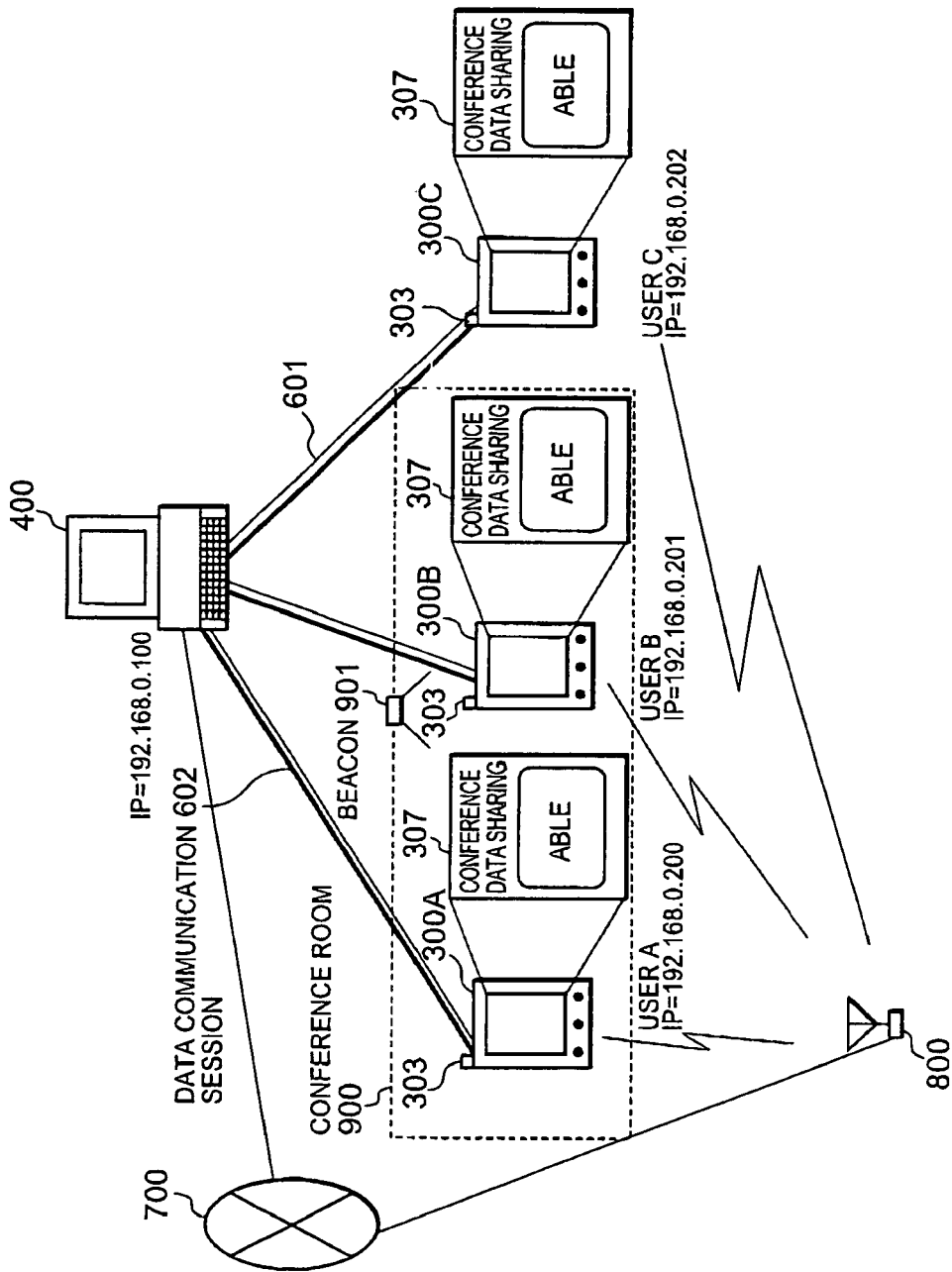

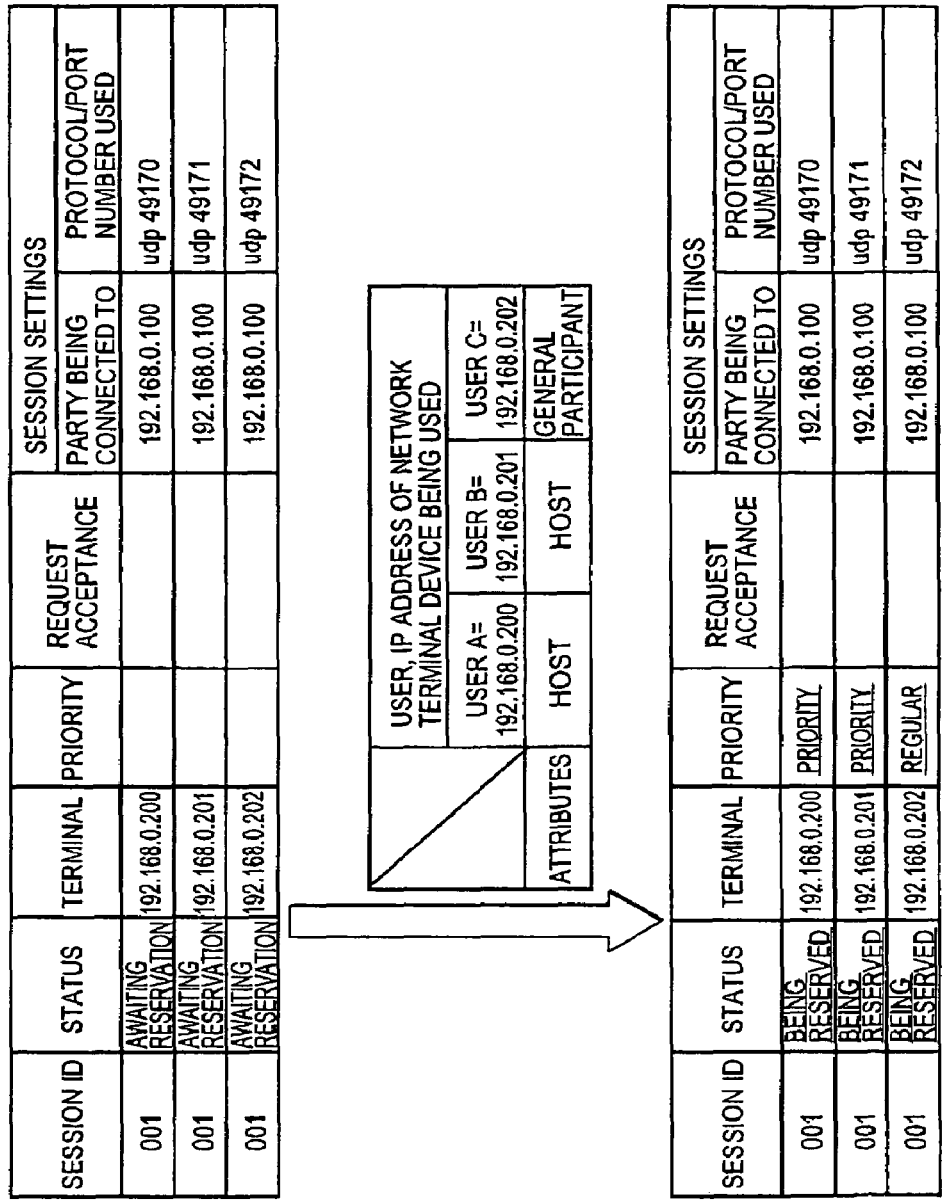
FIG. 25 EMBODIMENT 1.4

FIG. 26
EMBODIMENT 1.4

| SESSION ID | STATUS | TERMINAL | PRIORITY | REQUEST ACCEPTANCE | SESSION SETTINGS | |
|---|---|---|---|---|---|---|
| | | | | | PARTY BEING CONNECTED TO | PROTOCOL/PORT NUMBER USED |
| 001 | RESERVED | 192.168.0.200 | PRIORITY | ABLE | 192.168.0.100 | udp 49170 |
| 001 | RESERVED | 192.168.0.201 | PRIORITY | ABLE | 192.168.0.100 | udp 49171 |
| 001 | RESERVED | 192.168.0.202 | REGULAR | — | 192.168.0.100 | udp 49172 |

⇒

| SESSION ID | STATUS | TERMINAL | PRIORITY | REQUEST ACCEPTANCE | SESSION SETTINGS | |
|---|---|---|---|---|---|---|
| | | | | | PARTY BEING CONNECTED TO | PROTOCOL/PORT NUMBER USED |
| 001 | ESTABLISHED | 192.168.0.200 | PRIORITY | ABLE | 192.168.0.100 | udp 49170 |
| 001 | ESTABLISHED | 192.168.0.201 | PRIORITY | ABLE | 192.168.0.100 | udp 49171 |
| 001 | ESTABLISHED | 192.168.0.202 | REGULAR | — | 192.168.0.100 | udp 49172 |

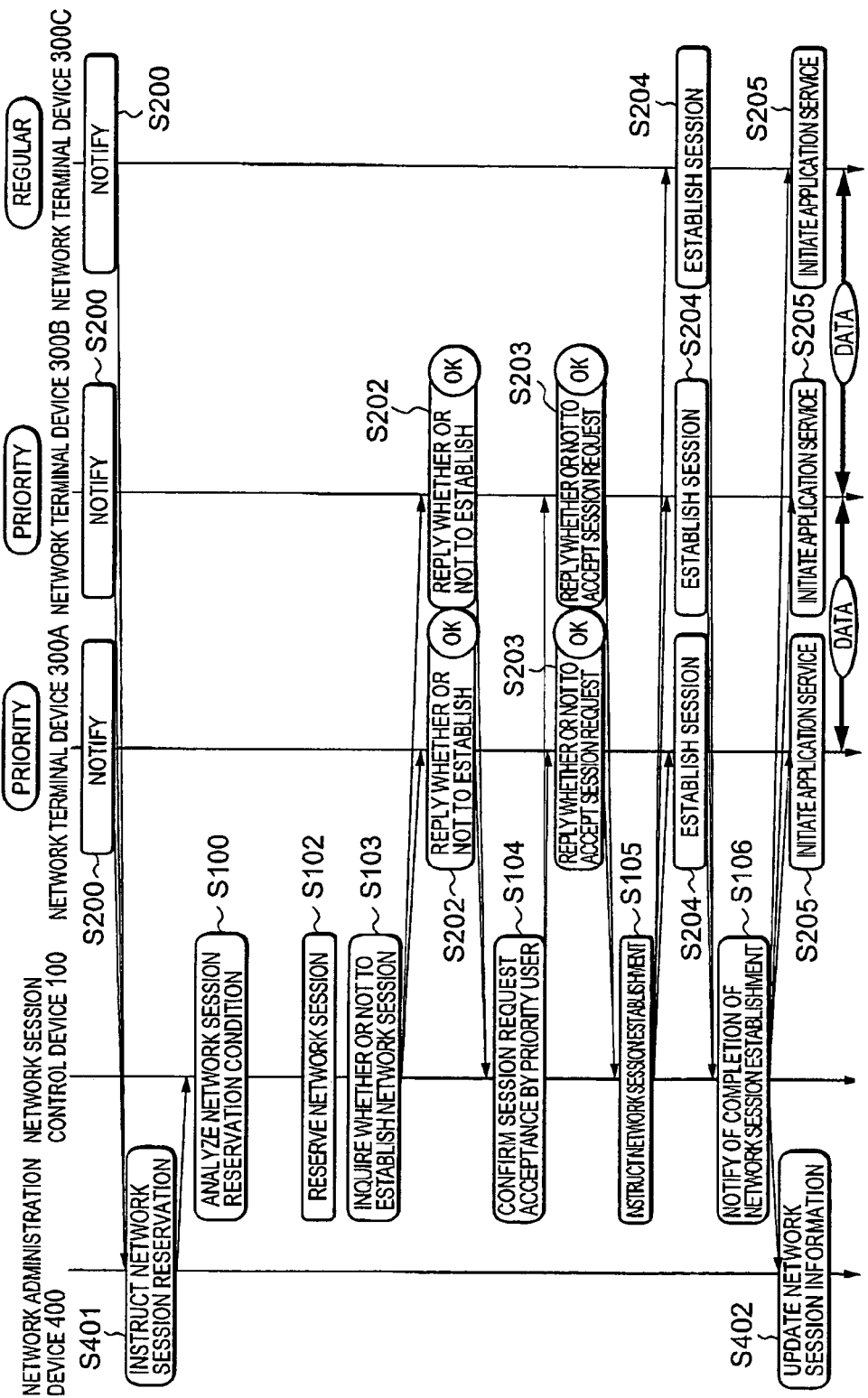

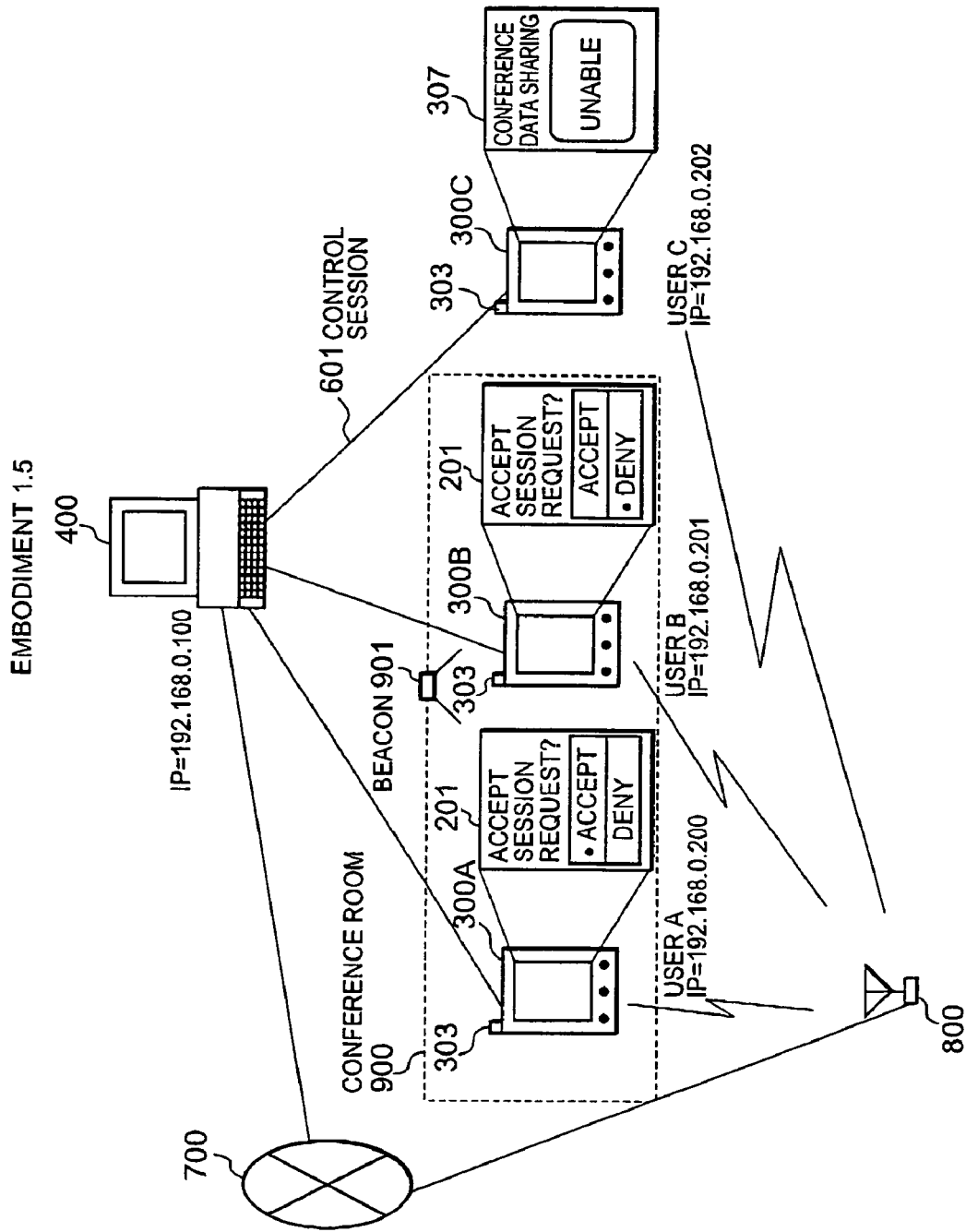

EMBODIMENT 1.6

2ND MODE OF IMPLEMENTATION

EMBODIMENT 2.1

EMBODIMENT 2.1

FIG. 34
EMBODIMENT 2.1

| SESSION ID | STATUS | TERMINAL | PRIORITY | REQUEST ACCEPTANCE | RESERVATION CONDITION | | SESSION SETTINGS | |
|---|---|---|---|---|---|---|---|---|
| | | | | | CONDITION | STATUS | PARTY BEING CONNECTED TO | PROTOCOL/PORT NUMBER USED |
| AFTER COMPLETION OF S100 | | | | | | | | |
| 001 | AWAITING RESERVATION | 192.168.0.200 | | | AVAILABLE | | 192.168.0.100 | audio 49170 RTP/AVP 0 |
| 001 | AWAITING RESERVATION | 192.168.0.201 | | | AVAILABLE | | 192.168.0.100 | audio 49171 RTP/AVP 0 |
| DURING EXECUTION OF S102 | | | | | | | | |
| 001 | BEING RESERVED | 192.168.0.200 | REGULAR | | AVAILABLE | | 192.168.0.100 | audio 49170 RTP/AVP 0 |
| 001 | BEING RESERVED | 192.168.0.201 | REGULAR | | AVAILABLE | | 192.168.0.100 | audio 49171 RTP/AVP 0 |
| DURING EXECUTION OF S103 | | | | | | | | |
| 001 | RESERVED | 192.168.0.200 | REGULAR | ABLE | AVAILABLE | AVAILABLE | 192.168.0.100 | audio 49170 RTP/AVP 0 |
| 001 | RESERVED | 192.168.0.201 | REGULAR | UNABLE | AVAILABLE | OUT | 192.168.0.100 | audio 49171 RTP/AVP 0 |
| IMMEDIATELY BEFORE EXECUTION OF S105 | | | | | | | | |
| 001 | RESERVED | 192.168.0.200 | REGULAR | ABLE | AVAILABLE | AVAILABLE | 192.168.0.100 | audio 49170 RTP/AVP 0 |
| 001 | RESERVED | 192.168.0.201 | REGULAR | ABLE | AVAILABLE | AVAILABLE | 192.168.0.100 | audio 49171 RTP/AVP 0 |

EMBODIMENT 3.1

MODIFICATION OF EMBODIMENT 2.1

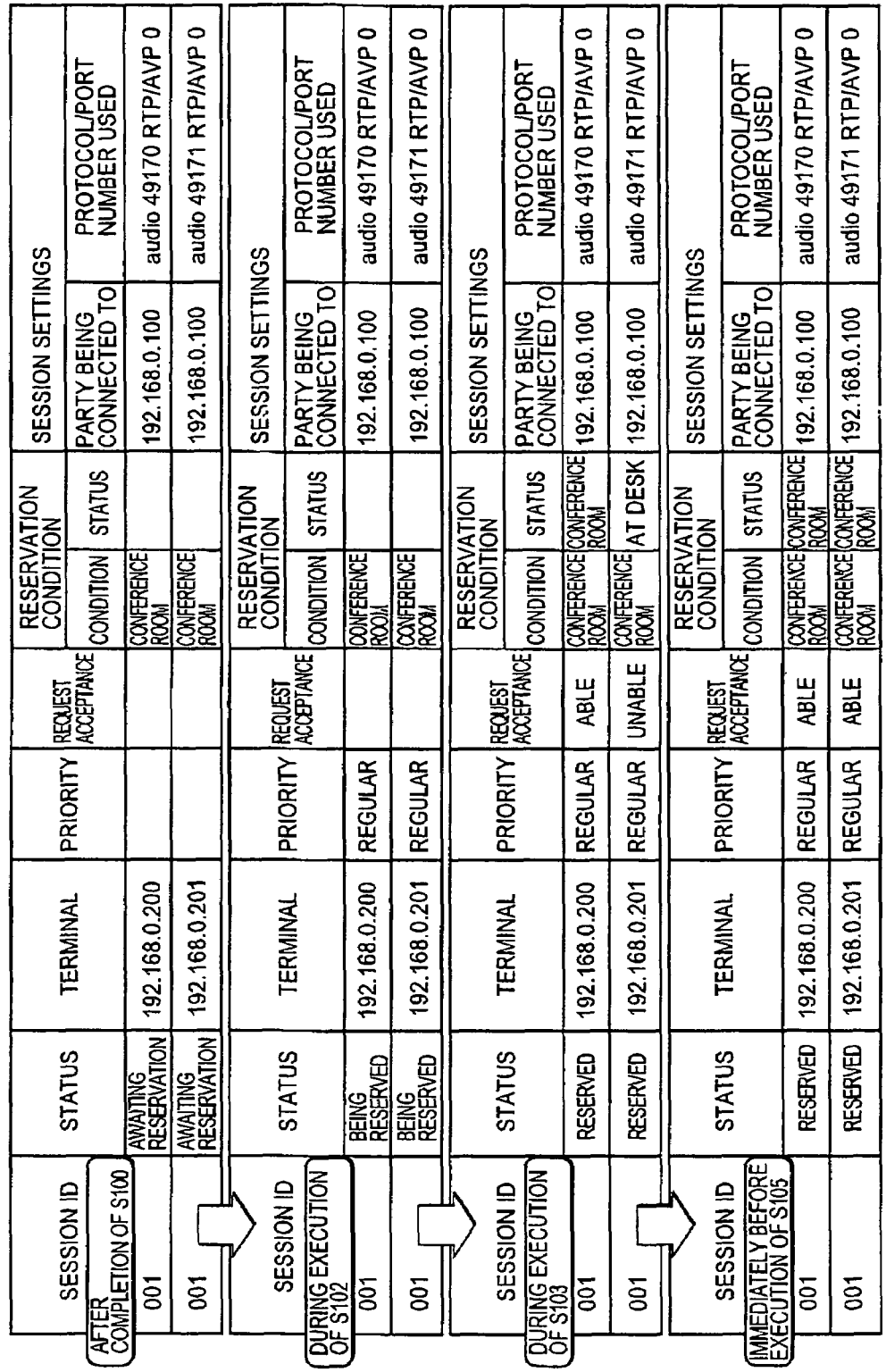

NETWORK SESSION CONTROL SYSTEM

BACKGROUND OF THE INVENTION

1. Field of the Invention

The present invention relates to a network session control system for establishing a network session to execute voice communication or data communication between network terminals, and particularly relates to a network session control system that is capable of establishing a session at an appropriate timing while looking up the status of a user or a terminal.

2. Description of the Related Art

Along with the spread and decreasing cost of Internet technology, there is a significant trend towards services that had hitherto been performed using a dedicated protocol on dedicated lines being performed on an IP (Internet Protocol) network. Telephone services can also be performed on an IP network by a combination of voice communication on VoIP (Voice over IP) technology with H.323 and SIP (Session Initiation Protocol) designed as call control protocols. H.323 and SIP are not limited to telephone services and are designed to be usable in constructing and controlling sessions used for network services between terminals.

However, when H.323 and SIP are used, not to mention a telephone that uses conventional switching equipment, the method of utilizing these protocols in network services has hitherto generally involved attempting to establish a session using a terminal "when the caller/callee wishes to communicate." Therefore, in the case of a telephone service, for example, when the callee is in conference and is unable to promptly respond, the callee usually either cannot be contacted, or could only do something to the effect of verbally asking for a return call. Drawbacks also frequently arise in that when a call eventually arrives from the callee, the original caller is then unable to respond, and other such cases in which a lengthy process is required in order to establish voice communication.

Conventional techniques for overcoming such drawbacks are proposed in JP-A7-264666 and 11-164361. The conventional technique described in JP-A 7-264666 is a reserved connection mobile communication system whereby a mobile device designated by an advance registration connects with a designated terminal upon reaching a designated area. Specifically, a mobile communication switching device is provided with a reserved connection registration processing device for storing reserved connection information in a home memory bank when the reserved connection that specifies the connection terminal, the mobile device, and the physical location of the mobile device has been registered from the terminal of a reserved connection registrant, and is also provided with a reserved connection control device for comparing the registered location with the designated area included in the reserved connection information when location registration is performed from the mobile device, and connecting the mobile device with the terminal designated in the reserved connection information when the registered location matches the designated area. An aspect is also disclosed in which a connection is established with the terminal of the reserved connection registrant by means of the reserved connection control device when the mobile device reaches the designated area, the message "The mobile device for which reserved connection registration is performed has reached the designated area. Connect?" is presented, and the mobile device is connected with the designated terminal only when a request to connect is made by the reserved connection registrant.

On the other hand, the conventional technique described in JP-A 11-164361 is a wireless communication system whereby monitoring and redialing are performed without burdening the transmission initiator until the mobile device is able to respond in a case in which the mobile device does not respond due to being out of area or for another reason. Specifically, when the transmission source terminal fails to call up the mobile device, a request is made to a service center to fill in for subsequent processing, the service center transmits to the mobile device a call setup signal in which a notice is written into a source sub-address of the call setup signal that a call has been received, a call setup signal is automatically transmitted to the transmission source terminal indicating a response to the incoming call at the source sub-address of the call setup signal when there is a call setup response from the mobile device, and the transmission source terminal that received this signal automatically calls the mobile device.

However, the above-described conventional techniques have drawbacks in that they consider only the terminal location and continuation of call processing, are not necessarily convenient for the user being called (a user of a mobile device in the case of JP-A 7-264666 and 11-164361), and have a high likelihood of not being able to smoothly establish a session. The conventional technique described in JP-A 7-264666 is configured so as to directly confirm availability to a pre-registrant when the mobile device reaches the designated area, or, in other words, when pre-conditions are satisfied, thereby smoothly establishing a session, but the session establishment procedure changes according to the relationship between the caller and the party being called, and there are many cases in which confirmation does not necessarily need to be obtained always from the party reserving the session. For example, the caller and the party being called are equals if their relationship to each other is that of coworker or friend, but the convenience of the customer in a customer-business relationship and the superior in a superior-subordinate relationship should be considered with priority.

The conventional technique described above also has the drawback of not reflecting the wishes of a user who does not wish to receive a reservation as such in the first place, because the reservation is received without considering the convenience of the user being called.

SUMMARY OF THE INVENTION

An object of the present invention is to provide a network session control system and network administration device that are capable of establishing a network session by a session establishment procedure determined depending on the relationship between users participating in the network session.

Another object of the present invention is to provide a network session control system and network administration device that are capable of confirming whether or not the user scheduled to participate when the reservation is received is able to participate.

According to the present invention, a network session control system for establishing a network session among a plurality of network terminals, includes: a table storing user relationship among users using respective ones of the plurality of network terminals; a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree.

The network session controller may control a procedure of the session establishment based on state information indicating availability of at least one of the network terminals or its user. Each of the network terminals preferably detects a state of the network terminal or its user and informs the network session controller of the detected state.

The network session control system may further include a session establishment information manager for managing state information indicating availability of at least one of the network terminals or its user, wherein the network session controller controls a procedure of the session establishment based on the state information received from the session establishment information manager.

The network session controller may confirm that the plurality of network terminals related to the reserved connection information participate in the network session before registering the reserved connection information into the session information memory.

In a first embodiment, when all the network terminals related to the reserved connection information can participate in the network session, the network session controller sends any higher-priority network terminal an inquiry about whether to start a procedure of the session establishment and, when having received a reply to the inquiry from the higher-priority network terminal that the procedure of the session establishment is permitted to start, starts establishing the network session for all the network terminals.

In a second embodiment, when all the network terminals related to the reserved connection information can participate in the network session, the network session controller sends any higher-priority network terminal an inquiry about whether to start a procedure of the session establishment and, when having received a reply to the inquiry from at least one higher-priority network terminal that the procedure of the session establishment is permitted to start, starts establishing the network session for all network terminals other than any higher-priority network terminal that has not sent the reply back.

In a third embodiment, when any higher-priority network terminal related to the reserved connection information can participate in the network session, the network session controller starts establishing the network session for all the network terminals.

In a fourth embodiment, when any higher-priority network terminal related to the reserved connection information can participate in the network session, the network session controller sends any higher-priority network terminal an inquiry about whether to start a procedure of the session establishment and, when having received a reply to the inquiry from the higher-priority network terminal that the procedure of the session establishment is permitted to start, starts establishing the network session for all the network terminals.

In a fifth embodiment, when any higher-priority network terminal related to the reserved connection information can participate in the network session, the network session controller sends any higher-priority network terminal an inquiry about whether to start a procedure of the session establishment and, when having received a reply to the inquiry from at least one higher-priority network terminal that the procedure of the session establishment is permitted to start, starts establishing the network session for all network terminals other than any higher-priority network terminal that has not sent the reply back.

In a sixth embodiment, when all the network terminals related to the reserved connection information have an equal priority degree, the network session controller controls the session establishment without any preference.

According to another aspect of the present invention, a network administration device for establishing a network session among a plurality of network terminals through a session data relaying section, includes: a table storing user relationship among users using respective ones of the plurality of network terminals; a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree.

According to still another aspect of the present invention, a method for establishing a network session among a plurality of network terminals through a session data relaying section, includes the steps of: a) storing user relationship among users using respective ones of the plurality of network terminals; b) storing addresses of the plurality of network terminals and reserved connection information including a priority degree of session establishment for each of the plurality of network terminals, wherein the priority degree for each network terminal is determined depending on the user relationship; and c) controlling session establishment depending on the reserved connection information such that preferential session establishment is given to a network terminal having a higher priority degree.

According to the present invention, when there are differences in the priority of establishing sessions among the plurality of network terminal devices for which a network session is to be established, control is executed for establishing a network session according to a session establishment procedure for assigning priority to the network terminal device of the high-priority user among the users participating in the network session, thereby making it possible to establish a network session by such a session establishment procedure matching the relationship between the users participating in the network session.

BRIEF DESCRIPTION OF THE DRAWINGS

FIG. 23 is a diagram depicting a second state of a system according to Embodiment 1.4 of the first mode of implementation;

FIG. 24 is a diagram depicting a third state of a system according to Embodiment 1.4 of the first mode of implementation;

FIG. 25 is a diagram depicting an example of the session information database in Embodiment 1.4 of the first mode of implementation;

FIG. 26 is a diagram depicting a change of contents of the session information database in Embodiment 1.4 of the first mode of implementation;

FIG. 27 is a sequence diagram depicting the flow of processing according to Embodiment 1.5 of the first mode of implementation;

FIG. 28 is a diagram depicting a state of Embodiment 1.5 of the first mode of implementation;

FIG. 34 is a diagram depicting a change of contents of the session information database in Embodiment 2.1 of the second mode of implementation;

FIG. 43 is a diagram depicting a change of state in the session administration data in the network session information database when the position detecting section are used, according to the modification of Embodiment 2.1 of FIG. 42.

DESCRIPTION OF THE PREFERRED EMBODIMENTS

Preferred embodiments of the present invention will next be described in detail with reference to the drawings.

Outline of System

Figure 1:
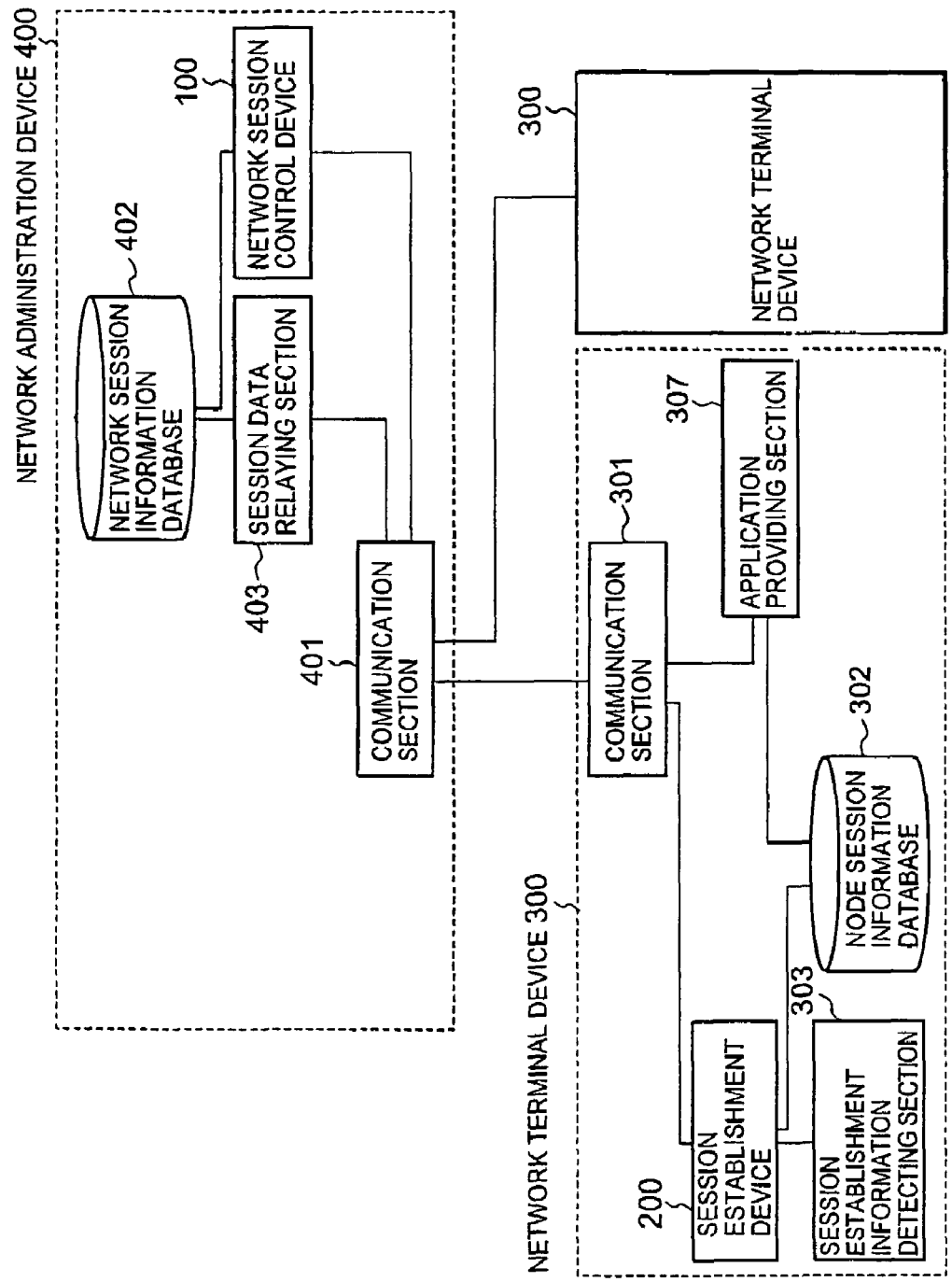
FIG. 1 is a diagram showing a network session control system according to the present invention to explain the role of the network session control system.

The role of the network session control system according to the present invention will first be described with reference to FIG. 1. In the following description of the present invention, it is assumed that a data communication connection provided on a communication line between the network terminal devices 300 or between the network terminal devices 300 and the network administration device 400, as shown in FIG. 1, is referred to as a session. Also, a plurality of sessions created for performing mutual data communications between the network terminal devices 300 is referred to generally as a network session.

As shown in FIG. 1, the network session control system according to the present invention is composed of a plurality of network terminal devices 300 and a network administration device 400 that are capable of communicating with each other over a network (not explicitly shown in this figure), and the constituent elements used for establishing a network session are distributed and arranged in the network administration device 400 that administers the creation/termination of a network session and in the plurality of network terminal devices 300 having communication functionality used by users.

The network administration device 400 is composed of a communication section 401 for handling communication with other devices, a network session control device 100 for creating/terminating a network session, a network session information database 402 for storing reserved or already created network session administration information, and a session data relaying section 403 for relaying communication data transferred in a network session.

The network terminal devices 300 are also composed of a communication section 301 for handling communication with other devices, a session establishment device 200 for establishing a session based on a request from the network session control device 100, a node session information database 302 for storing information concerning the network session in which the network terminal device 300 is participating, a session establishment information detecting section 303 involved in detecting information for evaluating whether or not the network terminal device 300 is capable of establishing the required network session, and an application providing section 307 for providing network service that will be used directly by the user.

The network session control system according to the present invention is designed for establishing a data communication connection, or a network session, that is used when the application providing section 307 in the network terminal device 300 provides a network service to a user.

Outline of Sessions

Figure 2:
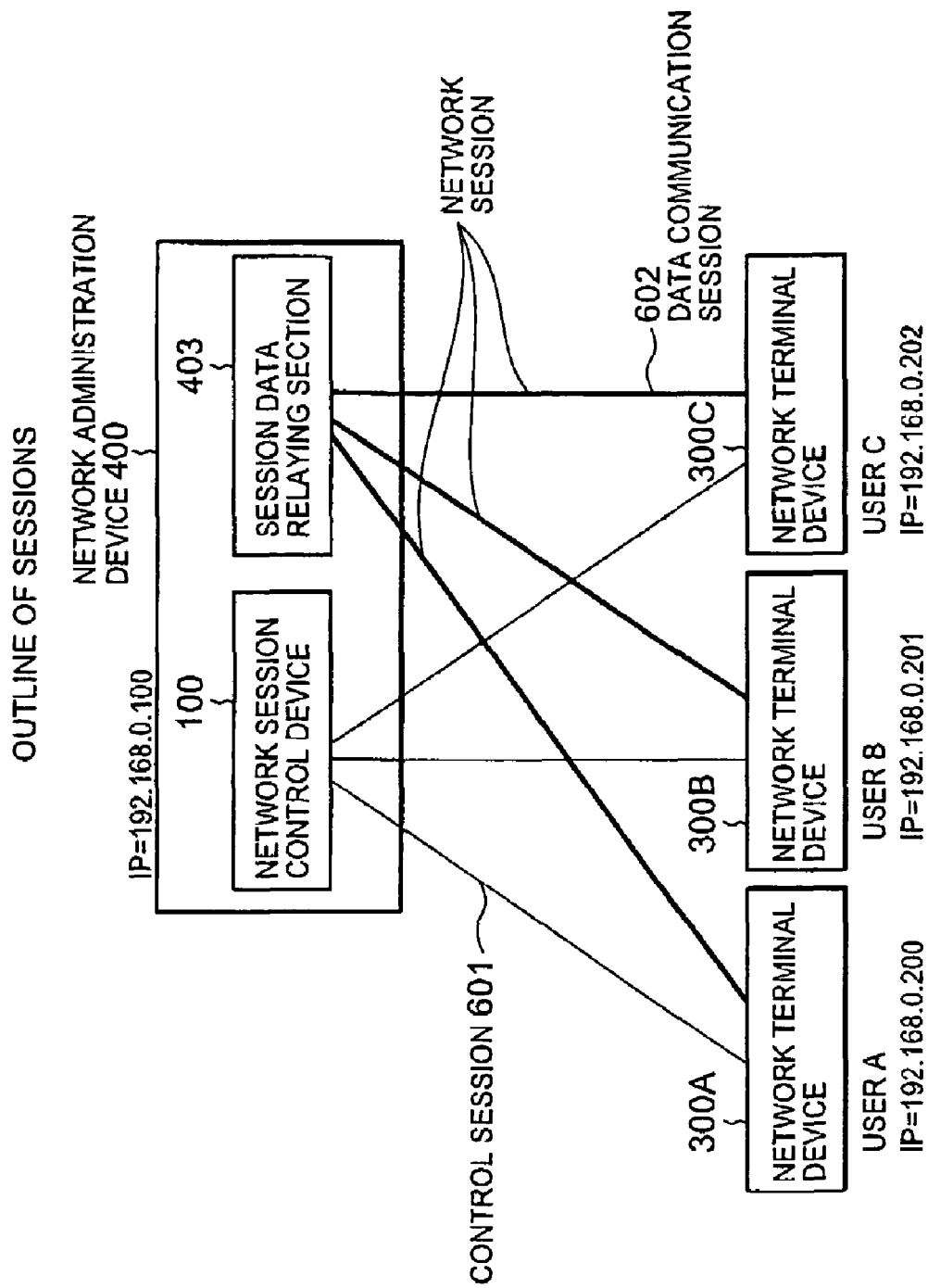
FIG. 2 is a diagram depicting an outline of the session and network session established between the network administration device and the plurality of network terminal devices.

FIG. 2 conceptually shows sessions and a network session established between the network administration device 400 and a plurality of network terminal devices 300. In FIG. 2, a network session is created for the purpose of data communication between the network terminal devices 300.

Each of the network terminal devices 300 maintains a control session 601 through which control information for sustaining/administering a session is exchanged with the network session control device 100 in the network administration device 400. Also, a data communication session 602 through which the network terminal devices 300 can exchange data with each other is established with the session data relaying section 403 in the network administration device 400. In this example, the plurality of data communication sessions 602 connected to the session data relaying section 403 constitute a network session. The application providing section 307 exchanges data needed for a network service with other network terminal devices 300 via the network session formed through the session data relaying section 403.

Hereinafter, four modes of implementation of the present invention will be described and thereafter several embodiments of each mode will be described in detail. The first, second, third, and fourth modes of implementation are shown in FIG. 3, FIG. 31, FIG. 35, and FIG. 38, respectively.

First Mode of Implementation

According to a first mode of implementation of the present invention, in the case where a network session is established among a plurality of network terminal devices based on the reserved connection information of a network session, a first session establishment procedure is used that treats the network terminal devices of all users in the same manner when there is no difference in the priority of establishing a session among the plurality of network terminal devices for which a network session is to be established and, when there is a difference, a second session establishment procedure is used that treats with priority the network terminal device that should be given priority. Also, each network terminal device detects its own status and the network administration device looks up this detected status in order for the network administration device to establish the session at an appropriate timing according to the statuses of the network terminal devices.

System Structure

Figure 3:
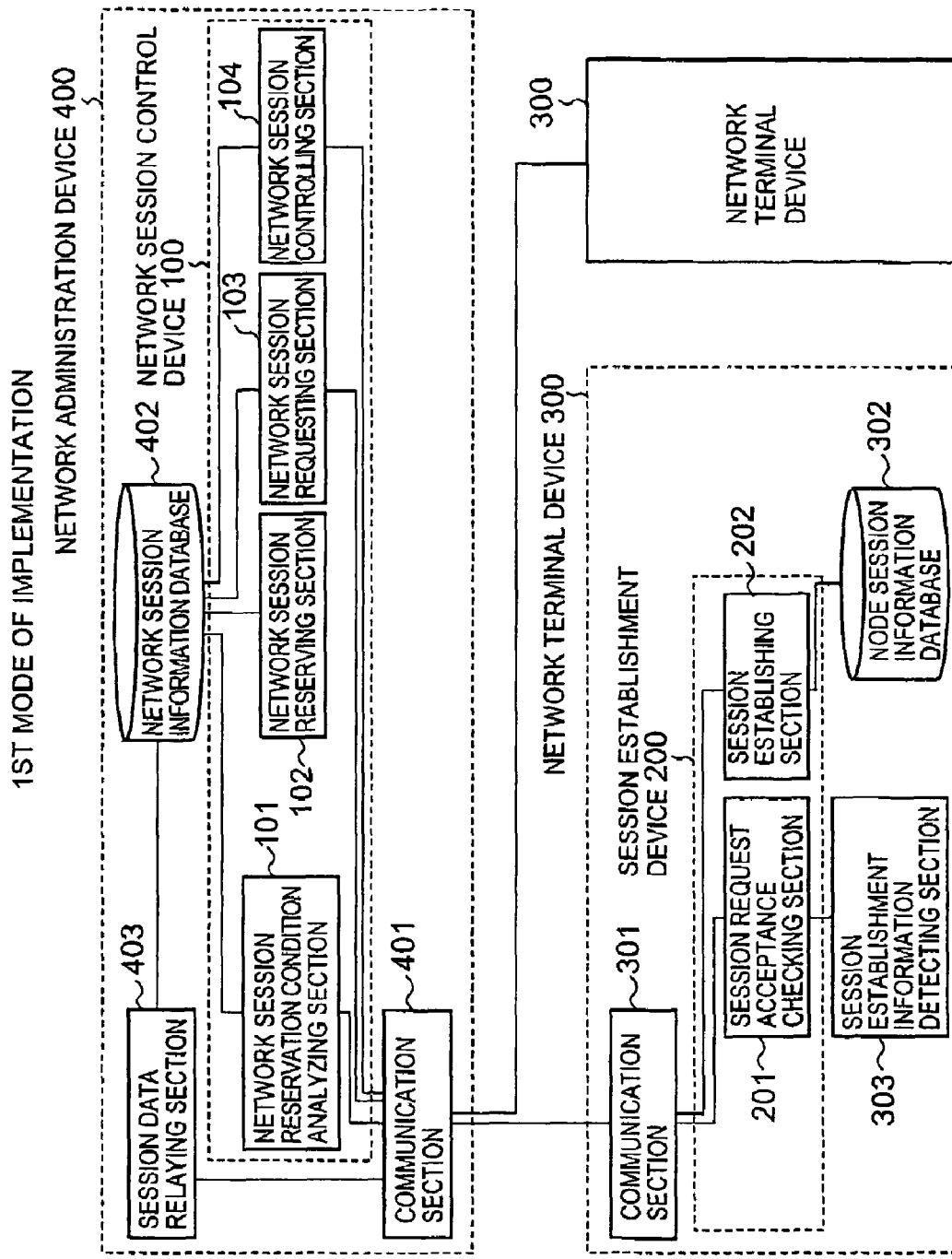
FIG. 3 is a diagram depicting the structure of a first mode of implementation of the present invention.

As shown in FIG. 3, the network session control system according to the first mode of implementation is provided with the followings:

- a communication section 401 for handling communication with the network terminal devices 300 in the network administration device 400;
- a network session information database 402 for storing administration information relating to a reserved or already created network session;
- a session data relaying section 403 for relaying data communicated through the network session;
- a network session reservation condition analyzing section 101 involved in analyzing reservation instruction information for a desired network session and registering the reserved connection information of the network session into the network session information database 402;
- a network session reserving section 102 for reserving the structure of a network session by confirming the reserved connection information registered by the network session reservation condition analyzing section 101;
- a network session requesting section 103 for determining whether a network session reservation condition is satisfied and, when such a condition is satisfied, issuing a request to participate in the network session; and
- a network session controlling section 104 for performing control such that a network session is established with the network terminal devices 300.

Each of the network terminal devices 300 is provided with the followings:

- a communication section 301 for handling communication with the network administration device 400 and other network terminal devices 300;
- a node session information database 302 for storing information relating to a network session in which the network terminal device 300 is participating;
- a session establishment information detecting section 303 involved in detecting information for evaluating whether or not the network terminal device 300 is capable of establishing the requested network session;
- a session request acceptance checking section 201 for checking based on a detected result of the session establishment information detecting section 303 whether or not to accept the session establishment request from the network session requesting section 103 and issuing a reply; and
- a session establishing section 202 for establishing a session according to an instruction from the network session controlling section 104.

The functional means provided by the network session reservation condition analyzing section 101, network session reserving section 102, network session requesting section 103, network session controlling section 104, communication section 401, and session data relaying section 403 on the network administration device 400 can be carried out by a computer constituting the network administration device 400 and a program for the administration device. The program for the administration device is stored on and provided from a magnetic disk or other computer-readable recording medium (not pictured), the program is read by the computer constituting the network administration device 400 at the time of startup or at another time, and the functional means 101, 102, 103, 104, 401, and 403 are carried out on the computer by controlling the operation of the computer.

The functional means provided by the session request acceptance checking section 201, session establishing section 202, communication section 301, and session establishment information detecting section 303 on each of the network terminal devices 300 can also be carried out by a computer constituting the network terminal devices 300 and a program used by a terminal. The program used by a terminal is stored on and provided from a magnetic disk or other computer-readable recording medium (not pictured), the program is read by the computer constituting the network terminal devices 300 at the time of startup or at another time, and the functional means 201, 202, 301, and 303 are carried out on the computer by controlling the operation of the computer.

Operation

The flow of processing in the first mode of implementation of the present invention thus configured is generally as described below.

First, the network session reservation condition analyzing section 101 analyzes reservation instruction information received from a reservation registrant and registers in the network session information database 402 reserved connection information that contains the communication address of a network terminal device for which a network session is to be established, the priority of establishing a session for each network terminal device, and a parameter composed of the communication address of the session data relaying section 403, the protocol and port number used by the aforementioned network session. The status of the reserved connection information at the time of this registration is "awaiting reservation," and the network session reservation condition analyzing section 101 changes the status of the reserved connection information registered in the network session information database 402 to "being reserved," whereby the network session reserving section 102 confirms the reservation and reserves the construction of the network session.

The network session requesting section 103 then checks the session request acceptance checking section 201 of the network terminal device 300 to find out whether or not the network session reservation condition is satisfied. The session request acceptance checking section 201 looks up the information detected by the session establishment information detecting section 303, verifies whether or not the reservation condition is satisfied, and issues a response back to the network session requesting section 103.

The network session requesting section 103 then verifies whether or not the reservation condition is satisfied for all the necessary network terminal devices, and if the reservation condition is satisfied, verifies the start of session establishment to the session request acceptance checking section 201 of the network terminal device as needed, and then passes this verification on to the network session controlling section 104 so as to establish a network session.

The processing of the network session requesting section 103 in a case in which there is no difference in session establishment priority in the reserved connection information among the plurality of network terminal devices differs from that of a case in which there is a difference in priority in the reserved connection information. For reserved connection information with no difference in priority, control is executed for establishing a network session according to the first session establishment procedure that treats the network terminal devices of all users equally. In contrast, for reserved connection information with a difference in priority, control is executed for establishing a network session according to the second session establishment procedure that treats with priority the network terminal devices of those high-priority users. Examples of the first and second session establishment procedures will be described hereinafter.

(1) Example of First session establishment procedure: When it is determined that all of the network terminal devices included in the reserved connection information can participate in the network session, the network session requesting section 103 notifies the network session controlling section 104 and thereby the network session controlling section 104 controls such that a network session is established for all of the network terminal devices participating in the session. A practical example of this procedure will be described in detail in Embodiment 1.1 of the first mode of implementation described hereinafter.

(2) Example 1 of Second session establishment procedure: When it is determined that all of the network terminal devices in the reserved connection information can participate in the network session, it is inquired as to whether or not to start establishing a session for all of the high-priority network terminal devices, and a reply is returned from all of the high-priority network terminal devices to the effect that it is possible to start establishing a session, whereupon the network session requesting section 103 notifies the network session controlling section 104 and thereby the network session controlling section 104 controls so as to establish a network session for all of the network terminal devices participating in the session. A practical example of this procedure will be described in detail in Embodiment 1.2 of the first mode of implementation described hereinafter.

(3) Example 2 of Second session establishment procedure: When it is determined that all of the network terminal devices in the reserved connection information can participate in the network session, it is inquired as to whether or not to start establishing a session for all of the high-priority network terminal devices, and a reply is returned from at least one of all the high-priority network terminal devices to the effect that it is possible to start establishing a session, whereupon the network session requesting section 103 notifies the network session controlling section 104 and thereby the network session controlling section 104 controls so as to establish a network session for all of the network terminal devices participating in the session. A practical example of this procedure will be described in detail in Embodiment 1.3 of the first mode of implementation described hereinafter.

(4) Example 3 of Second session establishment procedure: When it is determined that all of the high-priority network terminal devices in the reserved connection information can participate in the network session, the network session requesting section 103 notifies the network session controlling section 104 and thereby the network session controlling section 104 controls so as to establish a network session for all of the network terminal devices participating in the session. A practical example of this procedure will be described in detail in Embodiment 1.4 of the first mode of implementation described hereinafter.

(5) Example 4 of Second session establishment procedure: When it is determined that all of the high-priority network terminal devices in the reserved connection information can participate in the network session, it is inquired as to whether or not to start establishing a session for all of the high-priority network terminal devices, and a reply is returned from all of the high-priority network terminal devices to the effect that it is possible to start establishing a session, whereupon the network session requesting section 103 notifies the network session controlling section 104 and thereby the network session controlling section 104 controls so as to establish a network session for all of the network terminal devices participating in the session. A practical example of this procedure will be described in detail in Embodiment 1.5 of the first mode of implementation described hereinafter.

(6) Example 5 of Second session establishment procedure: When it is determined that all of the high-priority network terminal devices in the reserved connection information can participate in the network session, it is inquired as to whether or not to start establishing a session for all of the high-priority network terminal devices, and a reply is returned from at least one of all of the high-priority network terminal devices to the effect that it is possible to start establishing a session, whereupon the network session requesting section 103 notifies the network session controlling section 104 and thereby the network session controlling section 104 controls so as to establish a network session for all of the network terminal devices participating in the session. A practical example of this procedure will be described in detail in Embodiment 1.6 of the first mode of implementation described hereinafter.

As described above, when having been instructed by the network session requesting section 103 to establish a network session, the network session controlling section 104 sends an instruction together with parameters necessary for establishing the session to the session establishing section 202 of a network terminal device to participate in the network session, so as to establish a session with the session data relaying section 403.

The session establishing section 202 establishes a session with the session data relaying section 403 on the basis of the parameter received from the network session controlling section 104 and stores the information of the network session into the node session information database 302.

Second Mode of Implementation

A second mode of implementation of the present invention will next be described with reference to FIG. 31.

In the first mode of implementation described previously, the network terminal device detects its own status, and the network administration device looks up the detected status. In contrast, the second mode of implementation differs from the first mode of implementation in that the status of the network terminal devices or the users thereof is administrated by a session establishment information administration device that is independent of the network terminal devices and network administration device, and the network administration device looks up the administrated status, whereby it is ascertained whether or not the reservation condition of the reserved connection information is satisfied. Other elements and their arrangement thereof are the same as those of the first mode of implementation.

System Structure

Figure 31:
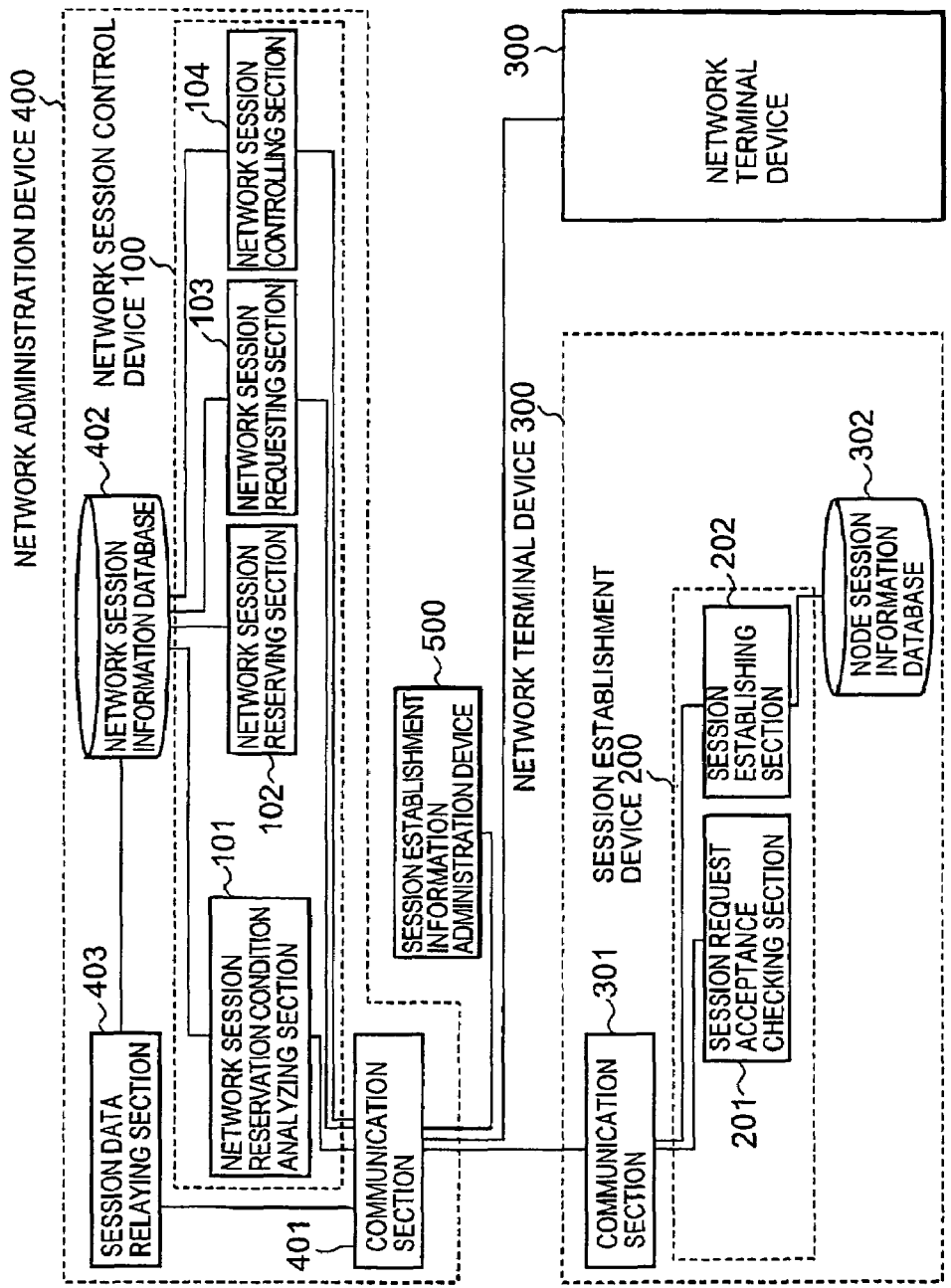
FIG. 31 is a diagram depicting the structure of a second mode of implementation of the present invention.

As shown in FIG. 31, a network session control system according to the second mode of implementation of the present invention is provided with a session establishment information administration device 500 involved in administrating information for determining whether or not a network terminal device 300 or user thereof can participate in a network session.

The network administration device 400 is provided with a communication section 401 for handling communication with the network terminal device 300, a network session information database 402 for storing administration information relating to a reserved or already created network session, a session data relaying section 403 for relaying data communicated in the network session, a network session reservation condition analyzing section 101 involved in analyzing reservation instruction information for a desired network session and registering the reserved connection information of the network session in the network session information database 402, a network session reserving section 102 for reserving the construction of a network session by confirming the reserved connection information registered by the network session reservation condition analyzing section 101, a network session requesting section 103 for satisfying a network session reservation condition based on information received from the session establishment information administration device 500 and issuing a request to participate in the network session if such a condition is satisfied, and a network session controlling section 104 for performing control such that a network session is established with the network terminal device 300.

The network terminal device 300 is provided with a communication section 301 for handling communication with the network administration device 400 and other network terminal devices 300, a node session information database 302 for storing information relating to a network session in which the network terminal device 300 is participating, a session request acceptance checking section 201 for determining whether or not to accept the session establishment request received from the network session requesting section 103 and, when acceptable, sending a reply, and a session establishing section 202 for establishing a session according to an instruction received from the network session controlling section 104.

The network session reservation condition analyzing section 101, network session reserving section 102, network session requesting section 103, network session controlling section 104, communication section 401, and session data relaying section 403 on the network administration device 400 can be carried out by a computer constituting the network administration device 400 and a program for the administration device. The program for the administration device is stored on and provided from a magnetic disk or other computer-readable recording medium (not pictured), the program is read by the computer constituting the network administration device 400 at the time of startup or at another time, and the functional means 101, 102, 103, 104, 401, and 403 on the computer are carried out by controlling the operation of the computer.

The functional means provided by the session request acceptance checking section 201, session establishing section 202, and communication section 301 on each of the network terminal devices 300 can also be carried out by a computer constituting the network terminal device 300 and a program used by the terminal. The program used by the terminal is stored on and provided from a magnetic disk or other computer-readable recording medium (not pictured), the program is read by the computer constituting the network terminal device 300 at the time of startup or at another time, and the functional means 201, 202, and 301 on the computer are carried out by controlling the operation of the computer.

Operation

The flow of processing in the second mode of implementation of the present invention thus configured is generally as described below.

First, the network session reservation condition analyzing section 101 analyzes reservation instruction information received from a reservation registrant and registers in the network session information database 402 reserved connection information that contains the communication address of the network terminal device for which a network session is to be established, the priority of establishing a session for each network terminal device, and a parameter composed of the communication address of the session data relaying section 403, the protocol and the port number used by the aforementioned network session. The status of the reserved connection information at the time of this registration is "awaiting reservation," and the network session reservation condition analyzing section 101 changes the status of the reserved connection information registered in the network session information database 402 to "being reserved," whereby the network session reserving section 102 confirms the reservation and reserves the construction of a network session.

The network session requesting section 103 then requests information necessary for determining whether a reservation condition is satisfied from the session establishment information administration device 500 and checks whether the reservation condition is indeed satisfied. If all the necessary network terminal devices satisfy the reservation condition, the network session requesting section 103 verifies that a session has been established in the session request acceptance checking section 201 of the network terminal devices as needed, and passes this verification on to the network session controlling section 104 so as to establish a network session.

The processing of the network session requesting section 103 in a case in which there is no difference in session establishment priority in the reserved connection information among the plurality of network terminal devices differs from that of a case in which there is a difference in priority in the reserved connection information.

For reserved connection information with no difference in priority, control is executed for establishing a network session according to a first session establishment procedure that treats the network terminal devices of all users equally. For reserved connection information with a difference in priority, control is executed for establishing a network session according to a second session establishment procedure that treats with priority the network terminal devices of those high-priority users. Procedures such as those described in (1) through (6) of the first mode of implementation maybe used for the first and second session establishment procedures. Practical examples of procedures (1) through (6) will be described in Embodiments 2.1 through 2.6 of the second mode of implementation described later.

The network session controlling section 104, having been instructed as described above by the network session requesting section 103 to establish a network session, sends an instruction together with a parameter necessary for establishing the session to the session establishing section 202 of a network terminal for forming a network session, so as to establish a session with the session data relaying section 403.

The session establishing section 202 establishes a session with the session data relaying section 403 and stores the information of the network session in the node session information database 302 on the basis of the parameter received from the network session controlling section 104.

Third Mode of Implementation

A third mode of implementation of the present invention will next be described with reference to FIG. 35. The third mode of implementation differs in comparison to the previously described first mode of implementation in that a procedure is added for confirming participation in the network session to the user of a network terminal device that is scheduled to participate when the network session is reserved. Other elements and arrangement thereof are the same as in the first mode of implementation.

System Structure

Figure 35:
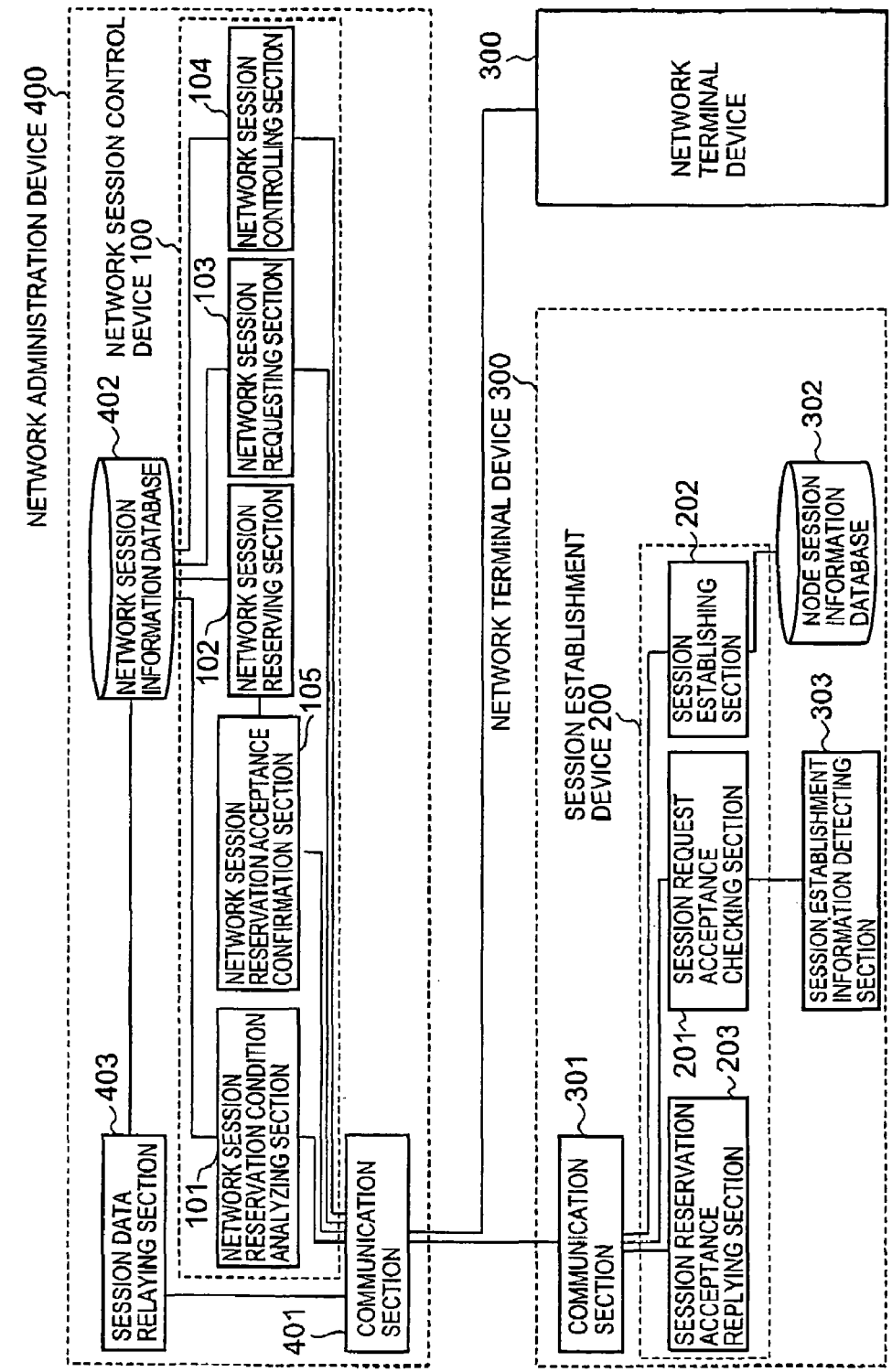
FIG. 35 is a diagram depicting the structure of a third mode of implementation of the present invention.

As shown in FIG. 35, in a network session control system according to the third mode of implementation of the present invention, the network administration device 400 is provided with a communication section 401 for handling communication with a network terminal device 300, a network session information database 402 for storing administration information relating to a reserved or already created network session, a session data relaying section 403 for relaying data communicated in the network session, a network session reservation condition analyzing section 101 involved in analyzing reservation instruction information for a desired network session and registering the reserved connection information of the network session in the network session information database 402, a network session reservation acceptance confirmation section 105 for issuing confirmation to the network terminal of the intent to participate in the network session when a network session is reserved, a network session reserving section 102 for reserving the construction of a network session by confirming the reserved connection information registered by the network session reservation condition analyzing section 101 when intent to participate is confirmed for all members by the network session reservation acceptance confirmation section 105, a network session requesting section 103 for determining whether a network session reservation condition is satisfied and issuing a request to participate in the network session if such a condition is satisfied, and a network session controlling section 104 for performing control such that a network session is established with the network terminal device 300.

The network terminal device 300 is provided with a communication section 301 for handling communication with the network administration device 400 and other network terminal devices 300, a node session information database 302 for storing information relating to a network session in which the parent network terminal device 300 is participating, a session establishment information detecting section 303 involved in detecting information for evaluating whether or not the parent network terminal device 300 is capable of establishing the requested network session, a session request acceptance checking section 201 for evaluating based on the detected results of the session establishment information detecting section 303 whether or not to accept the session establishment request from the network session requesting section 103 and issuing a reply, and a session establishing section 202 for establishing a session according to an instruction from the network session controlling section 104.

The network session reservation condition analyzing section 101, network session reserving section 102, network session requesting section 103, network session controlling section 104, network session reservation acceptance confirmation section 105, communication section 401, and session data relaying section 403 on the network administration device 400 can be carried out by a computer constituting the network administration device 400 and a program for the administration device. The program for the administration device is stored on and provided from a magnetic disk or other computer-readable recording medium (not pictured), the program is read by the computer constituting the network administration device 400 at the time of startup or at another time, and the functional means 101, 102, 103, 104, 105, 401, and 403 on the computer are carried out by controlling the operation of the computer.

The functional means provided by the session request acceptance checking section 201, session establishing section 202, session reservation acceptance replying section 203, communication section 301, and session establishment information detecting section 303 on each of the network terminal devices 300 can also be carried out by a computer constituting the network terminal device 300 and a program used by the terminal. The program used by the terminal is stored on and provided from a magnetic disk or other computer-readable recording medium (not pictured), the program is read by the computer constituting the network terminal device 300 at the time of startup or at another time, and the functional means 201, 202, 203, 301, and 303 on the computer are carried out by controlling the operation of the computer.

Operation

The flow of processing in the third mode of implementation of the present invention with such a configuration is generally as described below.

First, the network session reservation condition analyzing section 101 analyzes reservation instruction information received from a reservation registrant and registers in the network session information database 402 reserved connection information that contains the communication address of the network terminal device for which a network session is to be established, the priority of establishing a session for each network terminal device, and a parameter composed of the communication address of the session data relaying section 403, the protocol and port number used by the aforementioned network session. The status of the reserved connection information at the time of this registration is "awaiting reservation."

Using the network session reservation acceptance confirmation section 105, the network session reserving section 102 issues an inquiry to the session reservation acceptance replying section 203 of all the network terminal devices 300 included in the reserved connection information that are awaiting reservation as to whether or not to accept a network session reservation. The session reservation acceptance replying section 203 of each of the network terminal devices 300 gives a reply to the inquiry of the network session reservation acceptance confirmation section 105 as to whether or not a session reservation is accepted. When a reply that a reservation will be accepted is received from the session reservation acceptance replying section 203 in all of the network terminal devices constituting the network session, the network session reservation acceptance confirmation section 105 passes this information on to the network session reserving section 102.

In a case in which there is notification from the network session reservation acceptance confirmation section 105 that the session reservation acceptance replying section 203 in all of the network terminal devices constituting the network session have accepted the network session, the network session reserving section 102 changes the status of the reserved connection information registered in the network session information database 402 by the network session reservation condition analyzing section 101 to "being reserved," whereby construction of a network session is confirmed and reserved.

A network session is not reserved if the network session reservation is not accepted by all of the network terminal devices.

The network session requesting section 103 then issues an inquiry to the session request acceptance checking section 201 of the network terminal device as to whether or not a network session reservation condition is satisfied. The session request acceptance checking section 201 looks up the information detected by the session establishment information detecting section 303, verifies whether or not a reservation condition is satisfied, and issues a response to the network session requesting section 103. The network session requesting section 103 then verifies whether or not a reservation condition is satisfied for all the necessary network terminal devices, and if the reservation condition is satisfied for all of the network terminal devices, verifies the start of session establishment to the session request acceptance checking section 201 of the network terminal device as needed, and then passes this verification on to the network session controlling section 104 so as to establish a network session.

The processing of the network session requesting section 103 in a case in which there is no difference in session establishment priority in the reserved connection information among the plurality of network terminal devices differs from that of a case in which there is a difference in priority in the reserved connection information. For reserved connection information with no difference in priority, control is executed for establishing a network session according to a first session establishment procedure that treats the network terminal devices of all users equally. For reserved connection information with a difference in priority, control is executed for establishing a network session according to a second session establishment procedure that treats with priority the network terminal devices of those high-priority users. Procedures such as those described in (1) through (6) of the first mode of implementation may be used for the first and second session establishment procedures. Practical examples of procedures (1) through (6) will be described in Embodiments 3.1 through 3.6 of the third mode of implementation described hereinafter.

The network session controlling section 104, having been instructed as described above by the network session requesting section 103 to establish a network session, sends an instruction together with a parameter necessary for establishing a session to the session establishing section 202 of a network terminal for forming a network session, so as to establish a session with the session data relaying section 403.

The session establishing section 202 establishes a session with the session data relaying section 403 and stores the information of the network session in the node session information database 302 on the basis of the parameter received from the network session controlling section 104.

Four Mode of Implementation

A fourth mode of implementation of the present invention will next be described with reference to FIG. 38. The fourth mode of implementation differs from the previously described third mode of implementation. More specifically, the network terminal devices in the third mode of implementation detect their own status and the network administration device looks up the detected status, whereas in the fourth mode of implementation, the status of the network terminal devices or users thereof is administrated by a session establishment information administration device that is independent of the network terminal devices and network administration device, and the network administration device looks up the administrated status, whereby it is ascertained whether or not a reservation condition is satisfied in the reserved connection information. Other elements and arrangement thereof are the same as in the third mode of implementation.

System Structure

Figure 38:
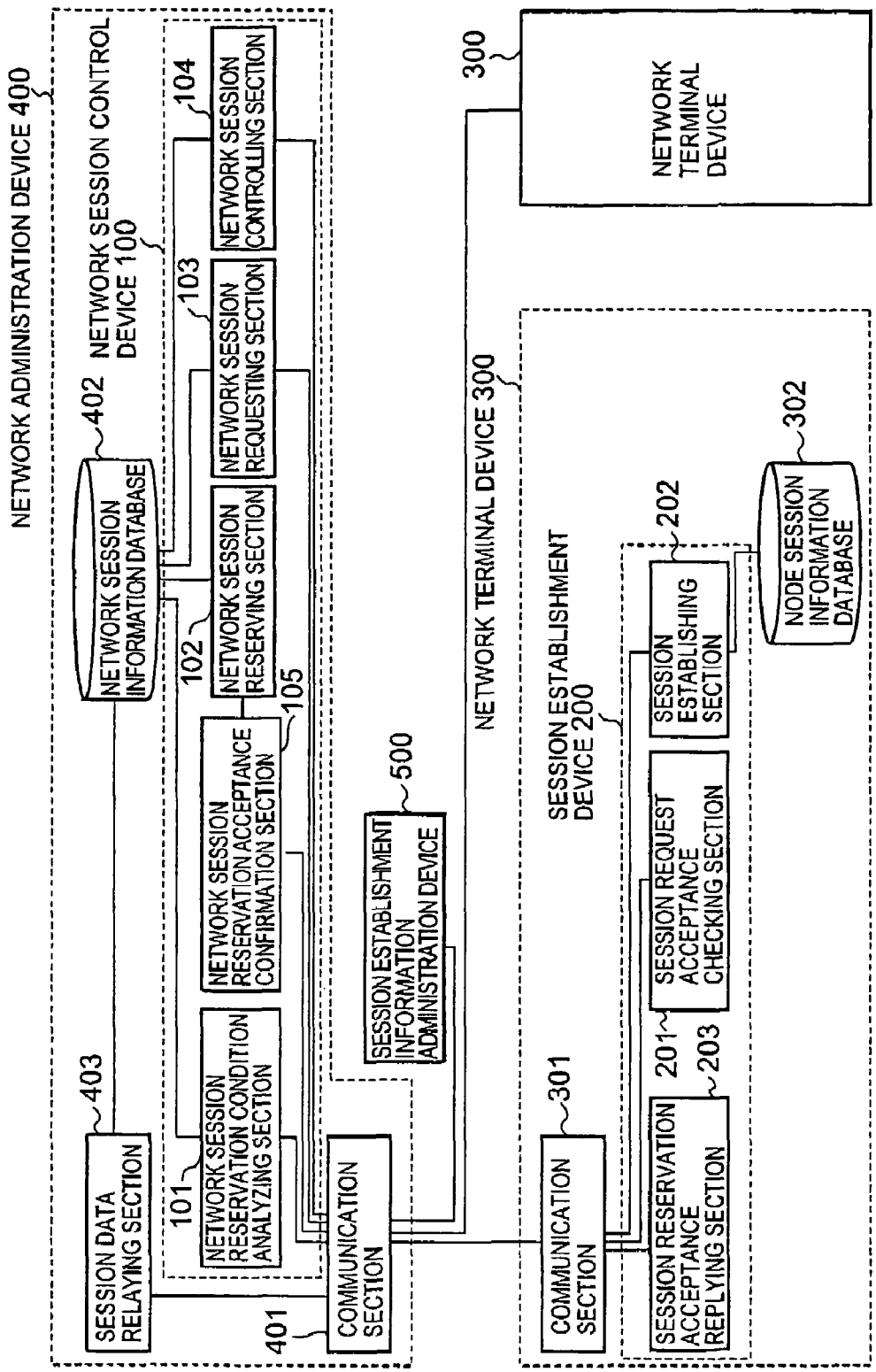
FIG. 38 is a diagram depicting the structure of a fourth mode of implementation of the present invention.

As shown in FIG. 38, a network session control system according to the fourth mode of implementation is provided with a session establishment information administration device 500 involved in administrating information for evaluating whether or not a network terminal device 300 or user thereof can participate in a network session.

The network administration device 400 is provided with a communication section 401 for handling communication with the network terminal device 300, a network session information database 402 for storing administration information relating to a reserved or already created network session, a session data relaying section 403 for relaying data communicated in the network session, a network session reservation condition analyzing section 101 involved in analyzing reservation instruction information for a desired network session and registering the reserved connection information of the network session in the network session information database 402, a network session reservation acceptance confirmation section 105 for issuing confirmation to the network terminal of the intent to participate in the network session when a network session is reserved, a network session reserving section 102 for reserving the construction of a network session by confirming the reserved connection information registered by the network session reservation condition analyzing section 101 when intent to participate is confirmed for all members by the network session reservation acceptance confirmation section 105, a network session requesting section 103 for determining whether a network session reservation condition is satisfied, based on information from the session establishment information administration device 500 and issuing a request to participate in the network session if such a condition is satisfied, and a network session controlling section 104 for performing control such that a network session is established with the network terminal device 300.

The network terminal device 300 is provided with a communication section 301 for handling communication with the network administration device 400 and other network terminal devices 300, a node session information database 302 for storing information relating to a network session in which the parent network terminal device 300 is participating, a session request acceptance checking section 201 for evaluating based on the detected results of the session establishment information detecting section 303 whether or not to accept the session establishment request from the network session requesting section 103 and issuing a reply, and a session establishing section 202 for establishing a session according to an instruction from the network session controlling section 104.

The network session reservation condition analyzing section 101, network session reserving section 102, network session requesting section 103, network session controlling section 104, network session reservation acceptance confirmation section 105, communication section 401, and session data relaying section 403 on the network administration device 400 can be carried out by a computer constituting the network administration device 400 and a program for the administration device. The program for the administration device is stored on and provided from a magnetic disk or other computer-readable recording medium (not pictured), the program is read by the computer constituting the network administration device 400 at the time of startup or at another time, and the functional means 101, 102, 103, 104, 105, 401, and 403 on the computer are carried out by controlling the operation of the computer.

The functional means provided by the session request acceptance checking section 201, session establishing section 202, session reservation acceptance replying section 203, and communication section 301 on each of the network terminal devices 300 can also be carried out by a computer constituting the network terminal device 300 and a program used by the terminal. The program used by the terminal is stored on and provided from a magnetic disk or other computer-readable recording medium (not pictured), the program is read by the computer constituting the network terminal device 300 at the time of startup or at another time, and the functional means 201, 202, 203, and 301 on the computer are carried out by controlling the operation of the computer.

Operation

The flow of processing in the fourth mode of implementation of the present invention with such a configuration is generally as described below.

First, the network session reservation condition analyzing section 101 analyzes reservation instruction information received from a reservation registrant and registers in the network session information database 402 reserved connection information that contains the communication address of the network terminal device for which a network session is to be established, the priority of establishing a session for each network terminal device, and a parameter composed of the communication address of the session data relaying section 403 and the protocol and port number used by the aforementioned network session. The status of the reserved connection information at the time of this registration is "awaiting reservation."

Using the network session reservation acceptance confirmation section 105, the network session reserving section 102 issues an inquiry to the session reservation acceptance replying section 203 of all the network terminal devices 300 included in the reserved connection information that are awaiting reservation as to whether or not to accept a network session reservation. The session reservation acceptance replying section 203 of each of the network terminal devices 300 gives a reply to the inquiry of the network session reservation acceptance confirmation section 105 as to whether or not a session reservation is accepted. When a reply that a reservation will be accepted is received from the session reservation acceptance replying section 203 in all of the network terminal devices constituting the network session, the network session reservation acceptance confirmation section 105 passes this information on to the network session reserving section 102.

In a case in which there is notification from the network session reservation acceptance confirmation section 105 that the session reservation acceptance replying section 203 in all of the network terminal devices constituting the network session have accepted the network session, the network session reserving section 102 changes the status of the reserved connection information registered in the network session information database 402 by the network session reservation condition analyzing section 101 to "being reserved," whereby construction of a network session is confirmed and reserved. A network session is not reserved if the network session reservation is not accepted by all of the network terminal devices.

The network session requesting section 103 then issues a request to the session establishment information administration device 500 for information necessary to determine whether or not a network session reservation condition is satisfied, and determines whether or not the reservation condition is satisfied. If the reservation condition is satisfied for all of the network terminal devices, then the network session requesting section 103 confirms the start of session establishment for the session request acceptance checking section 201 of the network terminal device as needed, and then passes this verification on to the network session controlling section 104 so as to establish a network session.

The processing of the network session requesting section 103 in a case in which there is no difference in session establishment priority in the reserved connection information among the plurality of network terminal devices differs from that of a case in which there is a difference in priority in the reserved connection information. For reserved connection information with no difference in priority, control is executed for establishing a network session according to a first session establishment procedure that treats the network terminal devices of all users equally. For reserved connection information with a difference in priority, control is executed for establishing a network session according to a second session establishment procedure that treats with priority the network terminal devices of those high-priority users. Procedures such as those described in (1) through (6) of the first mode of implementation may be used for the first and second session establishment procedures. Practical examples of procedures (1) through (6) will be described in Embodiments 4.1 through 4.6 of the fourth mode of implementation described hereinafter.

The network session controlling section 104, having been instructed as described above by the network session requesting section 103 to establish a network session, sends an instruction together with a parameter necessary for establishing a session to the session establishing section 202 of a network terminal for forming a network session, so as to establish a session with the session data relaying section 403.

The session establishing section 202 establishes a session with the session data relaying section 403 and stores the information of the network session in the node session information database 302 on the basis of the parameter received from the network session controlling section 104.

Embodiments

Embodiments for each mode of implementation of the present invention will next be described in detail with reference to the drawings.

1. First Mode of Implementation

Embodiment 1.1

Figure 5:
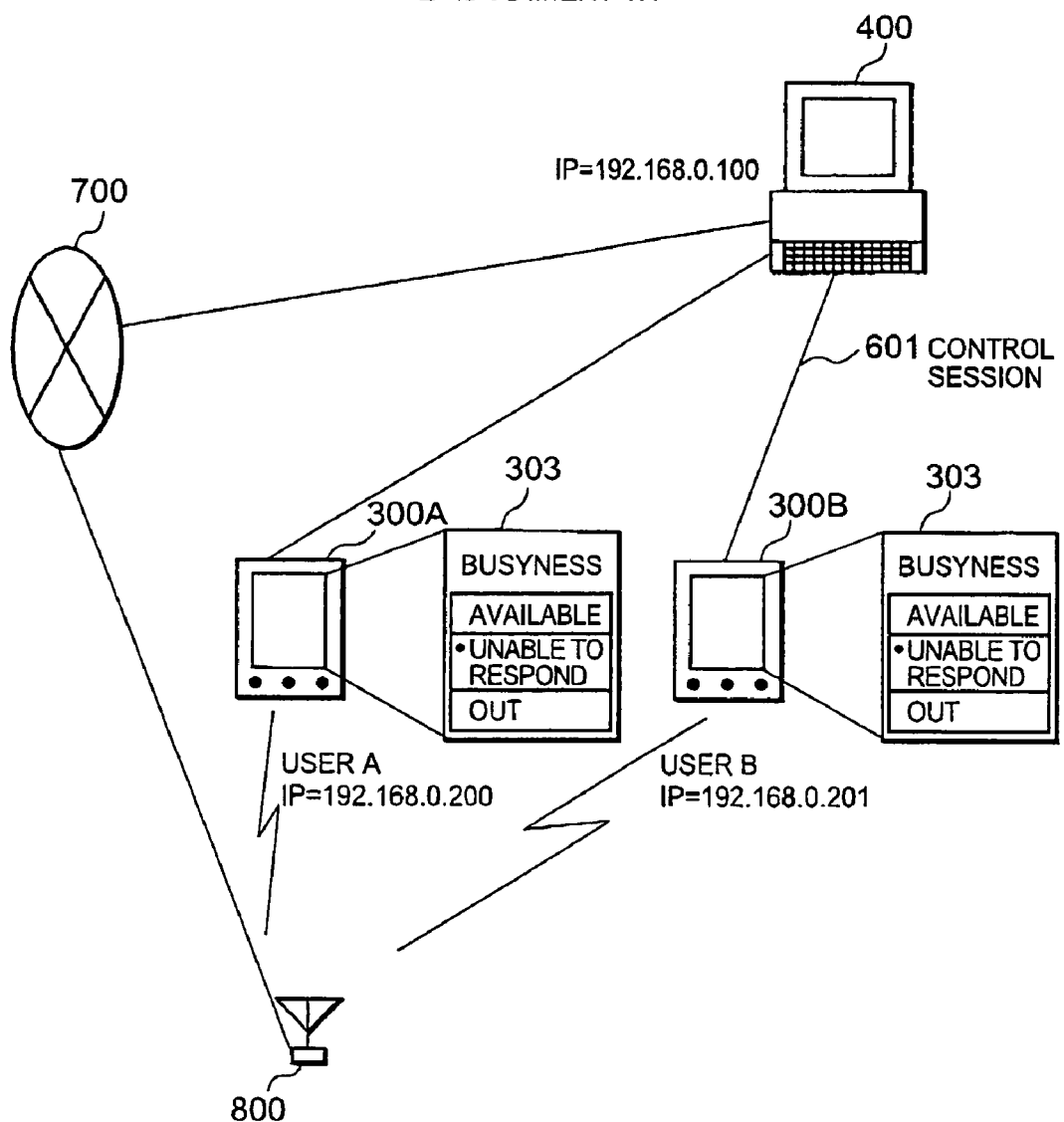
FIG. 5 is a diagram depicting a first state of a system according to Embodiment 1.1 of the first mode of implementation.

As shown in FIG. 5, a network administration device 400 is connected to a local area network (LAN) 700 using a wired Ethernet. A wireless access point 800 is also connected to the LAN 700. Network terminal devices 300A and 300B are connected to the LAN 700 via the wireless access point 800, and the network administration device 400 and network terminal devices 300A and 300B are configured so as to be capable of communication with each other. A technique that is currently in widespread use in offices and homes may be used without modification for this type of network connection technique, and detailed description thereof is omitted.

In the present Embodiment 1.1, the constituent elements of the network administration device 400 are implemented by software operating on the network administration device 400. The constituent elements of the network terminal devices 300A and 300B are also actuated by software operating in the same manner on a mobile terminal.

The application providing section 307 on the network terminal devices 300A and 300B (see FIG. 1) provide a telephone service to a user. This type of telephone service on an IP network can easily be performed by combining H.323, which is recommended as a standard by the International Telecommunication Union (ITU); SIP, whose standardization is being advanced by the IETF; or another session control protocol with VoIP technology. SIP, H.323, and VoIP technology can all be easily used by referring to publicly disclosed technological specifications, so the details thereof are omitted herein.

Figure 4:
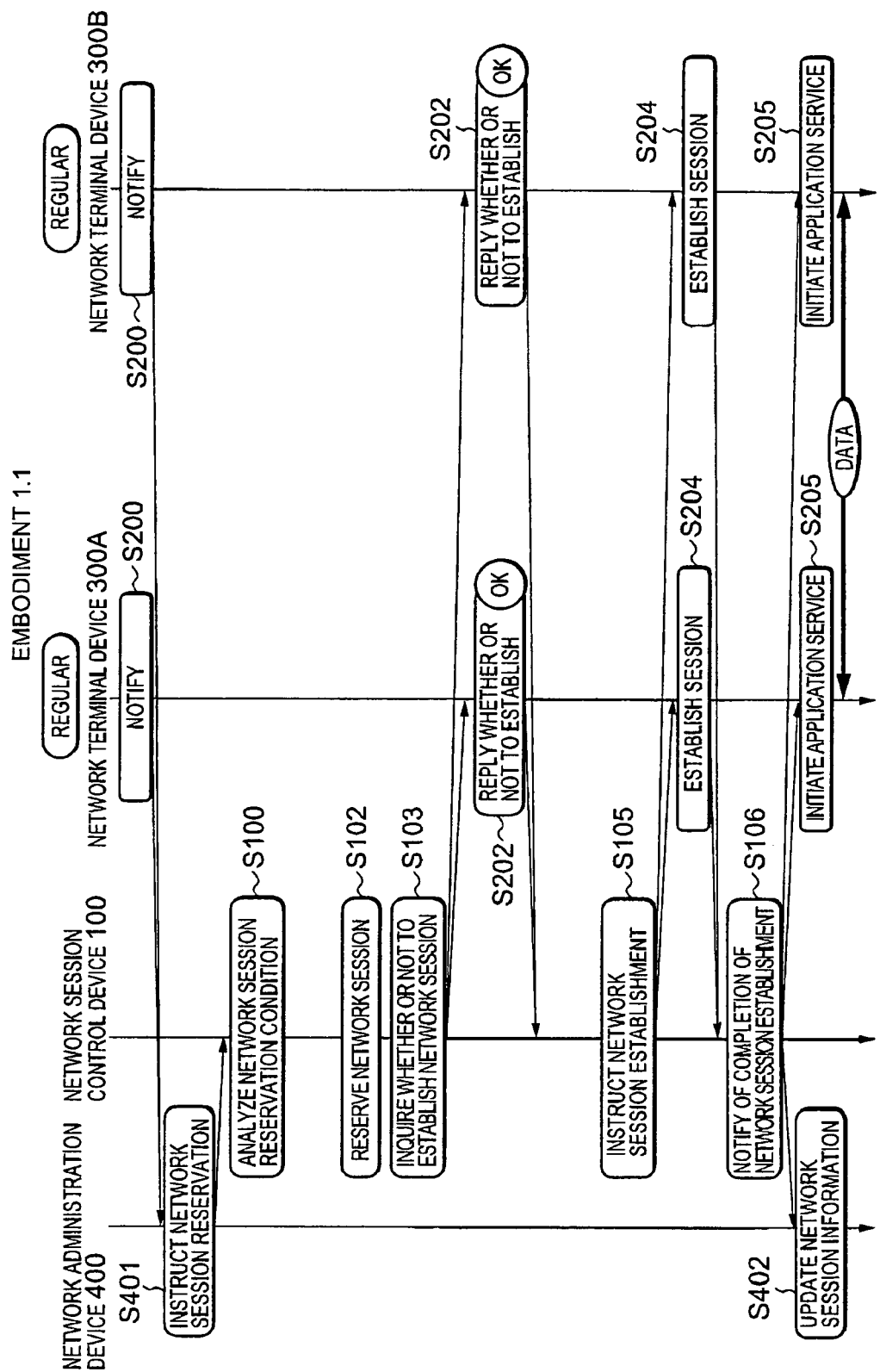
FIG. 4 is a sequence diagram depicting the flow of processing according Embodiment 1.1 of the first mode of implementation.

FIG. 4 depicts the flow of processing in Embodiment 1.1 of the first mode of implementation, which describes a network session control system operating between coworkers, friends, or other users who have an equal relationship. As shown in step S202 in FIG. 4, a network session is established when all of the network terminal devices 300 are able to participate in the network session.

Figure 8:
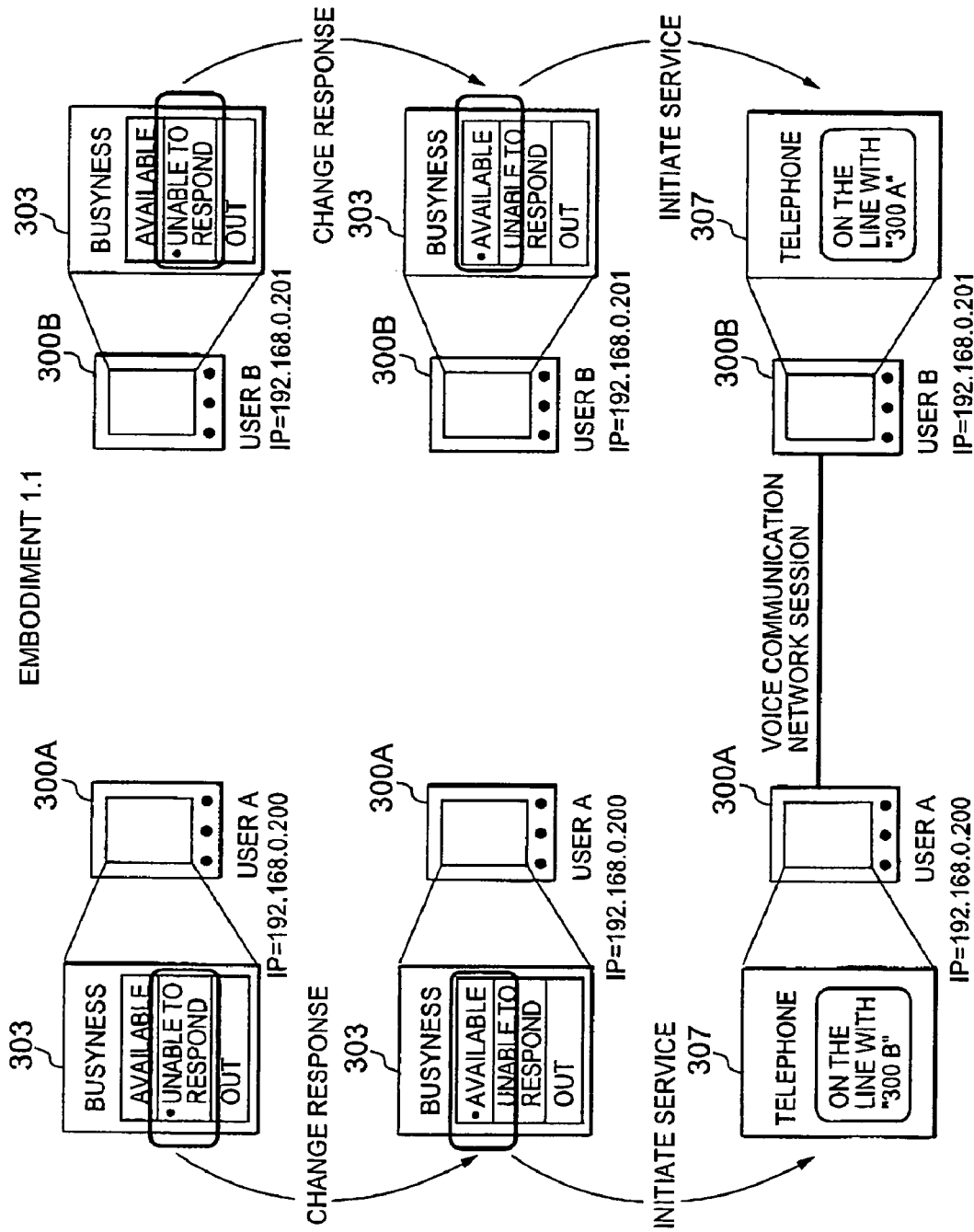
FIG. 8 is a diagram depicting a service providing flow according to Embodiment 1.1 of the first mode of implementation.

User A inputs his or her level of busyness on the network terminal device 300A that he or she is using, and user B inputs his or her level of busyness on the network terminal device 300B that he or she is using (see top row in FIG. 8). When user A and user B are both "available" and are able to make a telephone call (middle row in FIG. 8), a network session for voice communication is automatically established, and user A and user B are able to make a call (bottom row in FIG. 8).

Initially, host names, IP addresses, or the like are allocated to the network administration device 400 and the network terminal devices 300A and 300B, respectively. Such allocation can easily be performed using a DNS (Domain Name Service) or DHCP (Dynamic Host Configuration Protocol).

In FIG. 4, first, the session establishing section 202 in each of the network terminal devices 300A and 300B notifies the network administration device 400 of information about its own IP address (step S200). A control session 60L is thereby established using a socket interface between the network session control device 100 in the network administration device 400 and the session establishment device 200 in the network terminal devices 300A and 300B.

The network administration device 400 to be registered can easily be discovered by statically storing the host name of the network administration device 400 in the network terminal device 300. A configuration may also be adopted whereby the network administration device 400 is dynamically detected using a procedure in which each of the network terminal devices 300 transmits a query packet by broadcasting or the like, and the network administration device 400 responds with its own IP address.

The control session 601 is provided for the sake of convenience in describing the communication of network session control data between the network administration device 400 and the network terminal devices 300, and any configuration may be used insofar as the network session control data can be communicated between the two parties.

When having received reservation instruction information from the network terminal device 300A or 300B via a control session, the network administration device 400 transmits this information to the network session reservation condition analyzing section 101 and gives an instruction for a reservation (step S401).

The network session reservation condition analyzing section 101 analyzes the reservation instruction information and registers a reservation to establish a network session for telephone between the network terminal device 300A and the network terminal device 300B by writing to the network session information database 402 reserved connection information that contains the IP addresses of the network terminal devices 300A and 3008 to participate in the network session (step S100).

In the present Embodiment 1.1, it is assumed that, when user A of the network terminal device 300A makes a call to user B of the network terminal device 3008 but is unable to connect, the network terminal device 300A transmits to the network administration device 400 reservation instruction information containing the IP address of its own, the IP address of the user B, and the protocol and port number used so that a network session will be automatically established to allow communication between users A and B when both users are able to respond. However, the method of issuing an instruction for reserving the establishment of a network session in the present invention is not limited to the above-mentioned method. For example, a configuration may also be adopted whereby a third party other than user A and user B, who are the users of the reserved network session to be reserved, issues a reservation instruction. Also, a configuration is adopted in the present Embodiment 1.1 whereby the network session reservation condition analyzing section 101 registers the reserved connection information in the network session information database 402, but a configuration may also be adopted whereby a separate means or external device provided to the network administration device 400 registers the reserved connection information in the network session information database 402.

Figure 9:
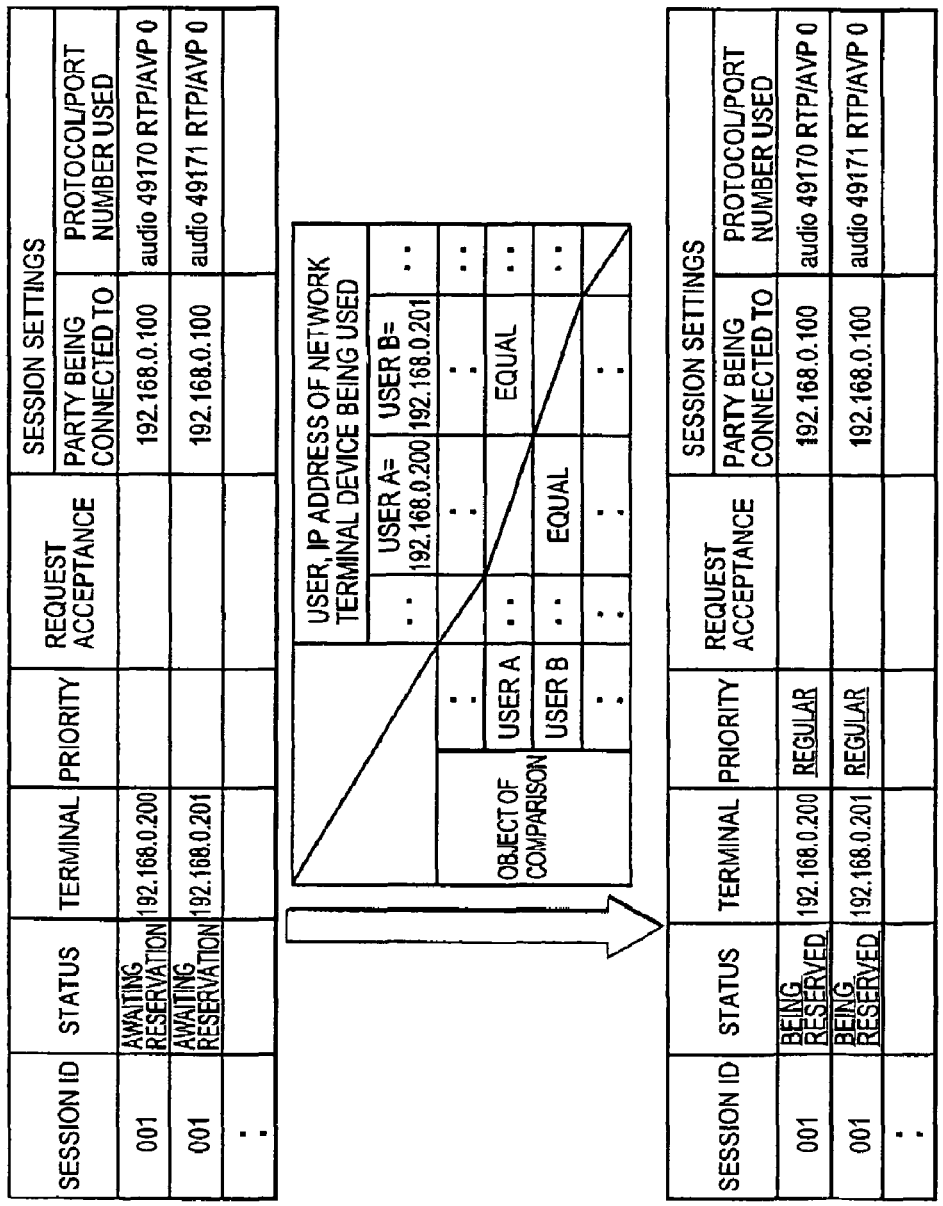
FIG. 9 is a diagram depicting an example of the session information database in Embodiment 1.1 of the first mode of implementation.

An example of the data structure in the network session information database 402 is shown in FIG. 9. The network session information database 402 maintains all of the information for the network sessions being administrated by the network administration device 400. Accordingly, any constituent element in the network administration device 400 can access information regarding a network session including the network terminal device 300 that constitutes the network session, the status (reserved or not/established and in use or not/is no longer necessary and should be canceled, or the like) of the network session, the party being connected to by the session, and the like by the referring to the network session information database 402.

The top row in FIG. 9 shows the session information in the network session information database 402 immediately after the network session reservation condition analyzing section 101 has analyzed and registered the reservation instruction information. Each record corresponds to the session of a single network terminal device, and is composed of the following fields: session ID; status; terminal; priority; request acceptance; and session settings (party being connected to, protocol/port number used).

The session ID field indicates identification for identifying each network session, and a unique ID is allocated for each piece of reserved connection information by the network session reservation condition analyzing section 101. In other words, a set of records having the same session ID constitutes a single piece of reserved connection information.

The status field indicates the status of each network session, which is one of the values "awaiting reservation," "being reserved," "reserved," "established," and the like. The value is set by the network session reservation condition analyzing section 101 to "awaiting reservation" immediately after registration.

The terminal field indicates IP addresses of the network terminal devices specified in the reservation instruction information. Priority is a parameter of the session establishment procedure for the network terminal devices participating in the network session, and takes either of the values "regular" or "priority." As described hereinafter, this priority is set by the network session reservation condition analyzing section 101 on the basis of the relationship between users.

The request acceptance field indicates a status that is set depending on whether or not a corresponding network terminal device is permitted to accept a request to establish a session. This value is "NULL," for example, immediately after registration.

The party being connected to during session setting is automatically set to the IP address of the session data relaying section 403 by the network session reservation condition analyzing section 101.

The protocol/port number used during session setting is set to the protocol and port number specified in the reservation instruction information.

After registration of such reserved connection information as is shown in the top row of FIG. 9, the network session reservation condition analyzing section 101 analyzes the sessions of network terminal devices whose status is "awaiting reservation" to set the priority in the session establishment procedure based on the relationship between users of a plurality of network terminal devices 300 having the same session ID (in other words, on the same network session), and updates their session statuses from "awaiting reservation" to "being reserved" (step S100).

The network session reservation condition analyzing section 101 maintains a table such as shown in the middle row of FIG. 9, in which all of the network terminal devices 300 using the network administration device 400, their users, and the relationship between the users are statically stored in advance. The network session reservation condition analyzing section 101 references this table, verifies the relationship between the users, and sets the priority in the session establishment procedure.

According to the table in the middle row of FIG. 9, it can be seen from the column having the IP address "192.168.0.200" of the terminal identified by the first record in the table as shown in the top row of FIG. 9 that the user using that terminal is user A, it can be seen from the column having the IP address "192.168.0.201" of the terminal identified by the second record in the table as shown in the top row of FIG. 9 that the user using that terminal is user B, and it can be seen from the entry "equals" recorded at the intersection of those columns with the rows marked "user A" and "user B" that user A and user B have an equal-status relationship. When users of the network session such as friends or coworkers have an equal relationship, the network session reservation condition analyzing section 101 updates the session information without putting a difference in the priority of establishing a session for the users. Specifically, the priority is set to "regular" as shown in the bottom row of FIG. 9. Also, a configuration may be adopted whereby the network terminal devices 300, their users, and the relationship between the users are dynamically updated using an external database device or the like. A configuration may also be adopted whereby the relationship between users or the priority of establishing a session is explicitly indicated by the reservation instruction information.

When the network session reserving section 102 detects that the contents of the network session information database 402 have changed and identifies a session whose status is "being reserved," its session status is updated to "reserved," and session reservation is completed (step S102 of FIG. 4).

When the network session requesting section 103 detects that the contents of the network session information database 402 have changed and identifies a session whose status is "reserved," it is inquired of the session request acceptance checking section 201 in the network terminal devices 300A and 300B to participate in the network session as to whether or not a network session can be established (step S103 of FIG. 4).

The session request acceptance checking section 201 looks up the information detected by the session establishment information detecting section 303 to determine whether or not a session can be established, and issues a reply to the network session requesting section 103 (step S202 of FIG. 4).

In the present Embodiment 1.1, the session establishment information detecting section 303 detects the status selected by the user from among the options displayed on the screens of the network terminal devices 300A and 300B as shown in FIG. 5. This may directly use technology employed in message exchange systems and other systems known as instant message services (IM). The configuration adopted herein includes three types of selections including "available," which indicates that the party is available; "unable to respond," which indicates that the party's circumstances do not allow him or her to respond; and "out," which indicates that the party is not present, but it is also apparent that a configuration may be adopted in which a user can select from various other states.

If the detected result from the session establishment information detecting section 303 is "available," the session request acceptance checking section 201 sends a reply of "session establishment may be accepted" to the network session requesting section 103, and sends a reply of "session establishment cannot be accepted" if the detected result is "unable to respond" or "out."

Thus, by adopting a configuration whereby the session request acceptance checking section 301 sends solely a reply of the acceptance or rejection of a session acceptance request rather than to a detected result of the session establishment information detecting section 303 as such, the personal information about a user obtained by the session establishment information detecting section 303 can be prevented from being leaked to other devices.

Figure 10:
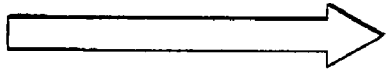
FIG. 10 is a diagram depicting a change of contents of the session information database in Embodiment 1.1 of the first mode of implementation.

The network session requesting section 103 registers a reply from each session request acceptance checking section 201 in the "request acceptance" field of the network session information database 402 and repeatedly performs the steps S103 through S202 until all of the network terminal devices 300 are able to accept the request the top row of FIG. 10 depicts the partway process of session request acceptance in the step S103 and depicts a state in which the network terminal device 300B with the IP address 192.168.0.201 has not yet accepted a request.

Figure 6:
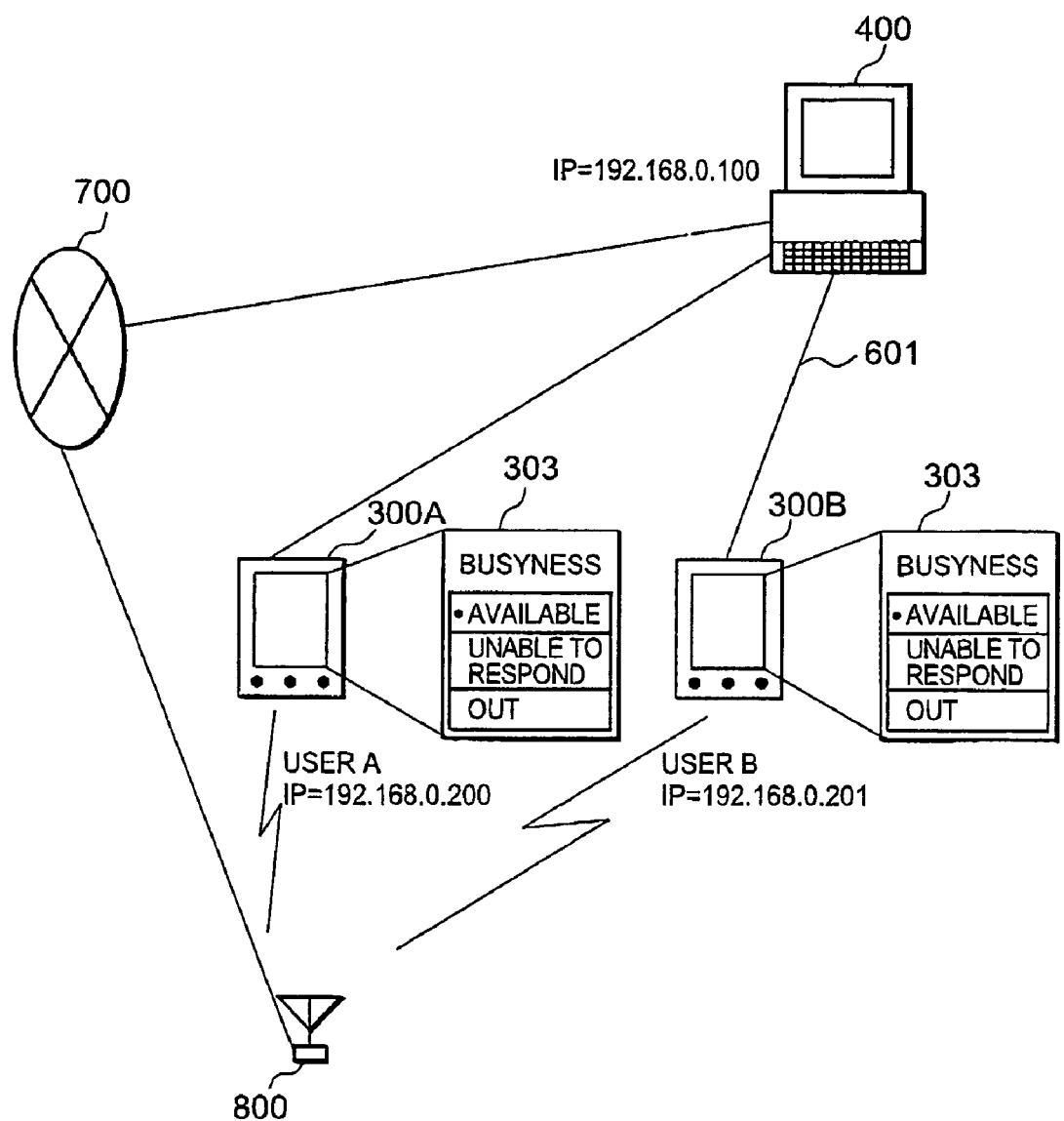
FIG. 6 is a diagram depicting a second state of a system according to Embodiment 1.1 of the first mode of implementation.

The network session controlling section 104 looks up the request acceptance field of the network session information database 402 and confirms that all of the network terminal devices 300 are "able to receive a request" (FIG. 6 and the bottom row of FIG. 10), whereupon an instruction and parameters necessary to establish a session are sent to the session establishing section 202 in the network terminal devices 300 to establish a network session (step S105 of FIG. 4).

In the present Embodiment 1.1, the network terminal devices 300 establish a session with the session data relaying section 403 in the network administration device 400, as shown in FIG. 2. The necessary parameters for this session establishment operation, specifically, the IP address of the session data relaying section 403, the protocol used by the network session, and other information are listed in the network session information database 402 and passed on to the session establishing section 202.

The session connection information is listed in the network session information database 402 as shown in FIG. 10 according to the media information description format of Session Description Protocol (SDP). In FIG. 10, a scenario is described in which the network terminal device 300A with the IP address 192.168.0.200 connects to port number 49170 of the session data relaying section 403 with the IP address 192.168.0.100 and uses the AVP (Audio/Visual Profile) of the RTP (Real Time Protocol) on the UDP (User Datagram Protocol) to exchange 8 KHz monaural PCM modulated voice data to perform voice communication.

SDP is standardized as the technique used by SIP and the like as well as VoIP service and the like, and details thereof are omitted from this description. Also, XML or any other description method may be used for the necessary parameters in this type of session establishment insofar as the types and values of the parameters can be distinguished.

The session establishing section 202 in a network terminal device 300 receives an instruction to establish a session and necessary parameters from the network session controlling section 104, whereupon a session 602 for data communication with the session data relaying section 403 is established and the node session information database 302 is updated using the parameters received from the network session controlling section 104, the port number, and IP address that the device itself is using for the data communication session At the same time, the session establishing section 202 notifies the network session controlling section 104 that a session has been successfully established (step S204 of FIG. 4).

All of the network session information used by the network terminal device 300 is stored in the node session information database 302 in the same format as the network session information database 402.

The network session controlling section 104 receives the reply from the session establishing section 202 in the network terminal devices 300 that a session has been successfully established, and updates the status in the network session information database 402 to "established." When all of the necessary sessions are established, the session establishing section 202 in the network terminal devices 300 are notified that a network session has been established (step S106 of FIG. 4).

The session establishing section 202 receives notification that a network session has been established, whereupon the status in the node session information database 302 is updated to "established," and an application service is started by the application providing section 307 (step S205 of FIG. 4).

The session data relaying section 403 provides data communication within the network session by transferring data packets received from a data communication session 602 to a data communication sessions 602 that constitutes another network session connected to the session data relaying section 403.

Figure 7:
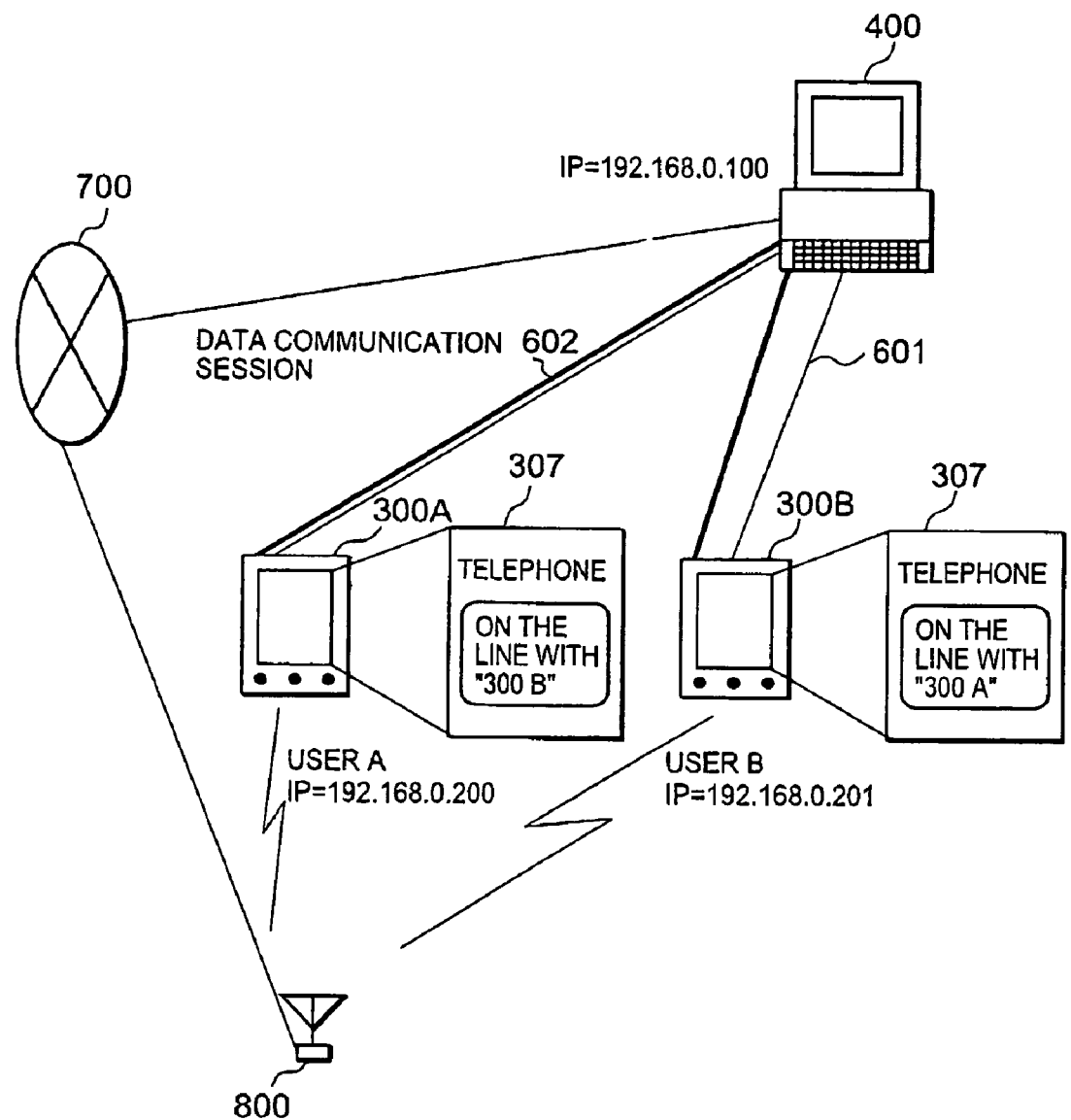
FIG. 7 is a diagram depicting a third state of a system according to Embodiment 1.1 of the first mode of implementation.

FIG. 7 depicts a state in which a telephone service is activated on the network terminal devices 300A and 300B after a network session is established in the present Embodiment 1.1, and user A and user B communicate with each other using their respective network terminal devices 300.

Thus, communication through a network session between users can be smoothly established by adopting a configuration whereby the availability of the users of the network terminal devices 300A and 300B to participate is confirmed, and a network session is able to be established only when it suits the convenience of the users.

The present Embodiment 1.1 describes a configuration in which two users, specifically, two network terminal devices 300A and 300B participate in the network session, but the applicability of the present invention is not limited to such a configuration. The present invention can be applied to three or more network terminal devices 300 using the same procedure.

The session request acceptance checking section 201 in the present Embodiment 1.1 sends only a reply of the acceptance or rejection of a session acceptance request rather than of the detected results of the session establishment information detecting section 303. By adopting such a configuration, it becomes possible to construct a network session while preventing the personal information about a user obtained by the session establishment information detecting section 303 from being leaked to other devices.

The present Embodiment 1.1 describes a session establishment information detecting section 303 that consists of a method whereby a user inputs his or her own degree of busyness, but this configuration does not limit the session establishment information detecting section 303 in the present invention, and other methods such as those described below may also be used.

For example, an operational event is issued by the operating system when a user operates a button, keyboard, touch panel, or the like of the network terminal device 300, so it is also possible to detect the operating status of the user's network terminal by monitoring the interval at which this operational event is issued, and to infer the user's degree of busyness. For example, because it can be determined that the user is not located near the network terminal device 300 and is out when 300 seconds or more have elapsed after the last operational event, this determination can be used as the output of the session establishment information detecting section 303.

The user's busyness can also be detected by observing the number of packets traveling on a network session for a network terminal device 300 that is already participating in a network session. For example, when a flood of data is traveling on a network session, it can be determined that the user is located and in communication with another network terminal device using the network session, but not currently using other network services, so this information can be used as the output of the session establishment information detecting section 303.

A camera can also be connected to the network terminal device 300 to determine from the number of pixels in a skin-colored area of the resultant image whether or not a person is nearby, and it can be determined from this information that the user is currently out, which can be used as the output of the session establishment information detecting section 303. Such processing as would be used to extract a skin-colored area in this manner can easily be performed by generating a color image from an RGB image and extracting only the area that is close to being skin-colored, using the technique described on pages 485 to 489 of Takagi, "Handbook of Image Analysis," (Tokyo University Press: ISBN 4-13-061107-0), for example, so details thereof are omitted from this description.

A configuration is adopted in the present Embodiment 1.1 whereby the session request acceptance checking section 201 uses a single session establishment information detecting section 303 to reply as to whether or not a session request has been acceptable, but another configuration may also be adopted whereby a plurality of session establishment information detecting sections 303 having different characteristics are used and the resultant plurality of outputs are combined to reply as to whether or not a request has been acceptable. For example, respective ones of a detecting means that operates based on the above-mentioned operational events, a detecting means for observing the number of network packets, and an observing means by means of a camera produce information indicating the busyness of each user observed from differing aspects. By adopting a configuration whereby the availability of the user to respond is determined according to a combination of these outputs, a reply can be outputted based on a more accurate determination of the user's status.

SIP, H.323, HTTP, or any other type of protocol that can also be used to control a regular network session can also be used to communicate control data in a control session 601 between network terminal devices 300 or between the network administration device 400 and network terminal devices 300 is The session data relaying section 403 was described as an independent system for performing packet forwarding, but it may also be configured to use a PPTP (Point to Point Tunneling Protocol) server used in a Virtual Private Network (VPN) structure. In this case, it becomes possible for the network session to be established as a virtual network with an address system that is separate from those of other networks, and for security to easily be maintained. It thereby becomes possible to use the network session without risking data leakage to a network terminal device 300 that is not participating in the network session.

The session data relaying section 403 was described as being inside the network administration device 400, but it may also be disposed outside the network administration device 400. For example, when a VPN server is already put in place, the existing VPN server can be used as the session data relaying section 403 by making the VPN server the party being connected to by the session.

Figure 40:
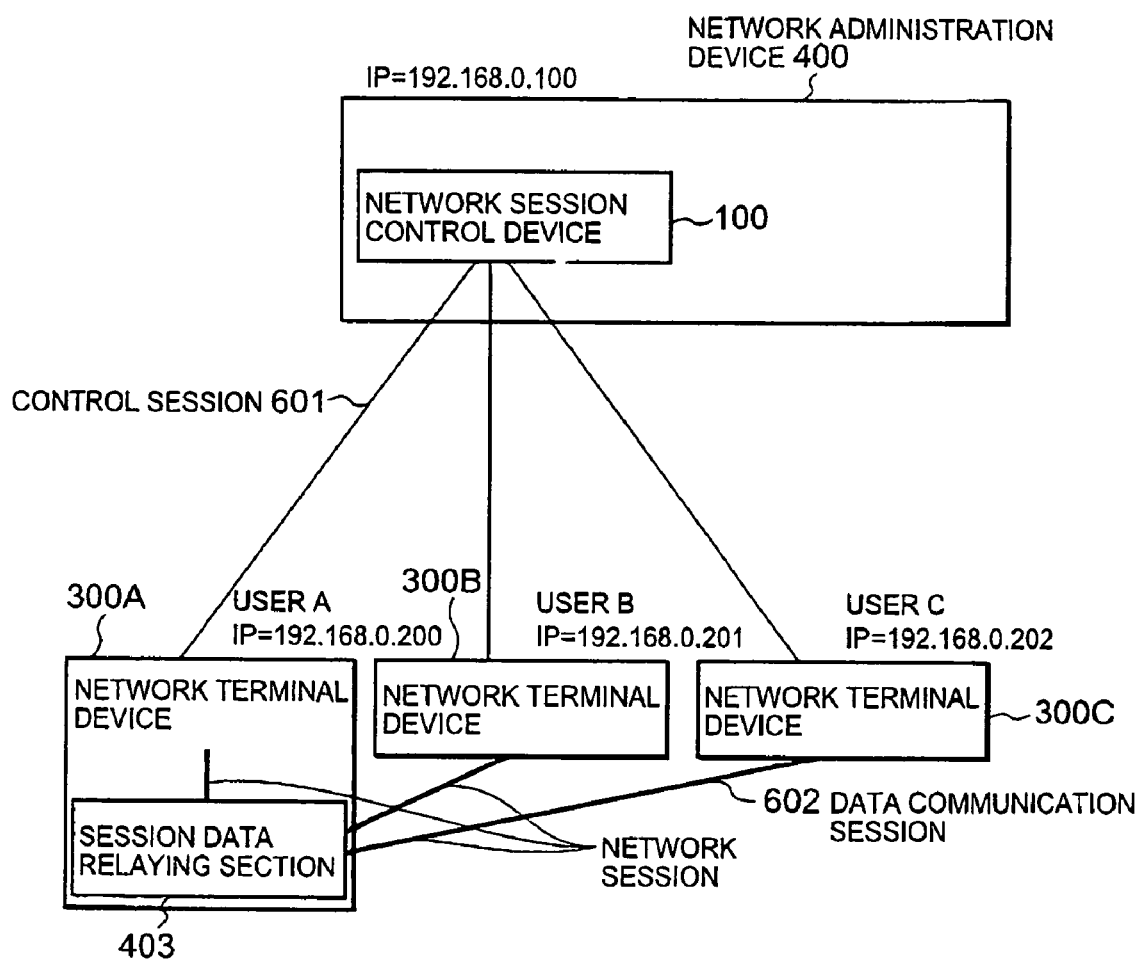
FIG. 40 is a diagram depicting session establishment between the network administration device and the plurality of network terminal devices according to a first modification of Embodiment 1.1 of the first mode of implementation.

The session data relaying section 403 was described as being inside the network administration device 400, but it may also be disposed inside the network terminal device 300. As shown in FIG. 40, the session data relaying section 403 is disposed inside the network terminal device 300A and in which a network session is formed by configuring the session from the other network terminal devices 300B and 300C In this case, the party being connected to in the session setting field of the network session information database 402 should be 192.168.0.200, which indicates the network terminal device 300A. It is also apparent that a configuration may be adopted that uses the session data relaying section 403 of other network terminal device 300 and not only that of the network terminal device 300A. A configuration may also be adopted whereby the processing power and available bandwidth of the network terminal device 300 are acquired and the optimum session data relaying section 403 is selected and used.

Figure 41:
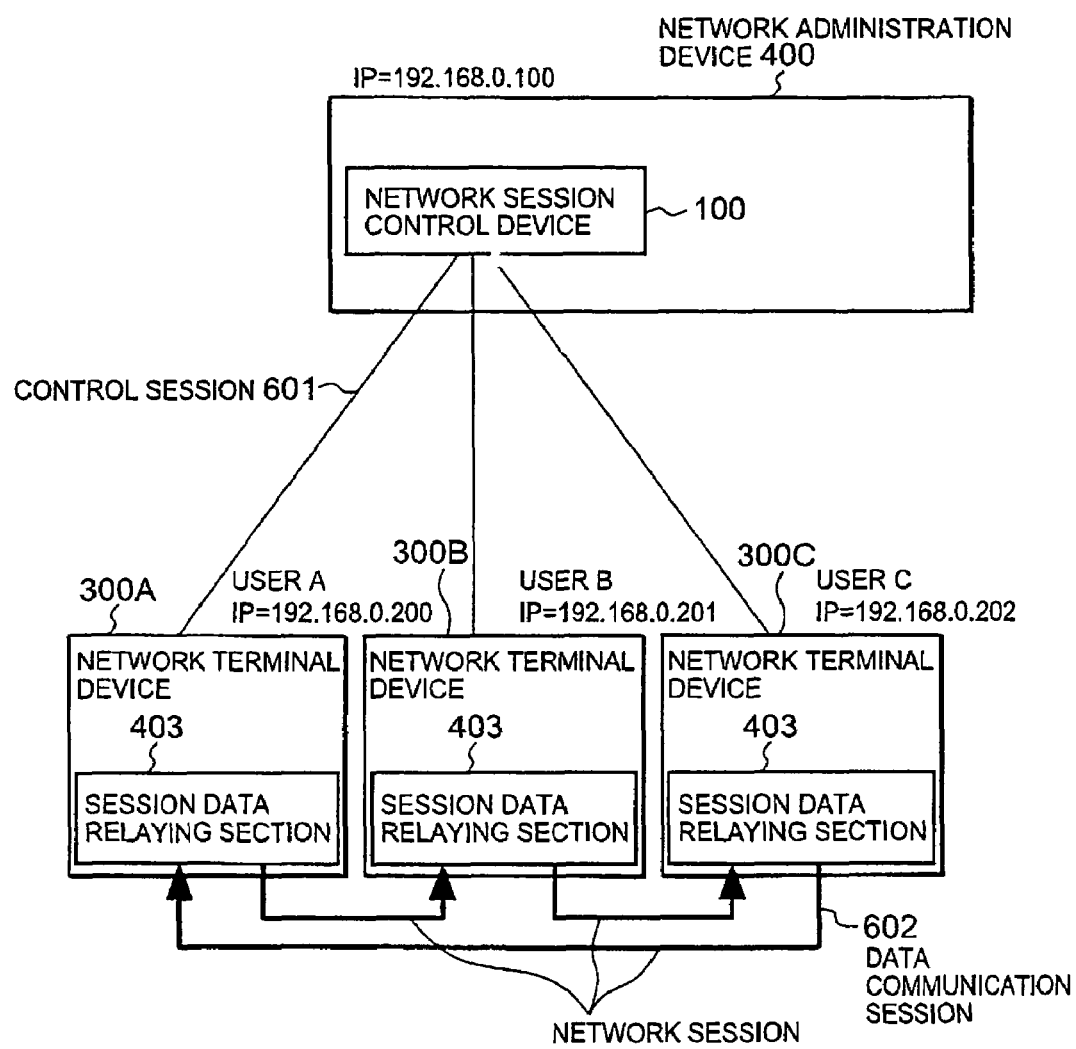
FIG. 41 is a diagram depicting session establishment between the network administration device and the plurality of network terminal devices according to a second modification of Embodiment 1.1 of the first mode of implementation.

Further, a configuration may be adopted whereby a data communication session 602 is provided and data are exchanged between the session data relaying sections 403 of the network terminal devices 300, as shown in FIG. 41. In this case, it is sufficient to execute simple processing wherein there is a unidirectional flow of data on the data communication session 602, and data packets that are accepted by the session data relaying section 403 are transferred toward the output. To achieve such a configuration, the party being connected to in the session setting field of the network session information database 402 should be set in the manner described below so as to have a mutual connection:

Address of a device to which network terminal device 300A is connected=192.168.0.201;
Address of a device to which network terminal device 300B is connected=192.168.0.202; and
Address of a device to which network terminal device 300C is connected=192.168.0.200.

In the case where there is a possibility that a network terminal device 300 will not participate in the network session and the party being connected to cannot be verified during analysis of the network session reservation condition in step S100, a configuration may also be adopted whereby the party being connected to is set so that a session is constructed with all of the network terminal devices 300 immediately before an instruction is issued to establish a network session in step S105. By adopting such a configuration whereby the session data relaying sections 403 of the network terminal devices 300 connect with each other in this manner to establish a network session, the load can be prevented from being concentrated on a single session data relaying section 403.

Embodiment 1.2

Figure 11:
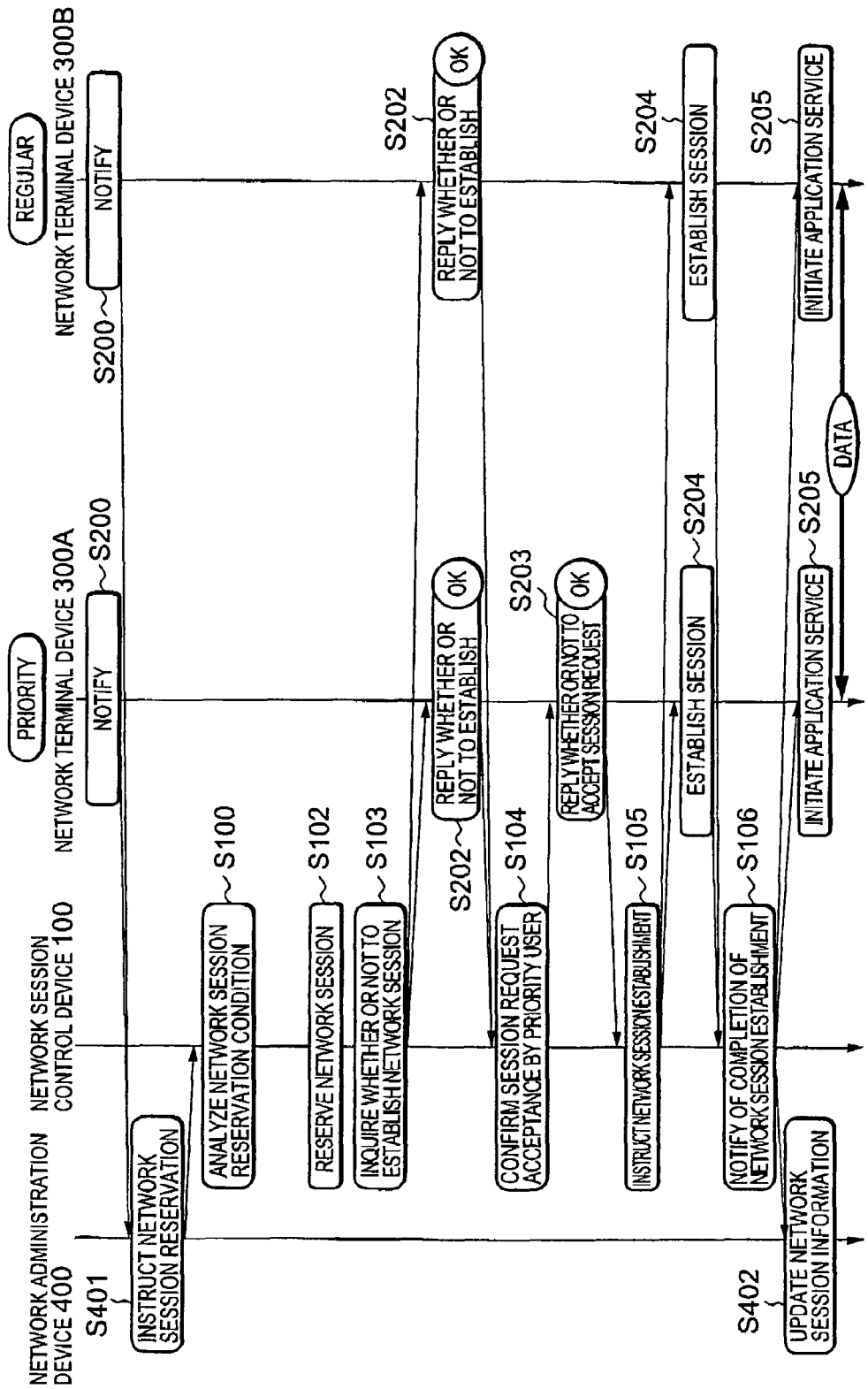
FIG. 11 is a sequence diagram depicting the flow of processing according Embodiment 1.2 of the first mode of implementation.

Embodiment 1.2 of the first mode of implementation of the present invention will next be described with reference to FIG. 14 and FIG. 11.

According to the Embodiment 1.2, in the case where a customer and a sales representative, superior and subordinate, or other high-priority users are present and all of the network terminal devices are able to participate in the network session, a session establishment procedure is used that establishes the network session after confirmation is obtained from all of the network terminal devices to be given priority based on the relationship between users of the network terminal devices.

The Embodiment 1.2 differs in comparison to the above-described Embodiment 1.1 with regard to the aspects described below.

Figure 12:
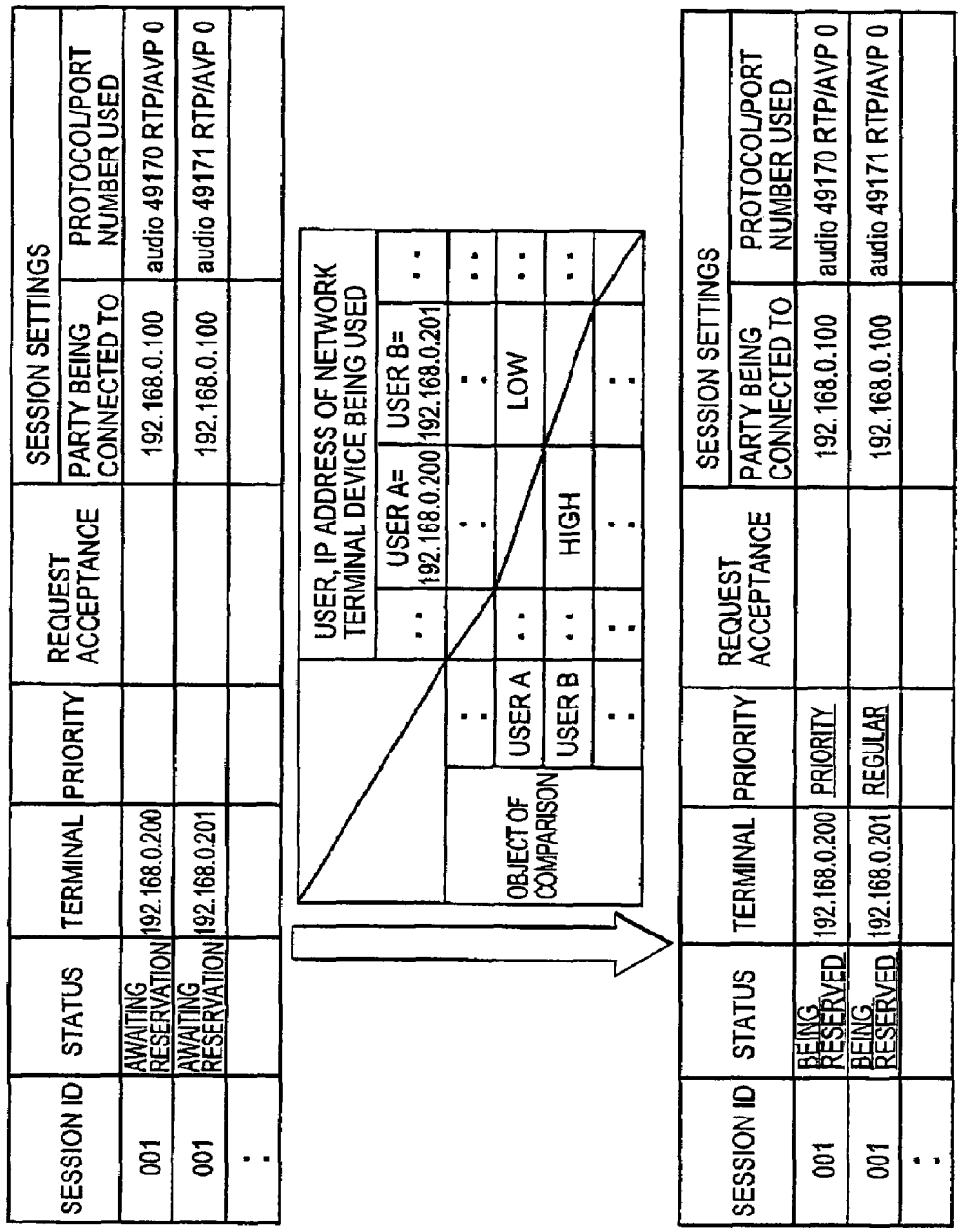
FIG. 12 is a diagram depicting an example of the session information database in Embodiment 1.2 of the first mode of implementation.

First, at the time of analysis of the session reservation condition in step S100, the network session reservation condition analyzing section 101 updates the priority field of the network session information database 402 as shown in FIG. 12 so as to establish a network session with priority for user A based on the relationship table for users A and B recorded as shown in the middle row of FIG. 12.

The network session requesting section 103 is also configured so as to inquire of the session request acceptance checking section 201 in the network terminal devices 300 used by all of the high-priority users (only user A in this case) as to whether or not to start establishing a session (step S104) after confirming that all of the network terminal devices 300 have become "able to receive a request" by steps S103 and S202. Only when the session request acceptance checking section 201 in all of the network terminal devices 300 used by the high-priority users are accepted (step S203), the network session requesting section 103 continues establishing a network session. Also, a configuration maybe adopted whereby the information of other users participating in the network session is posted at the time when inquiry is made as to whether or not to start establishing a session.

The network session controlling section 104 is configured so as to look up the request acceptance field of the network session information database 402 and to send an instruction and parameters necessary to establish a session to the session establishing section 202 in the network terminal devices 300 upon confirming that the request acceptance status of the network terminal device 300 of the high-priority user has been set to "initiation enabled," and that the request acceptance status of the network terminal device 300 of the regular user has been set to "enabled" (bottom row of FIG. 13) (step S105).

Figure 14:
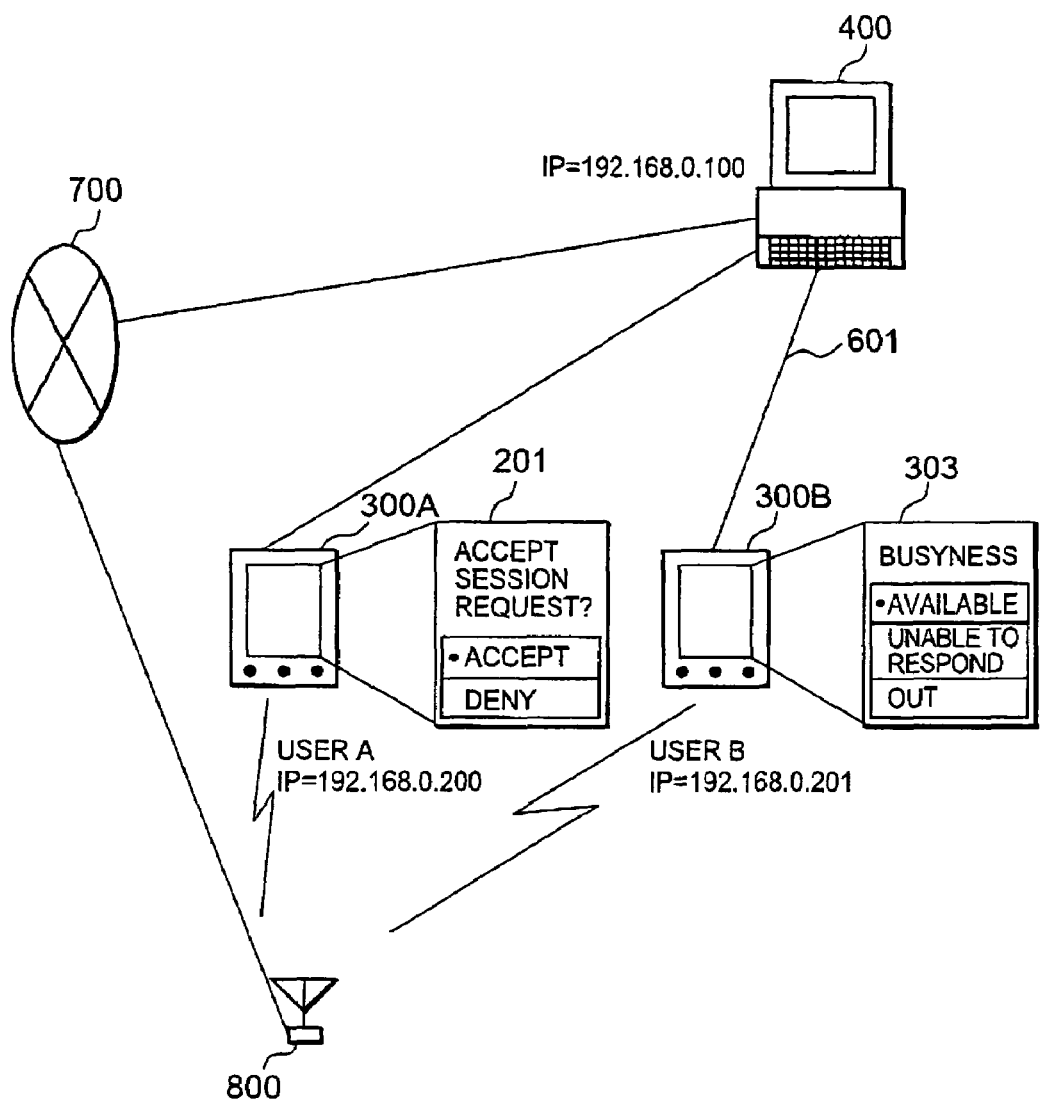
FIG. 14 is a diagram depicting a state of Embodiment 1.2 of the first mode of implementation.

FIG. 14 shows an example of the screen displayed when acceptance of a session request is confirmed in step S104, and a configuration is adopted in the present Embodiment 1.2 whereby the session request acceptance checking section 201 displays a dialog screen on the display of the network terminal device 300A in use by user A, who is the high-priority user, and the user makes a selection.

Figure 13:
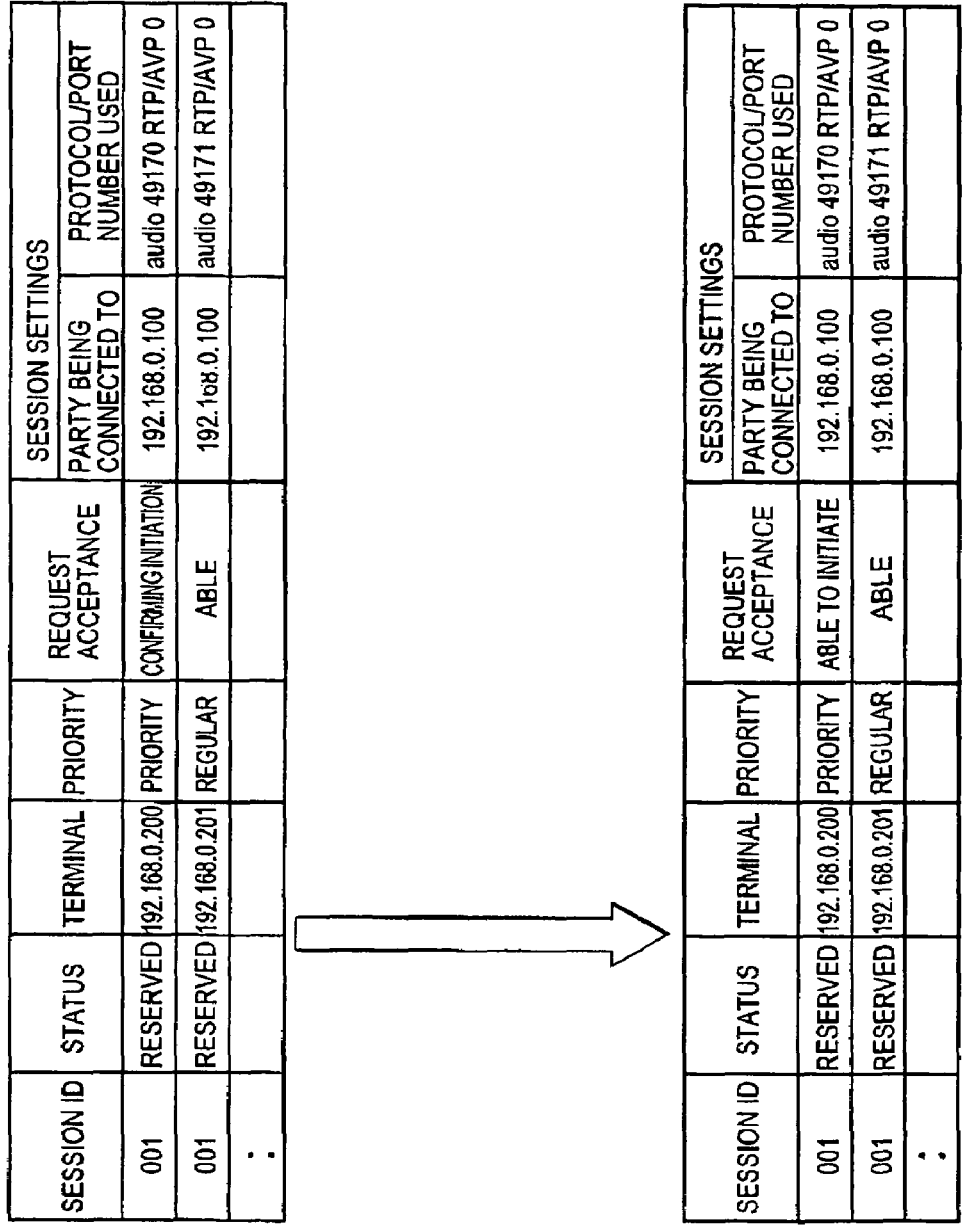
FIG. 13 is a diagram depicting a change of contents of the session information database in Embodiment 1.2 of the first mode of implementation.

The top row of FIG. 13 shows that the session request acceptance checking section 201 of the network terminal device 300A of the high-priority user A is performing confirmation in step S104. In step S203, when the high-priority user A accepts initiation of establishment, the request acceptance status of user A becomes "initiation enabled," as shown in the bottom row of FIG. 13.

A configuration may be adopted whereby the session request acceptance checking section 201 automatically returns acceptance for establishment of a network session with a user who is listed in the address book kept by user A in his or her network terminal device 300A. It is also possible to adopt a configuration whereby acceptance is automatically returned in the same manner for establishment of a network session with a user who is specified in advance (user B in this case). By determining a user in advance in this manner, the wishes of the user can be automatically reflected without displaying a dialog screen or the like, and the above-mentioned operation can be performed while reducing the amount of action required from the user.

Confirming the initiation of session establishment in this manner makes it possible, for example, to prevent a network session from being established with parties that user A does not wish to contact, and to form network sessions that better reflect the wishes of high-priority users.

Portions other than those described above are the same as in the previously described Embodiment 1.1 of the first mode of implementation, and detailed description thereof is omitted.

Embodiment 1.3

Embodiment 1.3 of the first mode of implementation of the present invention will next be described.

Figure 15:
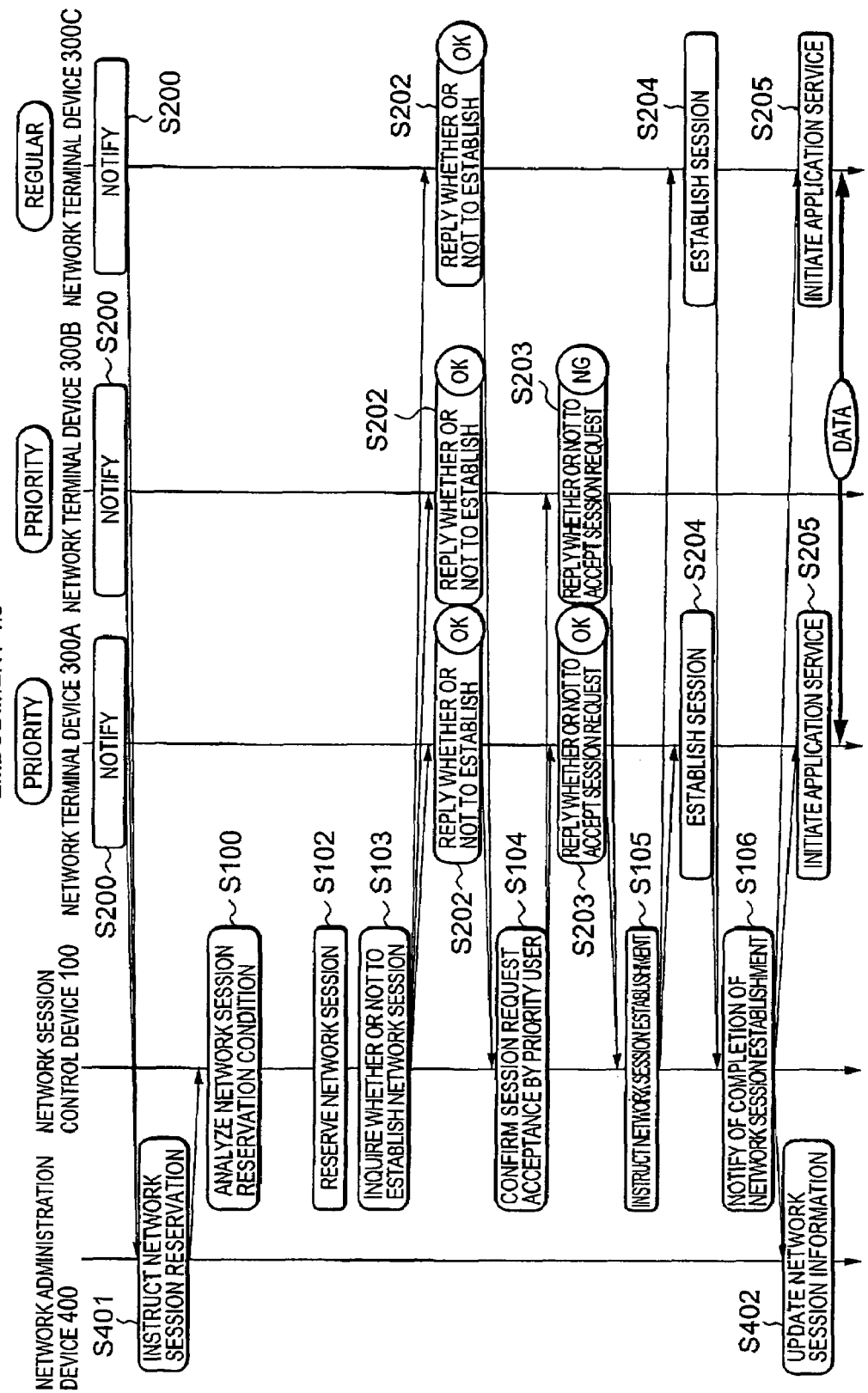
FIG. 15 is a sequence diagram depicting the flow of processing according Embodiment 1.3 of the first mode of implementation.
Figure 16:
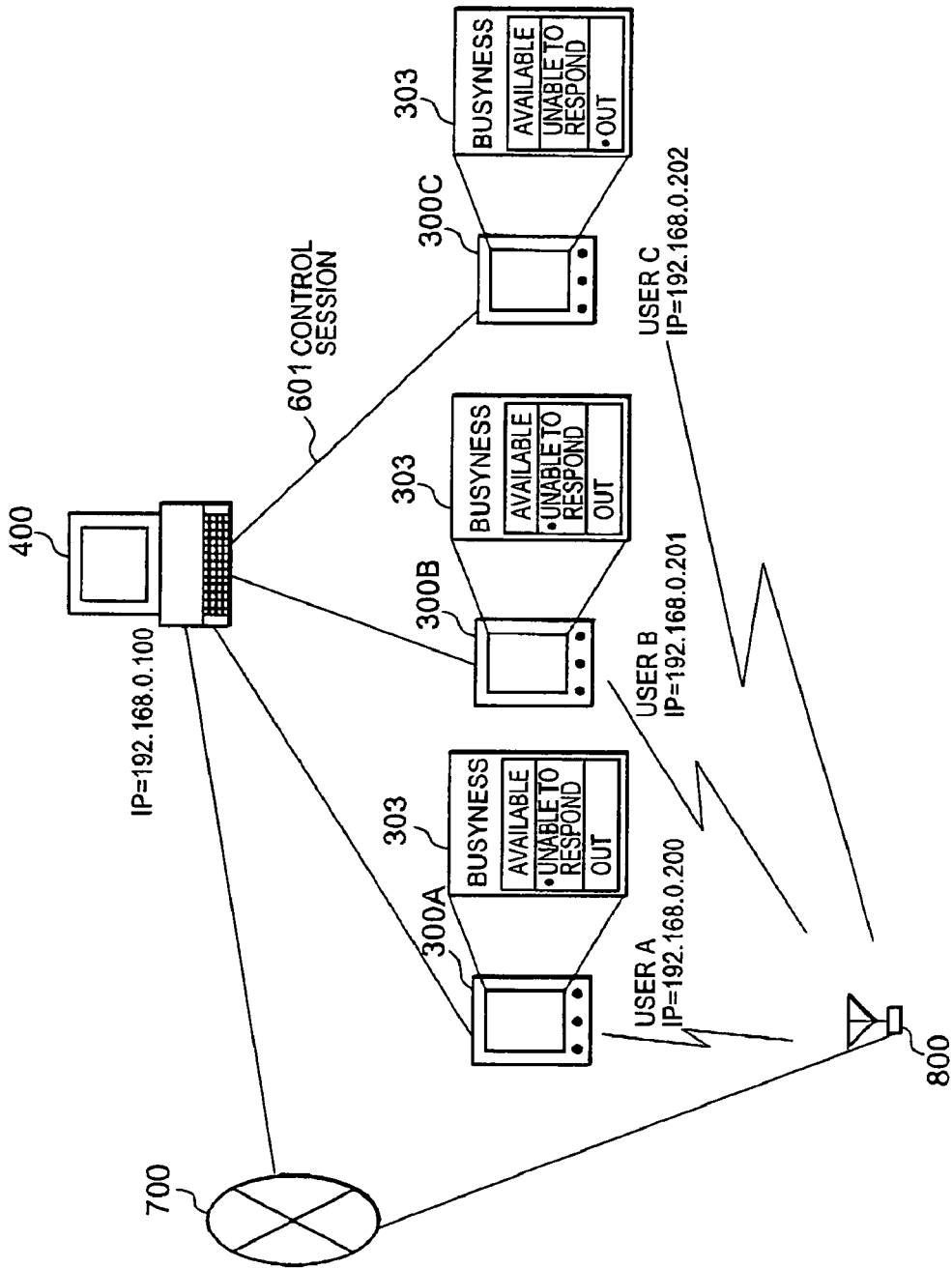
FIG. 16 is a diagram depicting a first state of a system according to Embodiment 1.3 of the first mode of implementation.

As shown in FIG. 16, in the Embodiment 1.3, a case is described in which network terminal devices 300A through 300C used by three users A through C form a network session to organize a telephone conference call. Also, FIG. 15 shows the flow of processing in the present Embodiment 1.3.

According to the Embodiment 1.3, when at least one high-priority user is present and all of the network terminal devices are able to participate in the network session, a session establishment procedure is used whereby a network session is established if, based on the relationship between network terminal devices, confirmation is obtained from at least one network terminal device 300 that should be given priority.

The present Embodiment 1.3 differs in comparison to the previously described Embodiment 1.2 with regard to the aspects described below.

Figure 19:
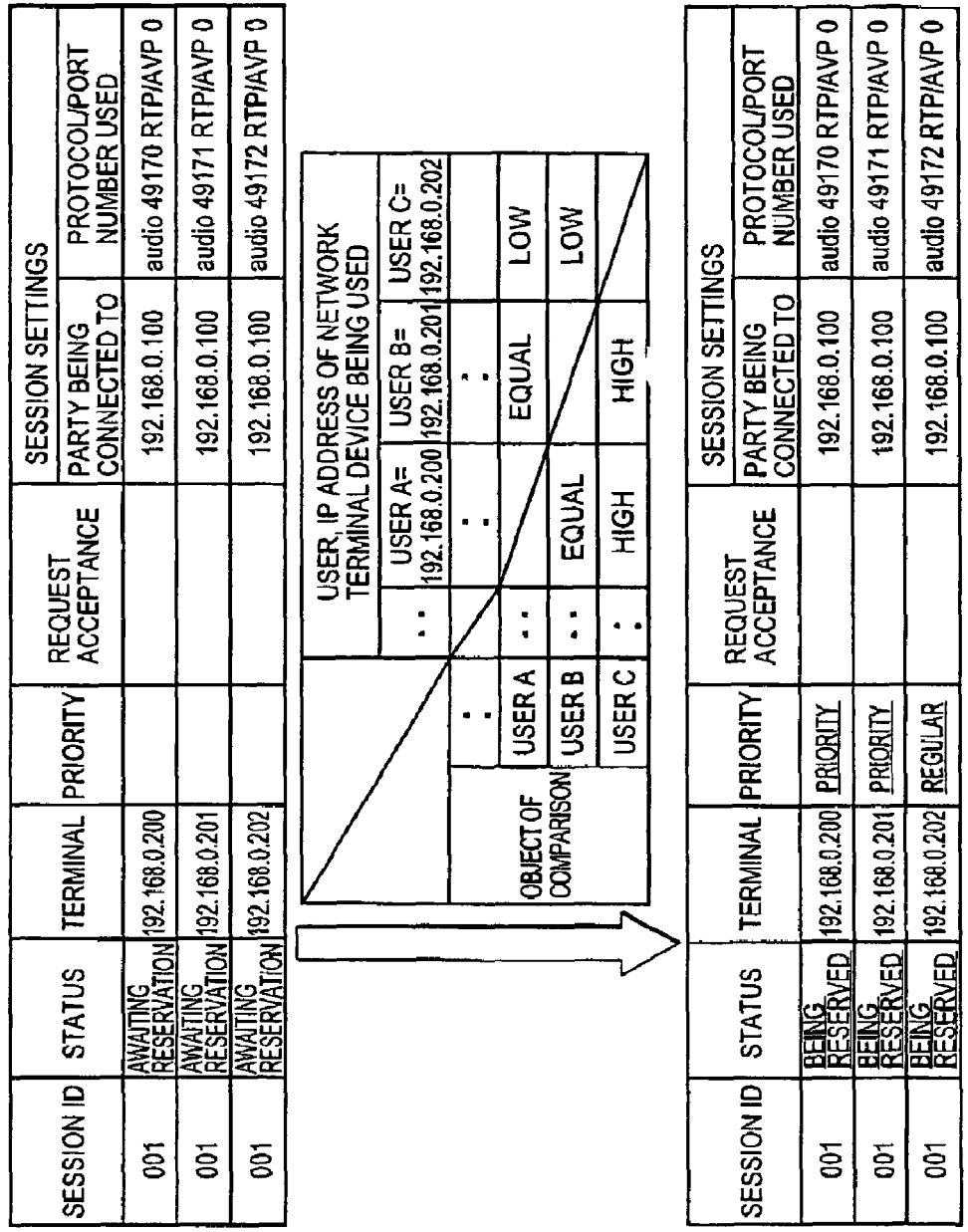
FIG. 19 is a diagram depicting an example of the session information database in Embodiment 1.3 of the first mode of implementation.

First, at the time of analysis of the session reservation condition in step S100, the network session reservation condition analyzing section 101 updates the priority field of the network session information database 402 so as to establish a network session with priority for user A and user B on the basis of the relationship table for users A through C recorded as shown in the middle row of FIG. 19.

The network session requesting section 103 is configured so as to inquire of the session request acceptance checking section 201 in the network terminal devices 300 used by all of the high-priority users (user A and user B in this case) as to whether or not to start establishing a session (step S104) after confirming that all of the network terminal devices 300 have become "able to receive a request" by steps S103 and S202. Only when the session request acceptance checking section 201 in at least one of the network terminal devices 300 used by the high-priority users is accepted (step S203), the network session requesting section 103 continues establishing a network session.

Figure 20:
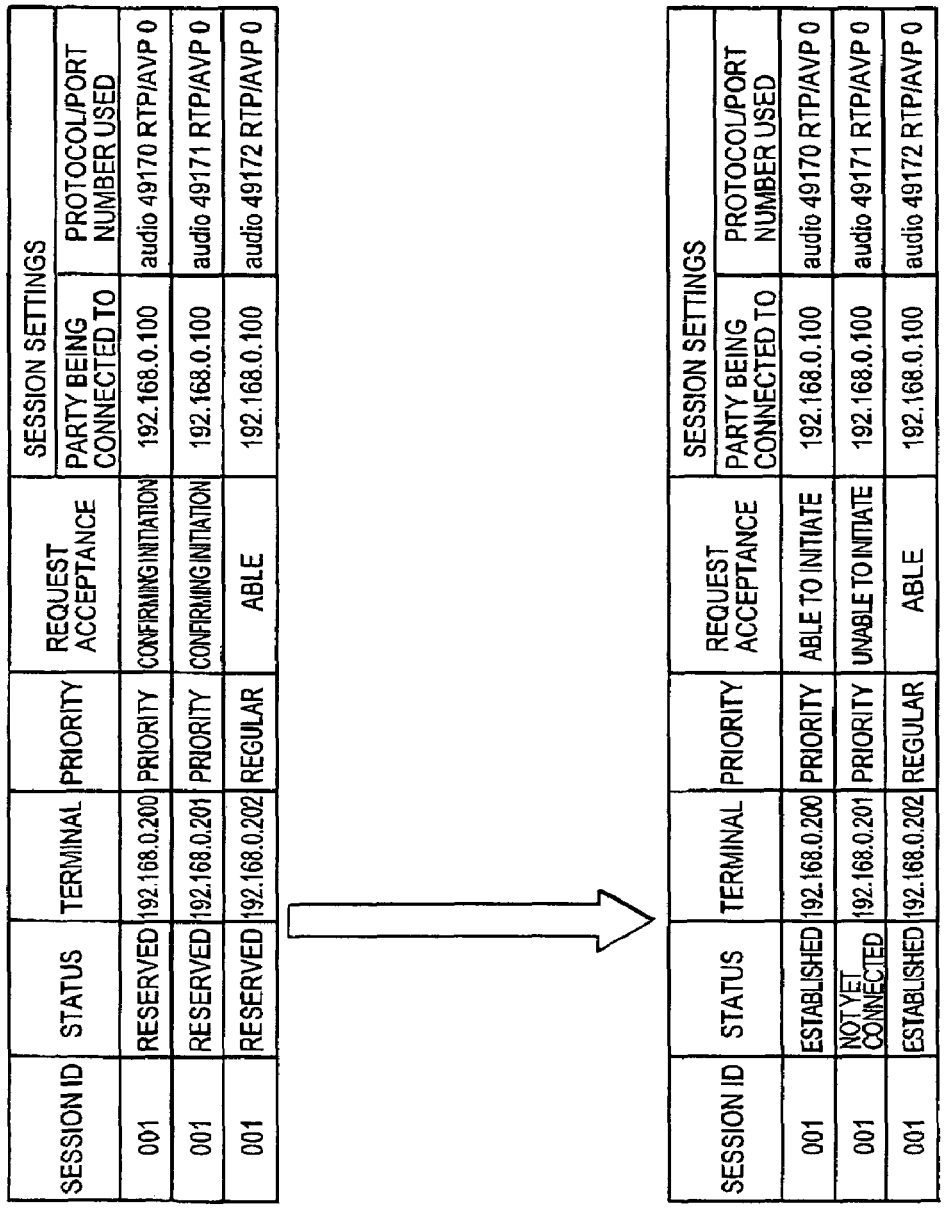
FIG. 20 is a diagram depicting a change of contents of the session information database in Embodiment 1.3 of the first mode of implementation.

The network session controlling section 104 refers to the request acceptance field of the network session information database 402 to confirm that the request acceptance status of an arbitrary one of the network terminal devices 300 of the high-priority users has been set to "initiation enabled," and that the request acceptance status of the network terminal device 300 of a regular user has been set to "enabled" (bottom row of FIG. 20). When it has been affirmed, the network session controlling section 104 sends an instruction and parameters necessary to establish a session to the session establishing section 202 in each of the network terminal devices 300 so as to establish a network session for the network terminal device 300 of the high-priority user whose request acceptance status is "initiation enabled" and for the network terminal device 300 of the regular user whose request acceptance status is "enabled" (step S105).

Figure 17:
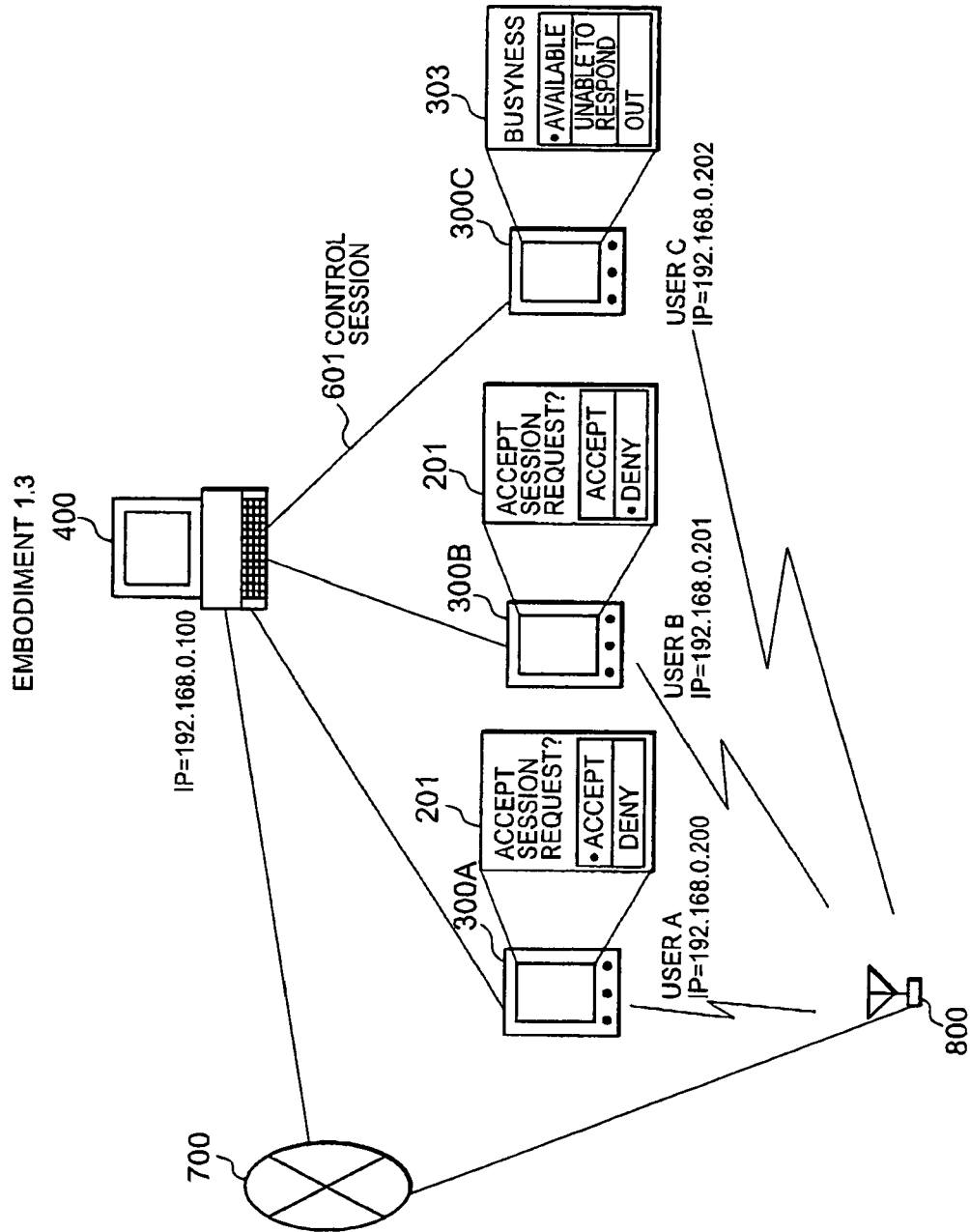
FIG. 17 is a diagram depicting a second state of a system according to Embodiment 1.3 of the first mode of implementation.

FIG. 17 shows an example of the screen displayed when acceptance of a session request is confirmed in step S104, and a configuration is adopted in the present working example whereby the session request acceptance checking section 201 displays a dialog screen on the display of the network terminal devices 300A and 300B in use by user A and user B, who are the high-priority users, and the users make a selection.

Figure 18:
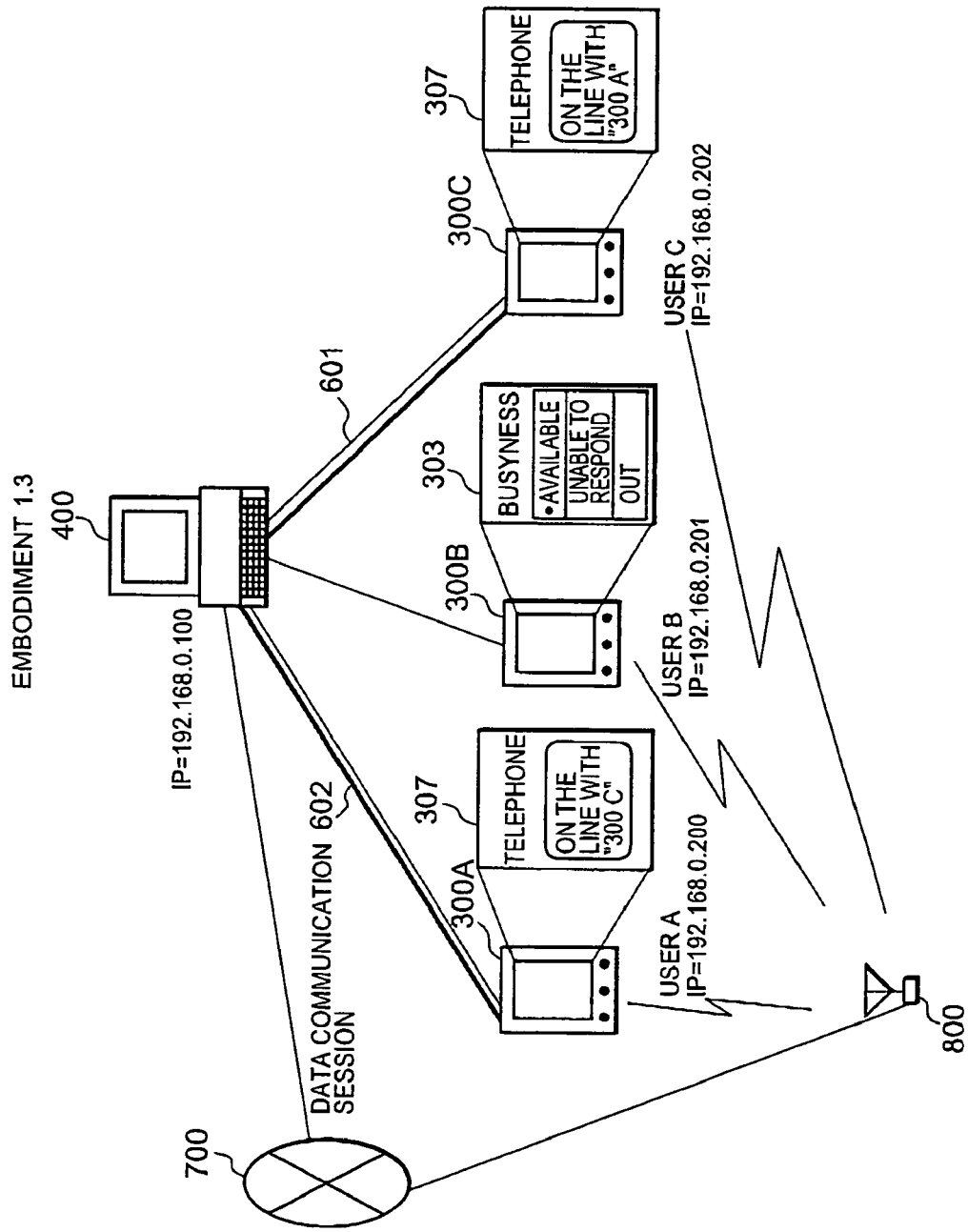
FIG. 18 is a diagram depicting a third state of a system according to Embodiment 1.3 of the first mode of implementation.

FIG. 18 depicts the manner in which an instruction to establish a session is received in step S105, a network session is established, and a telephone conference service is provided. In FIG. 18, a network session is established between network terminal devices 300A and 300C that have accepted a request.

In the previously described Embodiment 1.2, it was necessary for all of the network terminal devices 300 being used by high-priority users to accept session establishment. However, according to the present Embodiment 1.3, establishment of a network session is initiated when at least one of the network terminal devices 300 being used by high-priority users accepts the session.

Confirming initiation of session establishment in this manner makes it possible to establish a network session that reflects the wishes of high-priority users.

Portions other than those described above are the same as in Embodiment 2 of the first mode of implementation, and detailed description thereof is omitted.

Embodiment 1.4

Embodiment 1.4 of the first mode of implementation of the present invention will next be described.

Figure 21:
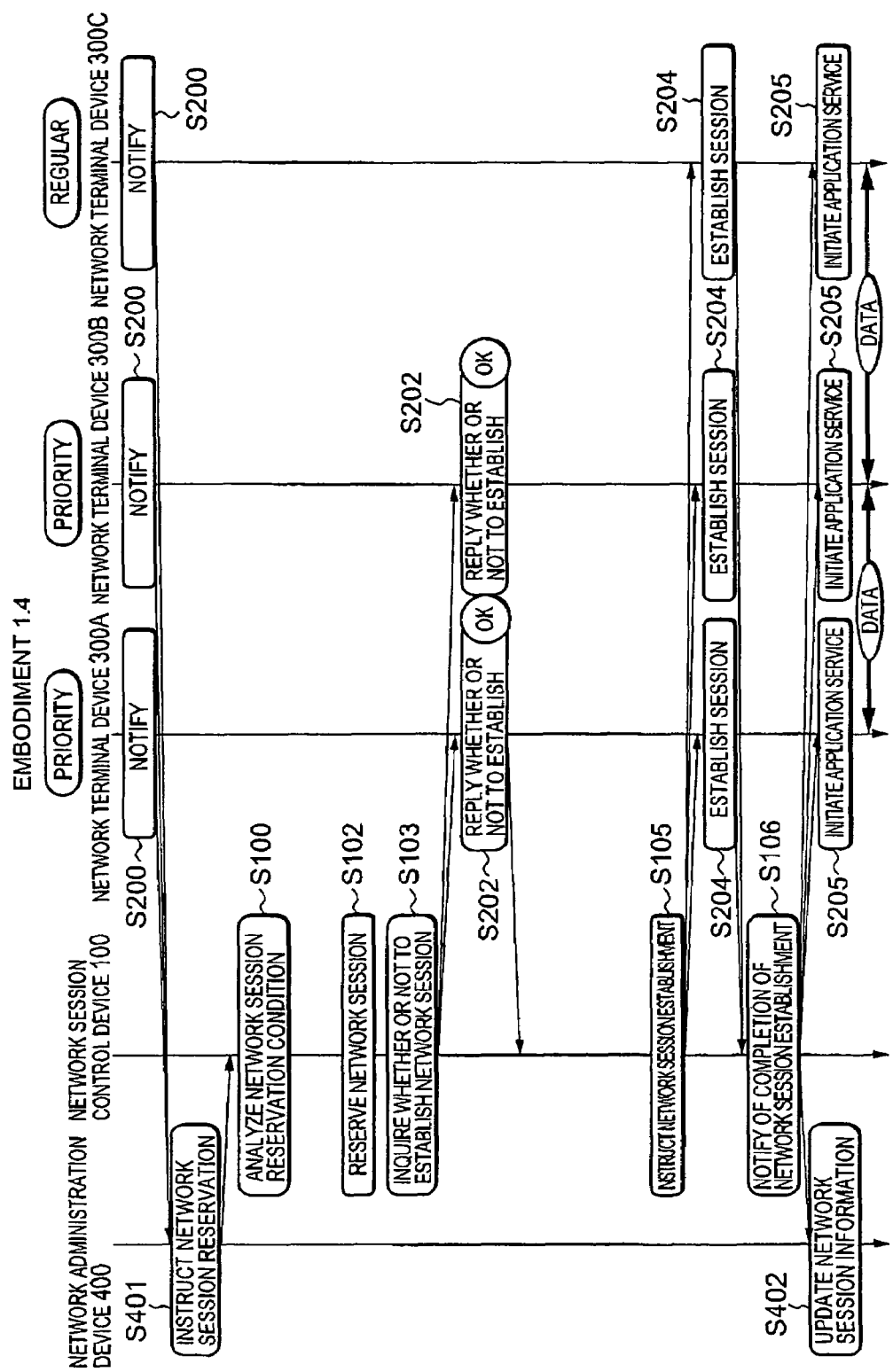
FIG. 21 is a sequence diagram depicting the flow of processing in Embodiment 1.4 of the first mode of implementation.
Figure 22:
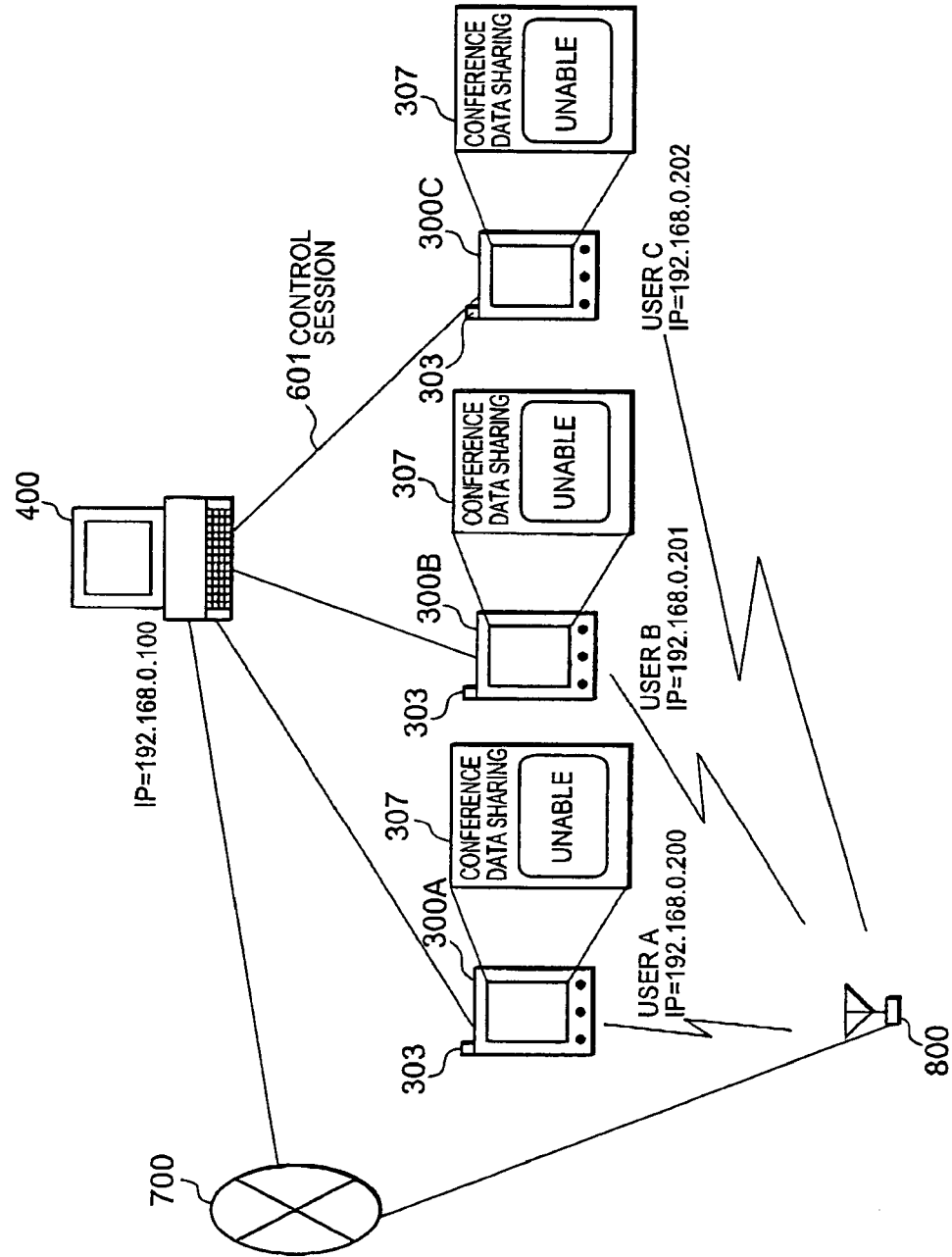
FIG. 22 is a diagram depicting a first state of a system according to Embodiment 1.4 of the first mode of implementation.

As shown in FIG. 22, the Embodiment 1.4 shows a case where a network session is established between network terminal devices 300A through 300C used by three users A through C so that a data sharing tool is used. Also, FIG. 21 depicts the flow of processing in the Embodiment 1.4.

According to the present Embodiment 1.4, the host of a conference and general participants or other high-priority users are present, and a session establishment procedure is used whereby a network session is established when all of the high-priority network terminal devices are able to participate in the network session.

The present Embodiment 1.4 differs in comparison to the previously described Embodiment 1.1 with regard to the aspects described below.

First, the application providing section 307 on each of the network terminal devices 300A through 300C provides a data sharing service to the user. By means of this service, when a user inputs a data file to the data sharing service on the network terminal device 300, the file is transferred to a data sharing service tool on all of the other network terminal devices 300 that are participating in the network session, and the same data file can easily be shared. This type of tool can easily be provided using a common data communication method when a network session is established.

The network session reservation condition analyzing section 101 is configured so as to look up the IP addresses of the network terminal devices administrated by a schedule administration device or the like (not shown), their users, and user attributes as shown in the middle row of FIG. 25; to acquire information on the host of the conference using the network session; and to set the priority in the session establishment procedure (step S100). In the case where the identity of the "host" is known at the time of the reservation instruction, a configuration may also be adopted whereby the network terminal being used by the host is given priority in advance.

The session establishment information detecting section 303 is implemented by way of an infrared receiver, as shown in FIG. 22. The session establishment information detecting section 303 is configured such that the infrared receiver gives the output "able to respond" when infrared light is received from an external infrared beacon. Such a beacon and receiver can be assembled using a short-range wireless transmitter and receiver, a speaker and microphone, or the like.

The session request acceptance checking section 201 is configured so as to present the network session requesting section 103 with the reply "able to accept session establishment" when the detected result of the session establishment information detecting section 303 is "able to respond," and "unable to accept session establishment" when the result is "unable to respond" (step S202).

The network session requesting section 103 is configured so as to register a reply received from each of the session request acceptance checking sections 201 into the request acceptance field of the network session information database 402 and to repeat the steps S103 through S202 until all of the network terminal devices 300 of high-priority users (user A and user B in this case) are able to accept a request.

The network session controlling section 104 looks up the request acceptance field of the network session information database 402 and verifies that all of the network terminal devices 300 of high-priority users are "able to accept a request" (bottom row of FIG. 26), whereupon an instruction and parameters necessary for establishing a session are sent to the session establishing section 202 in the network terminal devices 300 so as to establish a network session (step S105).

The same processing procedure as in the previously described Embodiment 1.1 is used hereinafter, an instruction to establish a session is sent to all of the network terminals, and a network session is established.

FIG. 23 shows a state immediately after the network terminal devices 300A and 300B of the high-priority users A and B have been brought to the conference room 900 and received a signal from the beacon 901, and FIG. 24 shows a state in which a network session is established. At the stage in which the network terminal devices 300A and 300B used by the high-priority users A and B are brought to the conference room, a network session is established between network terminal devices 300A through 300C and the use of data sharing is enabled.

In this manner, a network session can be established by looking up the statuses of only the high-priority network terminal devices 300A and 300B even when the operation is not necessarily convenient for all users.

Also, in the present Embodiment 1.4, only the request acceptance status of the high-priority network terminal devices 300 was looked up to make a decision regarding the initiation of session establishment, and a session was established with all of the network terminal devices 300, but a configuration may also be adopted in which regular terminals are also asked whether a request has been acceptable, whereby a network session is established only with those terminals that are able to accept the session request.

Portions other than those described above are the same as in the previously described Embodiment 1.1, and detailed description thereof is omitted.

Also, a network session was described as being established in the present Embodiment 1.4 between network terminal devices 300A through 300C when a signal was received from an infrared beacon mounted inside the conference room 900, but the range of applicability of the session establishment information detecting section 303 is not limited to this configuration. For example, it is also apparent that a configuration may be adopted whereby the infrared beacon is installed at a different location, such as at the entrance to the floor on which the conference room is located, and establishing a network session when the network terminal devices 300A through 300C all receive the beacon signal.

Also, a plurality of infrared beacons that output IDs each indicating their positions are installed in numerous locations not limited solely to the conference room 900, the installed location is determined from the ID received by the infrared receiver 303, and it is thereby determined whether or not to establish a session. Adopting such a configuration makes it easy to set conditions so that a network session is established when the parties have moved to a location other than the conference room 900.

Embodiment 1.5

Embodiment 1.5 of the first mode of implementation of the present invention will next be described. The present Embodiment 1.5 relates to the above-described Embodiment 1.4 in the same manner as does the previously described Embodiment 1.1 to the previously described Embodiment 1.2.

As shown in FIG. 27, more specifically, after the network terminal device of a high-priority user has become "able to accept a request," it is confirmed whether or not to start establishing a session with the high-priority user (step S104), and establishing a network session is started only when all of the network terminal devices of the high-priority users have accepted that the above-mentioned session should be established (step S203).

FIG. 28 shows the present Embodiment 1.5 in a state in which acceptance of a session establishment request is being confirmed by the users on the network terminal devices 300A and 300B of the high-priority users in the step S104.

Portions other than those described above are the same as in Embodiment 4 of the first mode of implementation, and detailed description thereof is omitted.

Embodiment 1.6

Embodiment 1.6 of the first mode of implementation of the present invention will next be described. The present Embodiment 1.6 relates to the previously described Embodiment 1.4 in the same manner as does the previously described Embodiment 1.1 to the previously described Embodiment 1.3.

Figure 29:
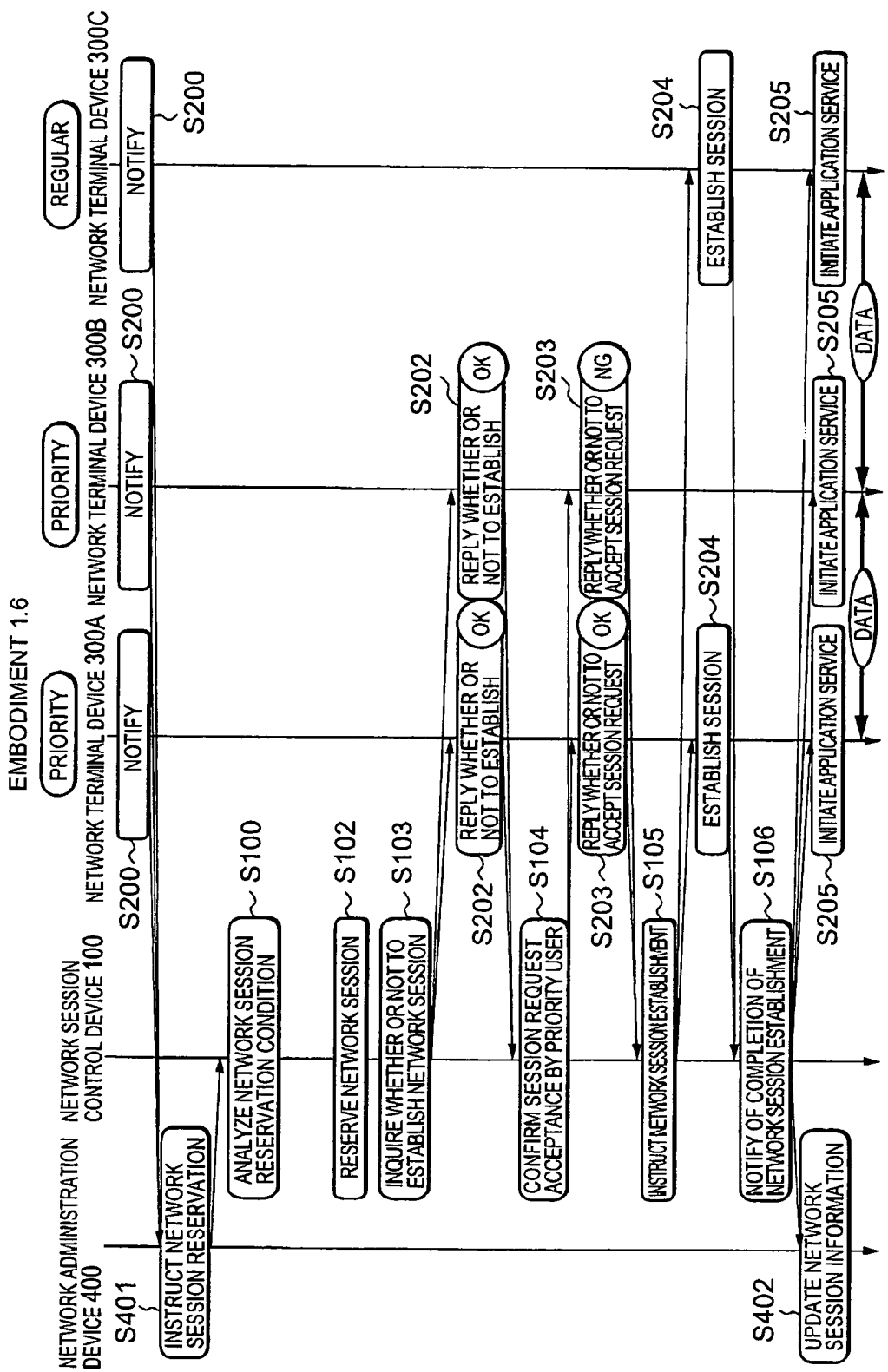
FIG. 29 is a sequence diagram depicting the flow of processing according to Embodiment 1.6 of the first mode of implementation.

As shown in FIG. 29, more specifically, after the network terminal device of the high-priority user has become "able to accept a request," it is confirmed whether or not to start establishing a session with the high-priority user (step S104), and establishing a network session is started only when at least one of all of the network terminal devices of the high-priority users has accepted that establishing the above-mentioned session should be started (step S203). A network session is formed between the network terminal device of a high-priority user who has accepted initiation of session establishment and the network terminal device of a regular user (steps S105, S204).

Figure 30:
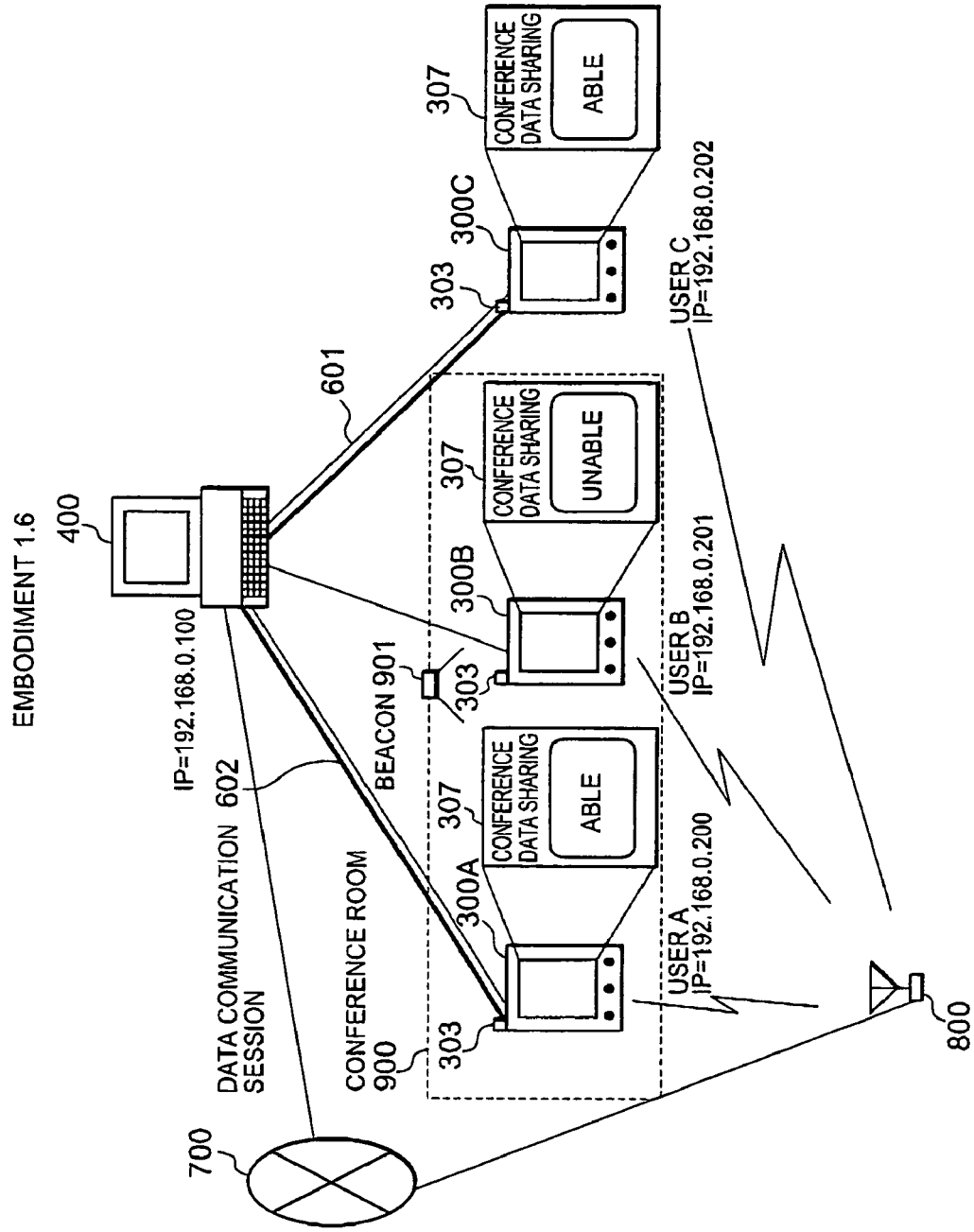
FIG. 30 is a diagram depicting a state of a system according to Embodiment 1.6 of the first mode of implementation.

FIG. 30 shows a network session in a state after the network session has been formed between the network terminal device of a high-priority user who has accepted initiation of session establishment in step S204 and the network terminal device of a regular user.

Portions other than those described above are the same as in Embodiment 4 of the first mode of implementation, and detailed description thereof is omitted.

The above-mentioned Embodiments 1.4 through 1.6 as being configured such that establishing a session is started when the users of all of the high-priority network terminal devices 300 are able to accept a request may also adopt a configuration whereby establishing a session is started when at least one of the high-priority users has become able to accept a request.

2. Second Mode of Implementation

Embodiment 2.1

Embodiment 2.1 of the second mode of implementation of the present invention will next be described with reference to FIG. 32 and FIG. 33.

As described before, according to the second mode of implementation of the invention, it is determined whether or not a reservation condition is satisfied for the reserved connection information of a network session, based on information maintained by a session establishment information administration device 500 that is independent of the network terminal devices 300.

In the present Embodiment 2.1, a network session is established between network terminal devices 300A and 300B, and a telephone service is provided in the same manner as in the previously described Embodiment 1.1 of the first mode of implementation.

The present Embodiment 2.1 differs in comparison to the previously described Embodiment 1.1 with regard to the aspects described below.

First, the session establishment information administration device 500 is present that is independent from the network terminal device 300, and each of the network terminal devices 300 possess no session establishment information detecting means.

Figure 32:
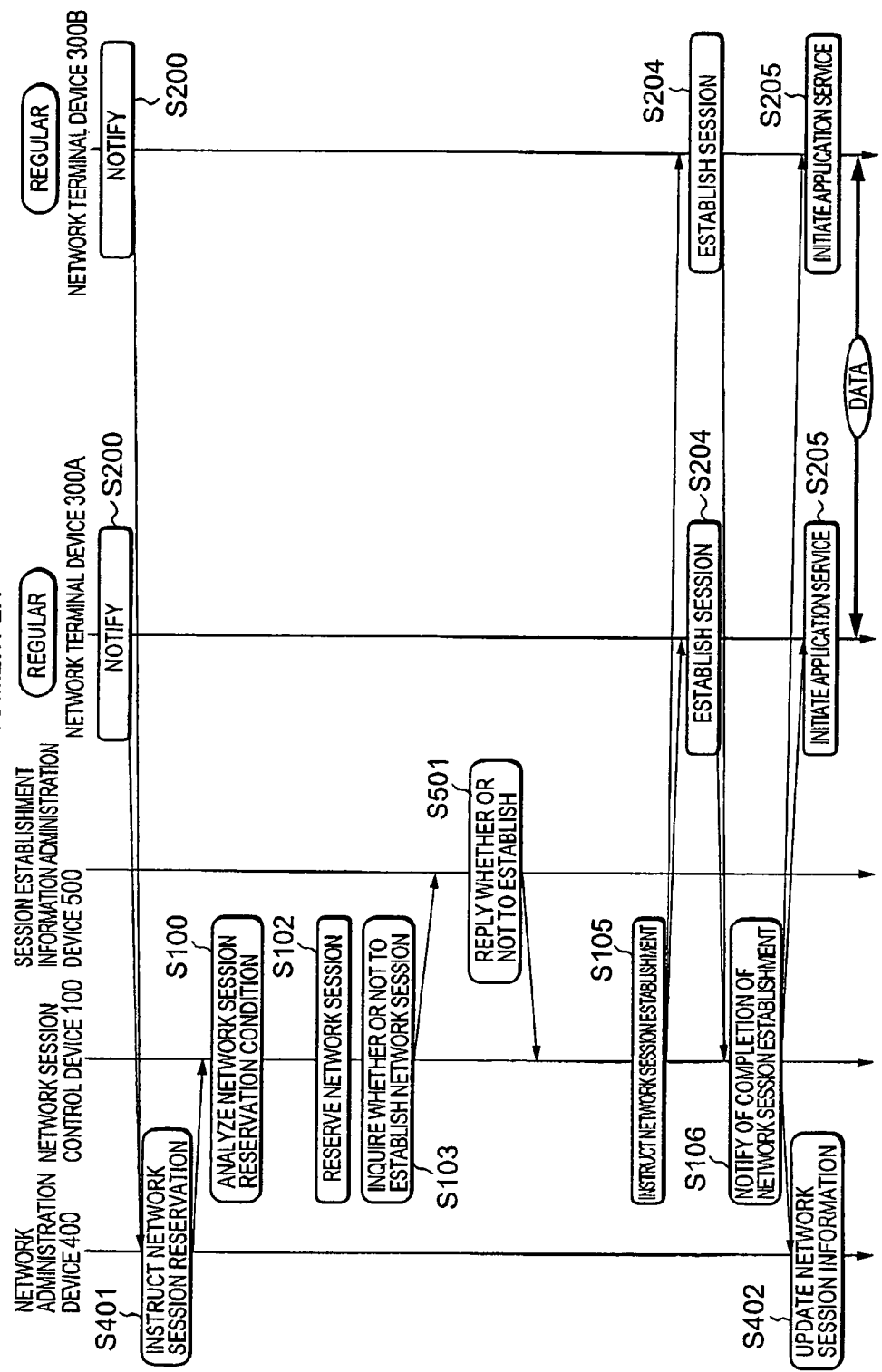
FIG. 32 is a sequence diagram depicting the flow of processing according to Embodiment 2.1 of the second mode of implementation.

In FIG. 32, the network session reservation condition analyzing section 101 is configured so as to register in the network session information database 402 an additional condition in which each of the network terminal devices 300 can accept a network session request when a network session is reserved (step S100). The condition in which the network session request can be accepted is specified, for example, by the reservation instruction information.

The network session requesting section 103 is configured so as to provide the session establishment information administration device 500 with an inquiry concerning the information of the network terminal devices 300A and 300B upon reservation of the network session (step S103).

The session establishment information administration device 500 is configured so as to respond to the inquiry from the network session requesting section 103 with a reply concerning the availability status of the users using the network terminal devices 300A and 300B (step S501).

The network session requesting section 103 registers in the network session information database 402 the reply received from the session establishment information administration device 500, determines that the network terminal device 300 is able to accept a request when the condition listed by the network session reservation condition analyzing section 101 matches the information received from the session establishment information administration device 500, and repeats the steps S103 through S501 until all of the network terminal devices 300 are able to accept a request.

Processing other than that described above is the same as in the previously described Embodiment 1.1, and a network session is established and a telephone service executed between both network terminal devices 300 when both the user of the network terminal device 300A and the user of the network terminal device 300B are available.

Figure 33:
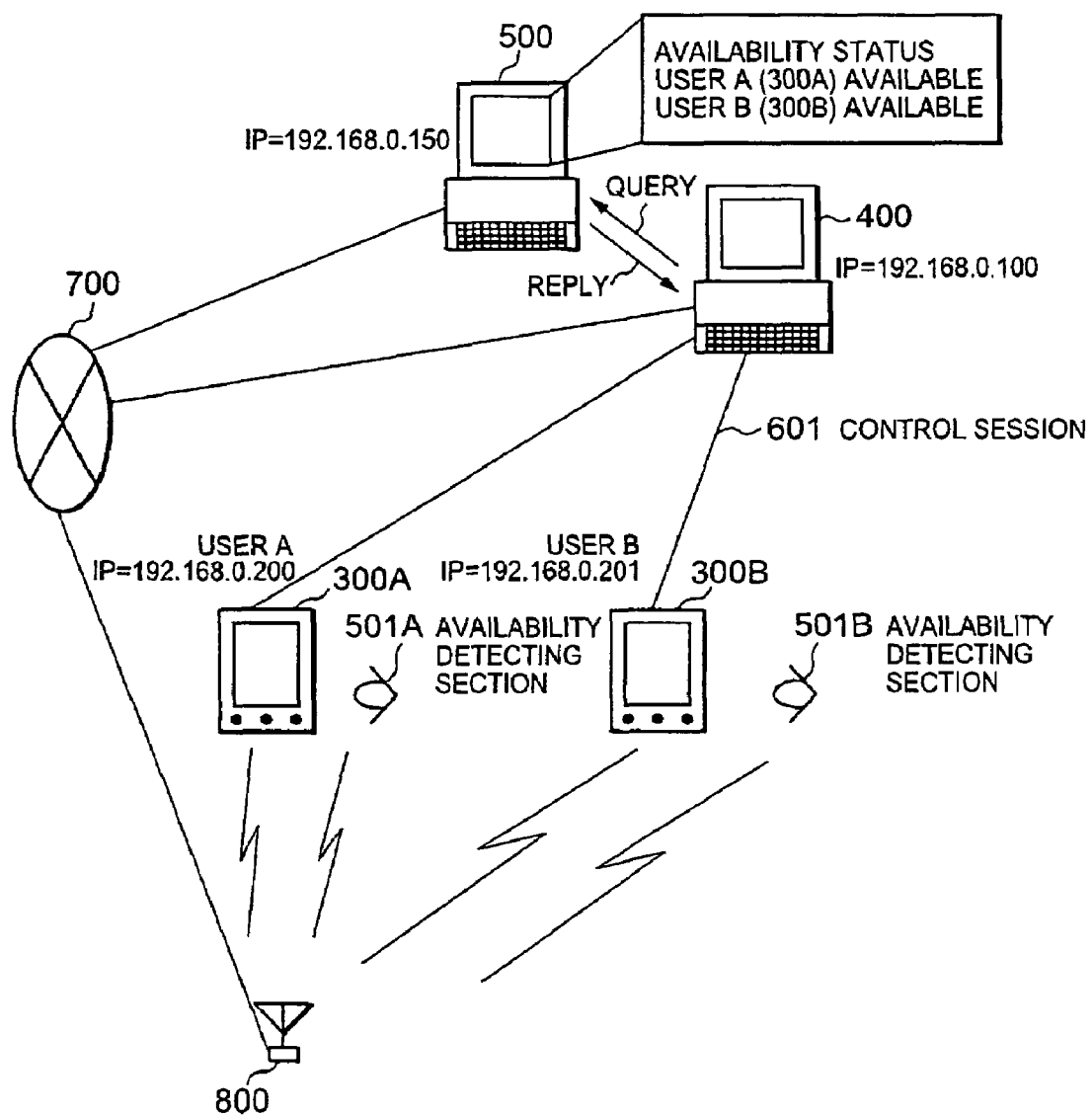
FIG. 33 is a diagram depicting a state of Embodiment 2.1 of the second mode of implementation.

In FIG. 33, the session establishment information administration device 500 is connected in the same manner as the other devices to the LAN 700 and can communicate back and forth with other devices. User-availability detecting section 501A and 501B are connected to the LAN 700 via the wireless access point 800 and they each detect whether or not the users are available, and this information is sent to the session establishment information administration device 500 via the network. The session establishment information administration device 500 collects and administrates the information from the user-availability detecting sections connected to the network.

The respective user-availability detecting sections 501 are mounted to the users' seats and are designed to detect occupancy in the chair by using an infrared sensor or the like to detect the heat emitted from the user's body. The user-availability detecting section 501 may also be configured so as to determine whether or not a person is nearby from the number of pixels in a skin-colored area of an image obtained from a camera connected to the network, the same as in the arrangement described in the previously described Embodiment 1.1. Such a detecting means as would detect the presence of a person is in general use, and this function can easily be performed.

FIG. 34 shows an example of changing contents of the network session information database 402 in the present Embodiment 1.6. In contrast with the previously described Embodiment 1.1, a condition field for setting the reservation condition and a status field for listing availability information and the like are provided so that the availability information and other parameters of the network terminal devices 300 can be obtained from the session establishment information administration device 500, and the request acceptance status can be determined. The network session reservation condition analyzing section 101 fills the condition field according to the reservation instruction. The network session requesting section 103 writes the information obtained from the session establishment information administration device 500 in the status field and, when the condition field matches the status field, determines that a request can be accepted.

Also, a configuration may be adopted whereby the session establishment information administration device 500 obtains the status of the users of the network terminal devices 300 from a plurality of user-availability detecting section 501 with differing characteristics in the same manner as in the first mode of implementation. The network session requesting section 103 can determine in great detail the status of a user and construct a network session that more closely suits the convenience of the user by selecting and using the necessary components of a plurality of pieces of detected information that have different characteristics and are administered by the session establishment information administration device 500.

The session establishment procedure subsequent to when the necessary network terminal device 300 becomes able to accept a request is the same as in the first mode of implementation.

Notification of detected result from the user-availability detecting section 501 to the session establishment information administration device 500 and a reply of the session establishment information administration device 500 to the inquiry from the network session requesting section 103 can be performed by the database technique SQL (Structured Query Language), a combination of SIP and the presence (status) description format for an instant messaging service CPIM (Common Presence AND Instant Messaging), or the like. For example, when CPIM and SIP are used, information about the availability of each user can be collected by attaching availability information written in XML to a REGISTER command and sending the command from the user-availability detecting section 501 to the session establishment information administration device 500. The collected information can be distributed to the network session requesting section 103 by sending a NOTIFY command from the session establishment information administration device 500 every time the availability information changes for a SUBSCRIBE command from the network session requesting section 103 that indicates an information request.

This type of server for collecting and administrating various types of status is generally referred to as a presence server and is used by telephone services and instant messaging services that use both SIP and VoIP technology. As in the second mode of implementation, making the session establishment information administration device 500 for administrating the presence information of the users independent from the network terminal device 300 enables a regular presence server to be used as the session establishment information administration device 500 in the present invention.

Also, a configuration is adopted in the present Embodiment 2.1 whereby the user-availability detecting section 501A and 501B read the availability status of users A and B and collect the information in the session establishment information administration device 500 via the LAN 700, but the range of applicability of the present invention is not limited to this configuration.

Figure 42:
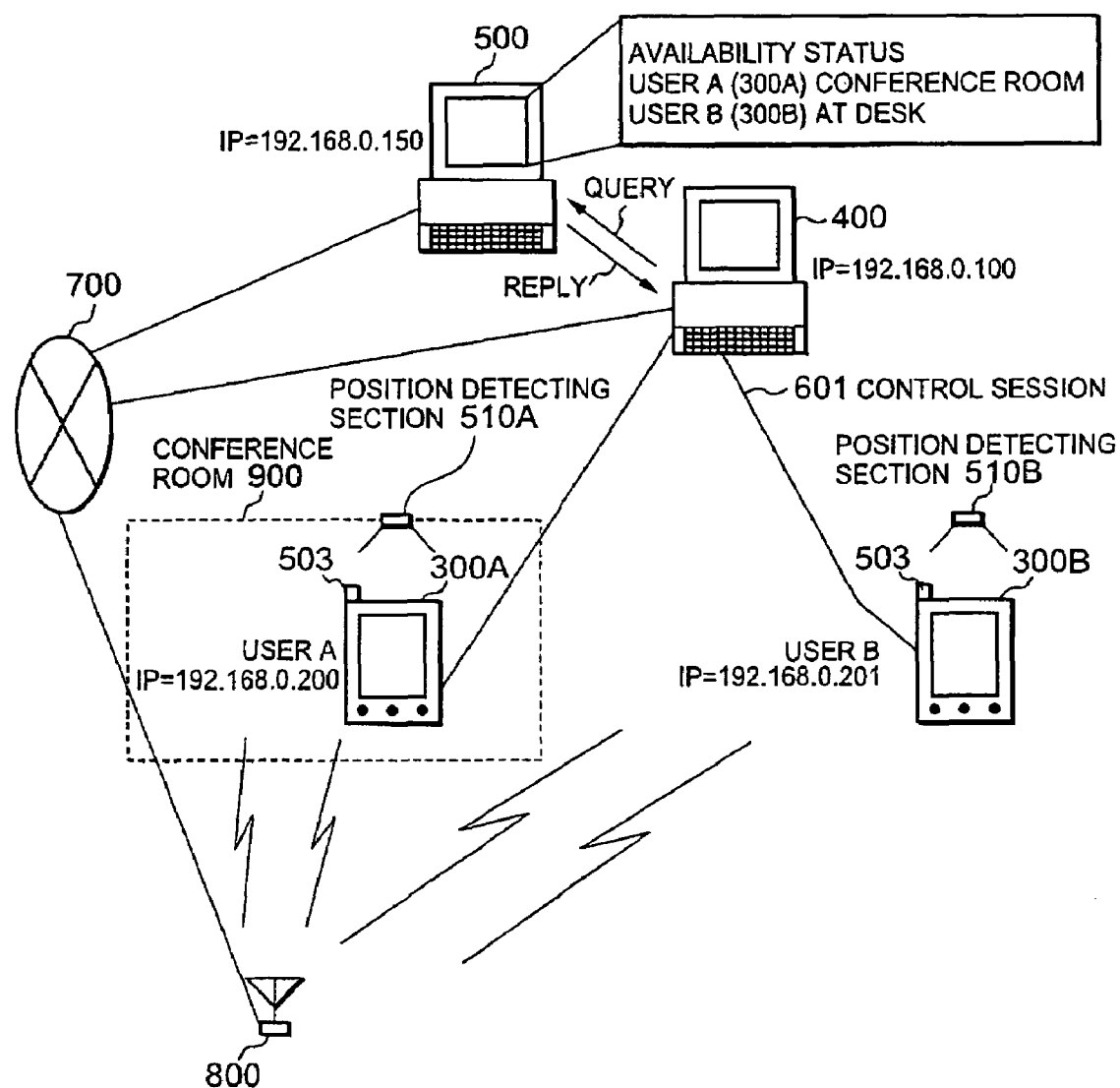
FIG. 42 is a diagram depicting session establishment between the network administration device and the plurality of network terminal devices according to a modification of Embodiment 2.1 of the second mode of implementation.

For example, as shown in FIG. 42, a configuration may also be adopted whereby an infrared beacon 503 is mounted to each of the network terminal devices 300A and 300B for outputting the ID thereof, and position detecting sections 510A and 510B composed of infrared receivers are mounted in various locations. In this case, the session establishment information administration device 500 detects and administrates the positions of the network terminal devices 300A and 300B and their users A and B on the basis of the ID received from the infrared beacon 503 by the position detecting section 510 disposed in several locations. A positioning system in which a beacon is combined with a receiver can be provided using a short-range wireless transmitter and receiver, speaker and microphone, GPS (Global Positioning System), or the like. Since such a technique has been disclosed in R. Want "Active badges and personal interactive computing objects"

(IEEE Transactions on Consumer Electronics, pp. 10-20, Vol. 38, Issue 1, February 1992), detailed description thereof herein is omitted.

FIG. 43 shows a change of state in the session administration data in the network session information database 402 when the position detecting section 510 of FIG. 42 is employed, taking as an example a case in which a condition is set such that a network session is established when both the network terminal devices 300A and 300B have been brought into the conference room 900.

Acquiring position information and administrating/using the information in the session establishment information administration device 500 enables a condition to be set whereby a network session is established more flexibly.

Embodiment 2.2

Embodiment 2.2 of the second mode of implementation of the present invention will next be described.

The present Embodiment 2.2 relates to the above-described Embodiment 2.1 in the same manner as does the previously described Embodiment 1.1 to the previously described Embodiment 1.2.

More specifically, the present Embodiment 2.2 is configured such that it is confirmed whether or not to start establishing a session with high-priority users (step S104), and establishing a network session is started only when all of the network terminal devices of the high-priority users have accepted that establishing the above-mentioned session should be started (step S203).

Portions other than those described above are the same as in the above-described Embodiment 2.1, and detailed description thereof is omitted.

Embodiment 2.3

Embodiment 2.3 of the second mode of implementation of the present invention will next be described. The present Embodiment 2.3 relates to the previously described Embodiment 2.1 in the same manner as does the previously described Embodiment 1.1 to the previously described Embodiment 1.3.

More specifically, the present Embodiment 2.3 is configured such that it is confirmed whether or not to start establishing a session with high-priority users (step S104), and establishing a network session is started only when at least one of all of the network terminal devices of the high-priority users has accepted that establishing the above-mentioned session should be started (step S203), and a network session is formed between the network terminal device of the high-priority user who has accepted initiation of session establishment and the network terminal device of a regular user (steps S105, S204).

Portions other than those described above are the same as in Embodiment 1 of the second mode of implementation, and detailed description thereof is omitted.

Embodiment 2.4

Embodiment. 2.4 of the second mode of implementation of the present invention will next be described. The present Embodiment 2.4 relates to the previously described Embodiment 2.1 in the same manner as does the previously described Embodiment 1.1 to the previously described Embodiment 1.4.

More specifically, the present Embodiment 2.4 is configured such that whether or not to establish a network session as a whole is determined by checking whether or not the network terminal device of a high-priority user has accepted a session establishment request (step S103).

Portions other than those described above differ from Embodiment 2.1 in the same respects as Embodiment 1.4 differs from Embodiment 1.1, and detailed description thereof is omitted.

Embodiment 2.5

Embodiment 2.5 of the second mode of implementation of the present invention will next be described. The present Embodiment 2.5 relates to the previously described Embodiment 2.1 in the same manner as does the previously described Embodiment 1.1 to the previously described Embodiment 1.5.

More specifically, the present Embodiment 2.5 is configured such that it is looked up whether or not the network terminal device of a high-priority user has accepted a session establishment request, a decision is made as to whether or not to establish a network session as a whole (step S103), it is confirmed whether or not to start establishing a session with the high-priority user (step S104), and establishing a network session is started only when all of the network terminal devices of the high-priority users have accepted that establishing the above-mentioned session should be started (step S203).

Portions other than those described above differ from Embodiment 2.1 in the same respects as Embodiment 1.5 differs from Embodiment 1.1, and detailed description thereof is omitted.

Embodiment 2.6

Embodiment 2.6 of the second mode of implementation of the present invention will next be described. The present Embodiment 2.6 relates to the previously described Embodiment 2.1 in the same manner as does the previously described Embodiment 1.1 to the previously described Embodiment 1.6.

More specifically, the present Embodiment 2.6 is configured such that it is looked up whether or not the network terminal device of a high-priority user has accepted a session establishment request, a decision is made as to whether or not to establish a network session as a whole (step S103), it is confirmed whether or not to start establishing a session with the nigh-priority user (step S104), establishing a network session is started only when at least one of all of the network terminal devices of the high-priority users has accepted that establishing the above-mentioned session should be started (step S203), and a network session is formed between the network terminal device of the high-priority user who has accepted initiation of session establishment and the network terminal device of a regular user (steps S105, S204).

Portions other than those described above differ from Embodiment 2.1 in the same respects as Embodiment 1.5 differs from Embodiment 1.1, and detailed description thereof is omitted.

Also, in the above-mentioned Embodiments 2.4 through 2.6 as being configured such that establishing a session is started when all of the users of the high-priority network terminal devices 300 are able to accept a request, it is apparent that a configuration may also be adopted whereby establishing a session is started when at least one of the high-priority users has become able to accept a request.

3. Third Mode of Implementation

Embodiment 3.1

Embodiment 3.1 of the third mode of implementation of the present invention will next be described using the drawings.

As shown in FIG. 35, the third mode of implementation differs in comparison to the first mode of implementation in that a configuration is adopted therein whereby the network session reservation acceptance confirmation section 105 and session reservation acceptance replying section 203 confirm at the time of network session reservation whether or not the network terminal device 300 scheduled to participate in the network session will accept the reservation. In the present Embodiment 3.1, a network session is established between network terminal devices 300A and 300B, and a telephone service is provided in the same manner as in Embodiment 1.1 of the first mode of implementation.

The present Embodiment 3.1 differs in comparison to the previously described Embodiment 1.1 with regard to the aspects described below.

Figure 36:
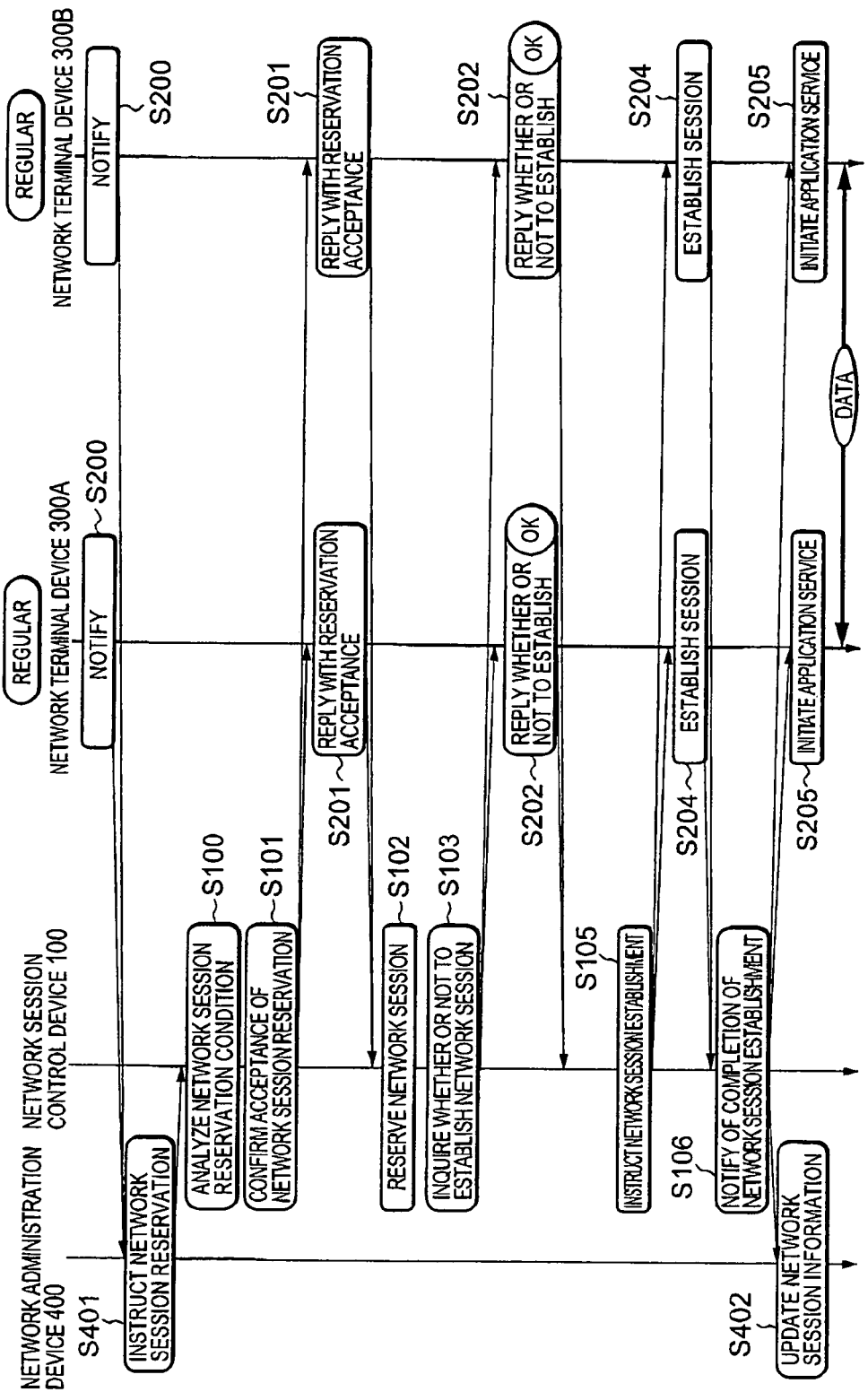
FIG. 36 is a sequence diagram depicting the flow of processing according to Embodiment 3.1 of the third mode of implementation.
Figure 37:
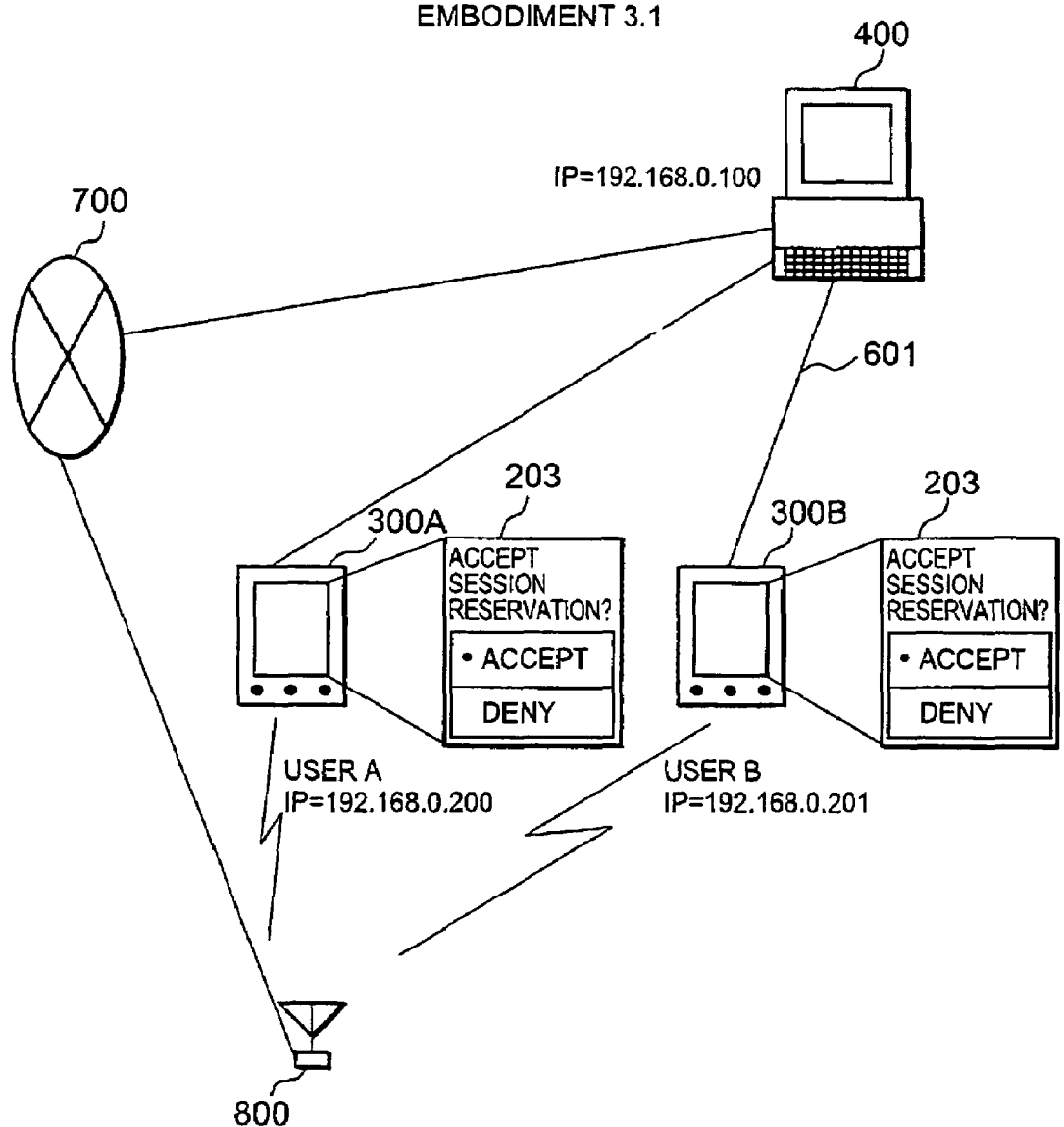
FIG. 37 is a diagram depicting a state of Embodiment 3.1 of the third mode of implementation.

Referring to FIGS. 35-37, first, the network administration device 400 has network session reservation acceptance confirmation section 105 for providing the network terminal with a confirmation regarding the wish to participate in the network session at the time the network session is reserved.

The network terminal devices 300 have session reservation acceptance replying section 203 for replying at the time the network session is reserved as to whether or not the session will be accepted.

The network session reserving section 102 is configured such that after the network session reservation condition analyzing section 101 has analyzed the network reservation condition in step S100, the network session reserving section 102 instructs the network session reservation acceptance confirmation section 105 to inquire of the session reservation acceptance replying section 203 of the network terminal device 300 scheduled to participate in the network session as to whether or not to accept a network session reservation (S101).

The session reservation acceptance replying section 203 is configured so as to confirm the wishes of the user and to reply to the inquiry from the network session reservation acceptance confirmation section 105 (step S201).

The network session reserving section 102 is configured so as to reserve a network session only when all of the network terminal devices 300 that are scheduled to participate in the network session have accepted reservation of the network session (step S102).

Processing other than that described above is the same as in Embodiment 1.1, and a network session is established and a telephone service executed between both network terminal devices 300 if both the user of the network terminal device 300A and the user of the network terminal device 300B are available.

FIG. 37 depicts a state in which the session reservation acceptance replying section 203 displays a dialog screen on the displays of the network terminal devices 300A and 300B, and obtains confirmation from the user whether or not to accept a session reservation in step S201.

Confirming the user's wish to reserve a network session in this manner makes it possible, for example, to prevent a network session from being established with parties that the user does not wish to contact, and to form network sessions that better reflect the wishes of users.

The session reservation acceptance replying section 203 may be configured so as to automatically return acceptance in the case of the network session reservation with a user who is listed in the address book kept by the user in his or her network terminal device 300. It is also possible to adopt a configuration whereby acceptance is automatically returned in the same manner when a network session with a predetermined user (in this case, user A or user B as the callee in a telephone call) is reserved. By setting a user in advance in this manner, the wishes of the users can be automatically reflected without displaying a dialog screen or the like, and the above-mentioned operation can be performed while reducing the amount of action required from the user.

Embodiment 3.2

Embodiment 3.2 of the third mode of implementation of the present invention will next be described. The present Embodiment 3.2 relates to the above-described Embodiment 3.1 in the same manner as does the previously described Embodiment 1.1 to the previously described Embodiment 1.2.

More specifically, the present Embodiment 3.2 is configured such that it is confirmed whether or not to start establishing a session with the high-priority user (step S104), and establishing a network session is started only when all of the network terminal devices of the high-priority users have accepted that the above-mentioned session should be established (step S203).

Portions other than those described above are the same as in Embodiment 3.1, and detailed description thereof is omitted.

Embodiment 3.3

Embodiment 3.3 of the third mode of implementation of the present invention will next be described. The present Embodiment 3.3 relates to the above-described Embodiment 3.1 in the same manner as does the previously described Embodiment 1.1 to the previously described Embodiment 1.3.

More specifically, the present Embodiment 3.3 is configured such that it is confirmed whether or not to start establishing a session with the high-priority user (step S104), establishing a network session is started only when at least one of the network terminal devices of the high-priority users has accepted that establishing the above-mentioned session should be started (step S203), and a network session is formed between the network terminal device of the high-priority user who has accepted initiation of session establishment and the network terminal device of a regular user (steps S105, S204).

Portions other than those described above are the same as in Embodiment 3.1, and detailed description thereof is omitted.

Embodiment 3.4

Embodiment 3.4 of the third mode of implementation of the present invention will next be described. The present Embodiment 3.4 relates to the above-described Embodiment 3.1 in the same manner as does the previously described Embodiment 1.1 to the previously described Embodiment 1.4.

More specifically, the present Embodiment 3.4 is configured such that it is looked up whether or not the network terminal device of a high-priority user has accepted a session establishment request, and a decision is made as to whether or not to establish a network session as a whole (step S103)

Portions other than those described above differ from Embodiment 3.1 in the same respects as Embodiment 1.4 differs from Embodiment 1.1, and detailed description thereof is omitted.

Embodiment 3.5

Embodiment 3.5 of the third mode of implementation of the present invention will next be described. The present Embodiment 3.5 relates to the above-described Embodiment 3.1 in the same manner as does the previously described Embodiment 1.1 to the previously described Embodiment 1.5.

More specifically, the present Embodiment 3.5 is configured such that it is looked up whether or not the network terminal device of a high-priority user has accepted a session establishment request, a decision is made as to whether or not to establish a network session as a whole (step S103), it is confirmed whether or not to start establishing a session with the high-priority user (step S104), and establishing a network session is started only when all of the network terminal devices of the high-priority users have accepted that the above-mentioned session should be established (step S203).

Portions other than those described above differ from Embodiment 3.1 in the same respects as Embodiment 1.5 differs from Embodiment 1.1, and detailed description thereof is omitted.

Embodiment 3.6

Embodiment 3.6 of the third mode of implementation of the present invention will next be described. The present Embodiment 3.6 relates to the above-described Embodiment 3.1 in the same manner as does the previously described Embodiment 1.1 to the previously described Embodiment 1.6.

More specifically, the present Embodiment 3.6 is configured such that it is looked up whether or not the network terminal device of a high-priority user has accepted a session establishment request, a decision is made as to whether or not to establish a network session as a whole (step 5103), it is confirmed whether or not to start establishing a session with the high-priority user (step S104), establishing a network session is started only when the network terminal device of at least one of the high-priority users has accepted that establishing the above-mentioned session should be started (step S203), and a network session is formed between the network terminal device of the high-priority user who has accepted initiation of session establishment and the network terminal device of a regular user (steps S105, S204).

Portions other than those described above differ from Embodiment 3.1 in the same respects as Embodiment 1.6 differs from Embodiment 1.1, and detailed description thereof is omitted.

In the above-mentioned Embodiments 3.4 through 3.6 as being configured such that establishing a session is started when the users of all of the priority network terminal devices 300 are able to accept a request, it is apparent that a configuration may be adopted whereby establishing a session is started when at least one of the high-priority users has become able to accept a request.

4. Fourth Mode of Implementation

Embodiment 4.1

Embodiment 4.1 of the fourth mode of implementation of the present invention will next be described using the drawings.

As shown in FIG. 38, the fourth mode of implementation differs in comparison to the first mode of implementation in that at the time of reservation of a network session, it is confirmed by the network session reservation acceptance confirmation section 105 and the session reservation acceptance replying section 203 whether or not to accept the reservation for the network terminal device 300 scheduled to participate in the network session, and that it is determined based on information maintained by the session establishment information administration device 500, which is independent from the network terminal devices 300, whether or not a reservation condition that describes the timing and procedure for establishing the network session is satisfied. This arrangement provides a network session establishment procedure that more precisely reflects the user's wishes by combining the difference between the first and second modes of implementation with the difference between the first and third modes of implementation. Also, the present Embodiment 4.1 establishes a network session between network terminal devices 300A and 300B and provides a telephone service in the same manner as in Embodiment 1.1.

Embodiment 4.1 differs in comparison to Embodiment 1.1 with regard to the aspects described below.

First, a session establishment information administration device 500 is present that is independent from the network terminal device 300, and the network terminal devices 300 have no session establishment information detecting means.

The network administration device 400 has network session reservation acceptance confirmation section 105 for confirming the intent to participate in the network session to the network terminal at the time the network session is reserved.

The network terminal devices 300 have session reservation acceptance replying section 203 for replying as to whether or not the session is accepted at the time the network session is reserved.

Figure 39:
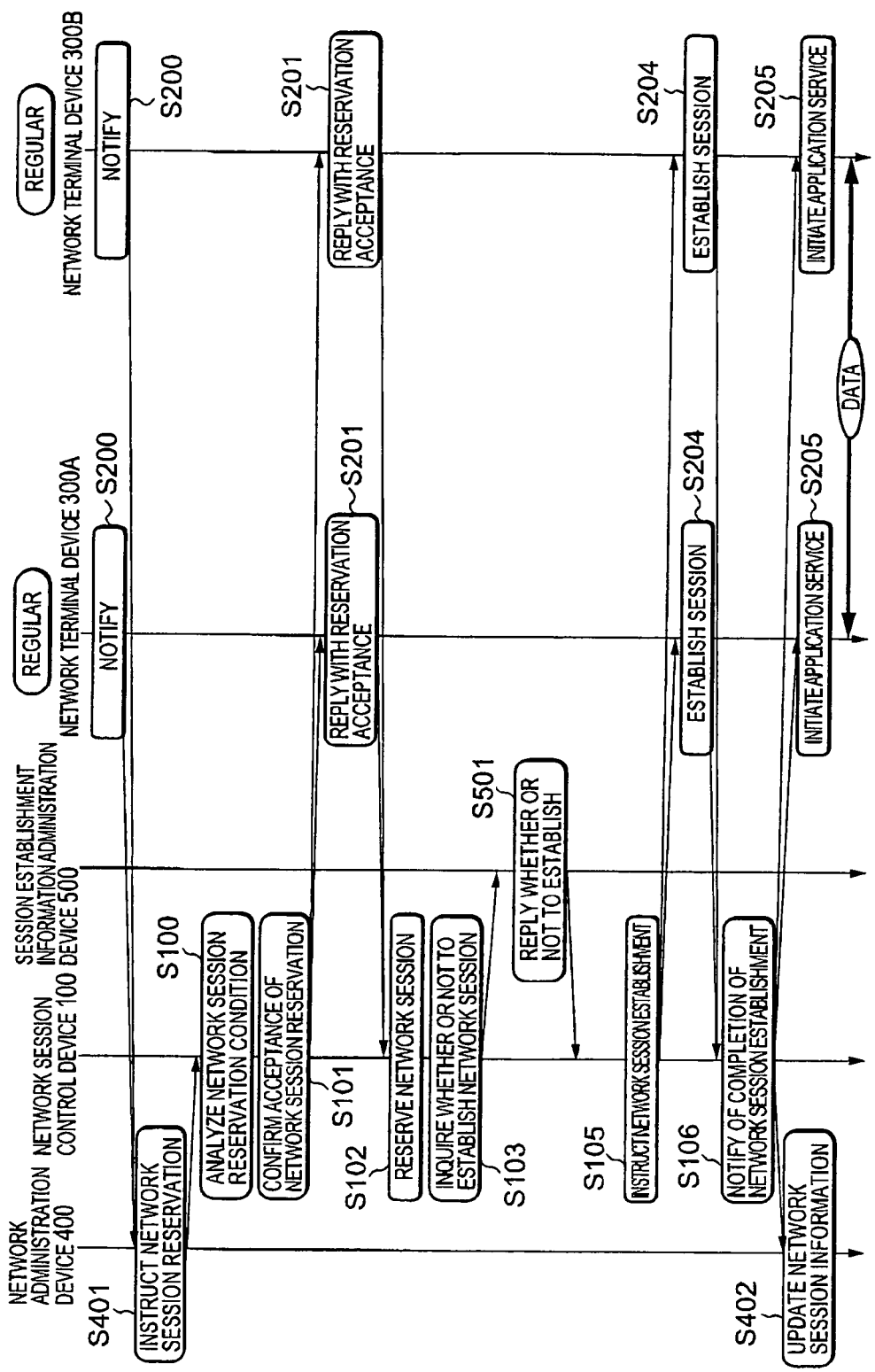
FIG. 39 is a sequence diagram depicting the flow of processing according to Embodiment 4.1 of the fourth mode of implementation.

As shown in FIG. 39, the network session reserving section 102 is configured such that after the network session reservation condition analyzing section 101 has analyzed the network reservation condition in step S100, the network session reserving section 102 instructs the above-mentioned network session reservation acceptance confirmation section 105 to inquire of the session reservation acceptance replying section 203 of the network terminal device 300 scheduled to participate in the network session as to whether or not to accept a network session reservation (step The session reservation acceptance replying section 203 is configured so as to confirm the wishes of the user and to reply to the inquiry received from the network session reservation acceptance confirmation section 105 (step S201).

The network session reserving section 102 is configured so as to reserve a network session only when all of the network terminal devices 300 that are scheduled to participate in the network session have accepted reservation of the network session (step S102).

The network session requesting section 103 is configured so as to provide the session establishment information administration device 500 with an inquiry concerning the information of the network terminal devices 300A and 300B upon reservation of the network session (step S103).

The session establishment information administration device 500 is configured so as to issue a reply concerning the availability status of the users using the network terminal devices 300A and 300B in response to the inquiry from the network session requesting section 103 (step S501).

The network session requesting section 103 is configured so as to register in the network session information database 402 the reply from the session establishment information administration device 500, and to repeat the steps S103 through S501 until all of the network terminal devices 300 are able to accept a request.

Processing other than that described above is the same as in Embodiment 1.1 of the first mode of implementation, and a network session is established and a telephone service executed between both network terminal devices 300 if both the user of the network terminal device 300A and the user of the network terminal device 300B are available.

Embodiment 4.2

Embodiment 4.2 of the fourth mode of implementation of the present invention will next be described. The present Embodiment 4.2 relates to the above-described Embodiment 4.1 in the same manner as does the previously described Embodiment 1.1 to the previously described Embodiment 1.2.

More specifically, the present Embodiment 4.2 is configured such that it is confirmed whether or not to start establishing a session with the high-priority user (step S104), and establishing a network session is started only when all of the network terminal devices of the high-priority users have accepted that the above-mentioned session should be established (step S203).

Portions other than those described above are the same as in Embodiment 4.1, and detailed description thereof is omitted.

Embodiment 4.3

Embodiment 4.3 of the fourth mode of implementation of the present invention will next be described. The present Embodiment 4.3 relates to the above-described Embodiment 4.1 in the same manner as does the previously described Embodiment 1.1 to the previously described Embodiment 1.3.

More specifically, the present Embodiment 4.3 is configured such that it is confirmed whether or not to start establishing a session with the high-priority user (step S104), establishing a network session is started only when the network terminal device of at least one of the high-priority users has accepted that establishing the above-mentioned session should be started (step S203), and a network session is formed between the network terminal device of the high-priority user who has accepted initiation of session establishment and the network terminal device of a regular user (steps S105, S204).

Portions other than those described above are the same as in Embodiment 4.1, and detailed description thereof is omitted.

Embodiment 4.4

Embodiment 4.4 of the fourth mode of implementation of the present invention will next be described. The present Embodiment 4.4 relates to the above-described Embodiment 4.1 in the same manner as does the previously described Embodiment 1.1 to the previously described Embodiment 1.4.

More specifically, the present Embodiment 4.4 is configured such that it is looked up whether or not the network terminal device of a high-priority user has accepted a session establishment request, and a decision is made as to whether or not to establish a network session as a whole (step S103).

Portions other than those described above differ from Embodiment 4.1 in the same respects as Embodiment 1.4 differs from Embodiment 1.1, and detailed description thereof is omitted.

Embodiment 4.5

Embodiment 4.5 of the fourth mode of implementation of the present invention will next be described. The present Embodiment 4.5 relates to the above-described Embodiment 4.1 in the same manner as does the previously described Embodiment 1.1 to the previously described Embodiment 1.5.

More specifically, the present Embodiment 4.5 is configured such that it is looked up whether or not the network terminal device of a high-priority user has accepted a session establishment request, a decision is made as to whether or not to establish a network session as a whole (step S103), it is confirmed whether or not to start establishing a session with the high-priority user (step S104), and establishing a network session is started only when all of the network terminal devices of the high-priority users have accepted that the above-mentioned session should be established (step S203).

Portions other than those described above differ from Embodiment 4.1 in the same respects as Embodiment 1.5 differs from Embodiment 1.1, and detailed description thereof is omitted.

Embodiment 4.6

Embodiment 4.6 of the fourth mode of implementation of the present invention will next be described. The present Embodiment 4.6 relates to the above-described Embodiment 4.1 in the same manner as does the previously described Embodiment 1.1 to the previously described Embodiment 1.6.

More specifically, the present Embodiment 4.6 is configured such that it is looked up whether or not the network terminal device of a high-priority user has accepted a session establishment request, a decision is made as to whether or not to establish a network session as a whole (step S103), it is confirmed whether or not to start establishing a session with the high-priority user (step S104), establishing a network session is started only when the network terminal device of at least one of the high-priority users has accepted that establishing the above-mentioned session should be started (step S203), and a network session is formed between the network terminal device of the high-priority user who has accepted initiation of session establishment and the network terminal device of a regular user (steps S105, S204).

Portions other than those described above differ from Embodiment 4.1 in the same respects as Embodiment 1.6 differs from Embodiment 1.1, and detailed description thereof is omitted.

In the above-mentioned Embodiments 4.4 through 4.6 as being configured such that establishing a session is started when the users of all of the priority network terminal devices 300 are able to accept a request, it is apparent that a configuration may be adopted whereby establishing a session is started when at least one of the high-priority users has become able to accept a request.

Advantages

The following advantages are achieved by means of the present invention as described above.

A network session can be established between network terminal devices of users who have a relationship such as customer/salesclerk, superior/subordinate, conference host/general participant or the like, by a procedure that treats with priority the network terminal devices of high-priority users. In other words, it becomes possible to establish a network session by a procedure that matches the relationship between the users.

The above advantage is achieved by executing control such that priority of session establishment is assigned to each network terminal in the reserved connection information, and when the reserved connection information indicates a difference in the priority of establishing a session, a network session is established according to a session establishment procedure for assigning priority to the network terminal device of a high-priority user among the users participating in the network session.

Also, in a configuration whereby control is executed for establishing a network session according to a session establishment procedure that treats equally the network terminal devices of all the users participating in the network session, a network session can be established between network terminal devices of users whose relationship is that of coworker, friend, or the like by a procedure that treats the network terminal devices of all of the users equally when the reserved connection information indicates no difference in the priority of establishing a session.

Network sessions that are not desired by a network terminal device or the user of the network terminal device are prevented from being established. This advantage is achieved by adopting a configuration whereby network session reservation acceptance checking section and session reservation acceptance replying section inquire as to whether or not to accept the reservation at the time when the network session is reserved.

A network session can be established and a network service obtained when it is convenient for the network terminal device or user of the network terminal device. This advantage is achieved by adopting a configuration whereby the user's status is looked up to determine a timing to establish the network session.

Personal information is prevented from being leaked while users' availability status, busyness, and other personal information are looked up and a network session is established. This advantage is achieved by adopting a configuration whereby the session request acceptance checking section issues a reply that indicates solely whether or not acceptance of a session request is possible, and does not include the personal information detected as such by the session establishment information detecting section.

A network session that a network terminal device or the user of the network terminal device does not wish is prevented from being established even after a reservation has been accepted for the network session. This advantage is achieved by adopting a configuration whereby a high-priority user is asked again whether or not to continue with establishing the network session when establishment of the network session is initiated.

The invention claimed is:

1. A network session control system for establishing a network session among a plurality of network terminals, comprising:
 a table storing user relationship among users using respective ones of the plurality of network terminals;
 a session information memory for storing addresses of the plurality of network terminals and reserved connection information including a priority degree of session establishment for each of the plurality of network terminals, wherein the priority degree for each network terminal is determined depending on the user relationship; and
 a network session controller for controlling session establishment depending on the reserved connection information such that preferential session establishment is given to a network terminal having a higher priority degree, said network session controller comprising a network session requester for sending each of the network terminals an inquiry about whether each of the network terminals can participate in the network session and a network session reservation condition analyzer for analyzing a reply to the inquiry received from each of the network terminals to register the reserved connection information into the session information memory.

2. A network administration device for establishing a network session among a plurality of network terminals through a session data relaying section, comprising:
 a table storing user relationship among users using respective ones of the plurality of network terminals;
 a session information memory for storing addresses of the plurality of network terminals and reserved connection information including a priority degree of session establishment for each of the plurality of network terminals, wherein the priority degree for each network terminal is determined depending on the user relationship; and
 a network session controller for controlling session establishment depending on the reserved connection information such that preferential session establishment is given to a network terminal having a higher priority degree, said network session controller comprising a network session requester for sending each of the network terminals an inquiry about whether each of the network terminals can participate in the network session and a network session reservation condition analyzer for analyzing a reply to the inquiry received from each of the network terminals to register the reserved connection information into the session information memory.

3. The network administration device according to claim 2, wherein the network session controller confirms that the plurality of network terminals related to the reserved connection information participate in the network session before registering the reserved connection information into the session information memory.

4. The network administration device according to claim 2, wherein when any higher-priority network terminal related to the reserved connection information can participate in the network session, the network session controller starts establishing the network session for all the network terminals.

5. The network administration device according to claim 2, wherein when all the network terminals related to the reserved connection information have an equal priority degree, the network session controller controls the session establishment without any preference.

6. The network administration device according to claim 5, wherein when all the network terminals related to the reserved connection information can participate in the network session, the network session controller starts establishing the network session for all the network terminals.

7. A network administration device for establishing a network session among a plurality of network terminals through a session data relaying section, comprising:
 a table storing user relationship among users using respective ones of the plurality of network terminals;

a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree, wherein the network session controller comprises a network session requester for sending a session establishment information manager an inquiry about whether any network terminal can participate in the network session, wherein the session establishment information manager manages state information indicating availability of each of the network terminals or the user using the network terminal; and a network session reservation condition analyzer for analyzing a reply to the inquiry received from each of the network terminals to register the reserved connection information into the session information memory.

8. A network administration device for establishing a network session among a plurality of network terminals through a session data relaying section, comprising:

a table storing user relationship among users using respective ones of the plurality of network terminals;

a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree, wherein the network session controller comprises a network session reservation acceptance check section for sending the reservation acceptance inquire to a network terminal to determine whether the network terminal can accept the reservation of the network session;

a network session requester for sending each of the network terminals an inquiry about whether each of the network terminals can participate in the network session; and a network session reservation condition analyzer for analyzing a reply to the inquiry received from each of the network terminals to register the reserved connection information into the session information memory, wherein the network session controller controls the session establishment depending on reserved connection information related to any network terminal replying to the reservation acceptance inquire that the network terminal can accept the reservation of the network session.

9. A network administration device for establishing a network session among a plurality of network terminals through a session data relaying section, comprising:

a table storing user relationship among users using respective ones of the plurality of network terminals:

a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree, wherein the network session controller comprises a network session reservation acceptance check section for sending a reservation acceptance inquire to a network terminal to determine whether the network terminal can accept the reservation of the network session; and a network session requester for sending a session establishment information manager an inquiry about whether any network terminal can participate in the network session, wherein the session establishment information manager manages state information indicating availability of each of the network terminals or the user using the network terminal, wherein the network session controller controls the session establishment depending on reserved connection information related to any network terminal replying to the reservation acceptance inquire that the network terminal can accept the reservation of the network session.

10. A network administration device, for establishing a network session among a plurality of network terminals through a session data relaying section, comprising:

a table storing user relationship among users using respective ones of the plurality of network terminals;

a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree, wherein when all the network terminals related to the reserved connection information can participate in the network session, the network session controller sends any higher-priority network terminal an inquiry about whether to start a procedure of the session establishment and, when having received a reply to the inquiry from the higher-priority network terminal that the procedure of the session establishment is permitted to start, starts establishing the network session for all the network terminals.

11. A network administration device for establishing a network session among a plurality of network terminals through a session data relaying section, comprising:

a table storing user relationship among users using respective ones of the plurality of network terminals;

a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree, wherein when all the network terminals related to the reserved connection information can participate in the network session, the network session controller sends any higher-priority network terminal an inquiry about whether to start a procedure of the session establishment and, when having received a reply to the inquiry from at least one higher-priority network terminal that the procedure of the session establishment is permitted to start, starts establishing the network session for all network terminals other than any higher-priority network terminal that has not sent the reply back.

12. A network administration device for establishing a network session among a plurality of network terminals through a session data relaying section, comprising:

a table storing user relationship among users using respective ones of the plurality of network terminals;

a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree, wherein when any higher-priority network terminal related to the reserved connection information can participate in the network session, the network session controller sends any higher-priority network terminal an inquiry about whether to start a procedure of the session establishment and, when having received a reply to the inquiry from the higher-priority network terminal that the procedure of the session establishment is permitted to start, starts establishing the network session for all the network terminals.

13. A network administration device for establishing a network session among a plurality of network terminals through a session data relaying section, comprising:

a table storing user relationship among users using respective ones of the plurality of network terminals;

a session information memory for storing addresses of the plurality of network terminals and reserved connection information including a priority degree of session establishment for each of the plurality of network terminals, wherein the priority degree for each network terminal is determined depending on the user relationship; and a network session controller for controlling session establishment depending on the reserved connection information such that preferential session establishment is given to a network terminal having a higher priority degree, wherein when any higher-priority network terminal related to the reserved connection information can participate in the network session, the network session controller sends any higher-priority network terminal an inquiry about whether to start a procedure of the session establishment and, when having received a reply to the inquiry from at least one higher-priority network terminal that the procedure of the session establishment is permitted to start, starts establishing the network session for all network terminals other than any higher-priority network terminal that has not sent the reply back.

14. A method for establishing a network session among a plurality of network terminals through a session data relaying section, comprising:

a) storing user relationship among users using respective ones of the plurality of network terminals;

b) storing addresses of the plurality of network terminals and reserved connection information including a priority degree of session establishment for each of the plurality of network terminals, wherein the priority degree for each network terminal is determined depending on the user relationship;

c) controlling session establishment depending on the reserved connection information such that preferential session establishment is given to a network terminal having a higher priority degree;

d) sending each of the network terminals an inquiry about whether each of the network terminals can participate in the network session; and e) analyzing a reply to the inquiry received from each of the network terminals to register the reserved connection information into the session information memory.

15. A computer readable medium having computer readable program instructing a computer to implement a network administration device for establishing a network session among a plurality of network terminals through a session data relaying section, the computer program comprising:

storing user relationship among users using respective ones of the plurality of network terminals;

storing addresses of the plurality of network terminals and reserved connection information including a priority degree of session establishment for each of the plurality of network terminals, wherein the priority degree for each network terminal is determined depending on the user relationship;

controlling session establishment depending on the reserved connection information such that preferential session establishment is given to a network terminal having a higher priority degree;

sending each of the network terminals an inquiry about whether each of the network terminals can participate in the network session; and analyzing a reply to the inquiry received from each of the network terminals to register the reserved connection information into the session information memory.

* * * * *